United States Patent [19]
Yoshino et al.

[11] Patent Number: 5,537,443
[45] Date of Patent: Jul. 16, 1996

[54] INTERFERENCE SIGNAL CANCELLING METHOD, RECEIVER AND COMMUNICATION SYSTEM USING THE SAME

[75] Inventors: Hitoshi Yoshino, Yokosuka; Kazuhiko Fukawa, Yokohama; Hiroshi Suzuki, Yokosuka, all of Japan

[73] Assignee: NTT Mobile Communications Network Inc., Tokyo, Japan

[21] Appl. No.: 302,735

[22] PCT Filed: Jan. 18, 1994

[86] PCT No.: PCT/JP94/00059

§ 371 Date: Sep. 9, 1994

§ 102(e) Date: Sep. 9, 1994

[87] PCT Pub. No.: WO94/17600

PCT Pub. Date: Aug. 4, 1994

[30] Foreign Application Priority Data

Jan. 19, 1993 [JP] Japan ................................. 5-007001
Mar. 26, 1993 [JP] Japan ................................. 5-068419

[51] Int. Cl.⁶ ........................ H03D 1/00; H04L 27/06
[52] U.S. Cl. .................. 375/340; 375/346; 375/348; 364/724.2
[58] Field of Search ........................ 375/262, 341, 375/346, 348, 232, 233; 364/724.19, 724.2

[56] References Cited

U.S. PATENT DOCUMENTS

| | | | |
|---|---|---|---|
| 5,005,188 | 4/1991 | Clark | 375/348 X |
| 5,081,651 | 1/1992 | Kubo | 375/348 X |
| 5,263,052 | 11/1993 | Borth et al. | 375/262 |
| 5,285,480 | 2/1994 | Chennakeshu et al. | 375/348 |
| 5,291,523 | 3/1994 | Bergmans et al. | 375/348 X |

*Primary Examiner*—Stephen Chin
*Assistant Examiner*—Bryan E. Webster
*Attorney, Agent, or Firm*—Pollock, Vande Sande & Priddy

[57] ABSTRACT

Pluralities of estimated desired and interference signal sequence candidates corresponding to the states of transition of desired and interference signals estimated to receive are sequentially generated in a state estimation part 40, from which they are provided to a desired signal estimation part 10 and an interference signal estimation part 20. These estimation parts 10 and 20 generate estimated desired and interference signals from the sequence candidates in accordance with conversion parameters from a channel parameter estimation part 50. A signal of their sum is subtracted in an error estimation part 30 from a received signal to yield an estimation error signal ε. The state estimation part 40 estimates estimated desired and interference signal sequences for the generated sequence candidates.

30 Claims, 23 Drawing Sheets

| INPUT {a1n,a2n} | PHASE SHIFT | OUTPUT {b1n,b2n,b3n} |
|---|---|---|
| 00 | 0° | 000 |
| 01 | +90° | 010 |
| 10 | +270° | 110 |
| 11 | +180° | 100 |

| INPUT {a1n,a2n} | PHASE SHIFT | OUTPUT {b1n,b2n,b3n} |
|---|---|---|
| 00 | +45° | 001 |
| 01 | +315° | 111 |
| 10 | +135° | 011 |
| 11 | +225° | 101 |

INTERFERENCE SIGNAL CANCELLING METHOD, RECEIVER AND COMMUNICATION SYSTEM USING THE SAME

BACKGROUND OF THE INVENTION

The present invention relates to an interference signal cancelling method and a receiver using the same and, more particularly, to an interference signal cancelling method which compensates for the degradation of transmission characteristics due to co-channel or similar interference signals from other adjacent cells in digital mobile radio communication and a receiver and a communication system using such an interference signal cancelling method.

There have already been proposed several types of receivers that generate replicas from transmission symbol candidates for desired and interference signals and transmission line parameters corresponding to these two signals, subtract these replicas from a received signal to obtain an error signal, multiply the square of the error signal by −1 and use the resulting signal as a log likelihood to make a maximum likelihood decision by a maximum likelihood sequence estimator for desired and inter-channel interference signals under inter-symbol interference generating environment.

For example, W. Van Etten has proposed, as a maximum likelihood sequence estimator, a receiver using the Viterbi algorithm (W. Van Etten, "Maximum Likelihood Receiver for Multiple Channel Transmission System," IEEE Trans. on Comm., February 1976). However, this receiver is based on the assumption that the value of the impulse response of the transmission line is preknown. A receiver of the type that estimates transmission line parameters and employs a maximum likelihood sequence estimator has been proposed by Howard E. Nicols, Arithur A. Giordano and John G. Proakis. According to their proposal, the transmission line parameters are estimated and updated by an adaptation algorithm through use of an estimated value for a symbol detection which is outputted from the maximum likelihood sequence estimator after being delayed for the same period of time as a received signal sample delayed for a fixed period of time. This receiver operates well when the radio channel undergoes relatively slow time-variations. In the mobile radio channel, however, since the amplitudes and phases of desired and interference signals varyat high speed, the estimated value of the received signal sample which is delayed for a fixed period of time, as proposed by Howard E. Nicols, Arithur A. Giordano and John G. Proakis, is no longer a current estimated value, and the transmission characteristic is seriously degraded.

To improve the characteristic of an adaptive equalizer based on the maximum likelihood sequence estimation scheme, A. P. Clark, J. D. Harvey and J. P. Driscoll have proposed a Near-Maximum-Likelihood detection scheme as a solution to the poor estimation of the transmission line parameters due to the fixed delay of the received signal sample which poses a serious problem in the adaptive maximum likelihood receiver using the maximum likelihood sequence estimation scheme (A. P. Clark, J. D. Harvey and J. P. Driscoll, "Near-Maximum-Likelihood detection processes for distorted digital signals," Radio & Electronics Engineer, Vol. 48, No. 6, pp. 301–309). Moreover, A. P. Clark has proposed an FDM (Frequency Division Multiplexing) system which transmits two signals over the same frequency channel through utilization of the Near-Maximum-Likelihood detection scheme (U.S. Pat. No. 4,862,483). In this system, however, transmission signal sequence candidates (First Vector) to be stored in a memory and sets of transmission line parameters (vectors) corresponding to them are large in number and extended received signal sequence candidates (Second Vector) are sequentially chosen in decreasing order of likelihood as new transmission signal sequence candidates. Consequently, when the likelihood of the transmission signal sequence candidate (First Vector) of the highest likelihood is far higher than the likelihood of the other transmission signal sequence candidates (First Vector), the order of likelihood of the extended signal sequence candidates (Second Vector) is dependent upon the likelihood of the First Vector; hence, there is substantially no possibility of other First Vectors being chosen and no maximum likelihood detection takes place.

On the other hand, Fukawa and Suzuki have proposed, in "Adaptive Equalization with RLS-MLSE for Frequency-Selective Fast Fading Mobile Radio Channels," IEEE Globecom'91, Dec. 2–5, 1991 or "Recursire Least-Squares Adaptive Algorithm Maximum-Likelihood Sequence Estimation with Higher-Order State Variable Model of Radio Channels-Adaptive Performance Improvement of RLS-MLSE-" Journal of the Institute of Electronics, Information and Communication Engineers of Japan, B-II, Vol. J75, No. 7, 1992, a transmission parameter estimation scheme suitable for the maximum likelihood sequence estimation which keeps high-speed, precise track of the fast fading or fast-changing mobile radio channel. An equalizer of this scheme cancels inter-symbol interference but does not cancel co-channel interference, and hence possesses a defect that it does not operate under the co-channel interference environment of high signal level.

The present invention applies the above-mentioned transmission line parameter estimation scheme to an interference canceller using the maximum likelihood sequence estimator and, through utilization of the fading property of the mobile radio channel that the amplitudes and phases of desired and interference signals vary at high speed independently of each other, permits efficient separation of the signals and accurate estimation of the transmission line parameters for the both signals.

A description will be given first, with reference to FIG. 1, of a conventional receiver of the maximum likelihood sequence estimation scheme that has the above-said adaptive equalization feature.

This receiver is made up of: a desired signal estimation part 10 which estimates and outputs a desired signal to be received; an error estimation part 30 which subtracts an estimated received signal $Y_m(n)$ from the desired signal estimation part 10 from a received signal y(n) sampled after being synchronously detected, which is input into a terminal IN with a period T (a signal which is obtained by sub-synchronously detecting the received signal and sampling the detected output and is usually represented by a complex signal which has an in-phase component I and an orthogonal component Q as its real and imaginary parts, respectively) and outputs an estimation error signal $\epsilon$; a state estimation part 40 which calculates the likelihood from the estimation error signal $\epsilon$ to make a maximum likelihood sequence estimation; and a transmission line or channel parameter estimation part 50 which controls the conversion or transformation parameter of the desired signal estimation part 10 on the basis of the output from the state estimation part 40 and the estimation error signal $\epsilon$.

The desired signal estimation part 10 is formed by a transversal filter 11. For example, in a single delay stage, the transversal filter 11 comprises, as shown in FIG. 2A, a delay element 111 of a delay time equal to the sample period T, multipliers 112 and 113 connected to its input and output, respectively, and an adder 114 which adds together the outputs from the multipliers 112 and 113. The state estimation part 40 supplies the transversal filter 11 with estimated transmitted signal sequences $a_m(n)$ and $a_m(n-1)$ composed of complex symbols corresponding to the current point nT and a point one sample before, respectively, which are multiplied in the multipliers 112 and 113 by tap coefficients $h_{m0}$ and $h_{m1}$, respectively. The multiplied outputs are added by the adder 114, whose output is applied as the estimated received signal $y_m(n)$ to the error estimation part 30 shown in FIG. 1. The tap coefficients $h_{m0}$ and $h_{m1}$ of the transversal filter 11 can adaptively be changed by a tap coefficient control part 51 in accordance with the time-varying channel impulse response. The error estimation part 30 subtracts, by an adder 31, the estimated received signal $Y_m(n)$ from the desired signal estimation part 10 from the received signal y(n) fed to the terminal IN and outputs the estimation error signal $\epsilon$. When the received signal does not contain interference components from other stations, the estimation error signal $\epsilon$ is composed of a noise component alone. The estimation error signal $\epsilon$ is fed to a likelihood calculation part 41, wherein it is converted to a likelihood signal.

The likelihood calculation part 41 may be formed by a square multiplier which squares the estimation error $\epsilon$. The likelihood signal $-|\epsilon|^2$ is input into a maximum likelihood sequence estimator 42. When a square multiplier is used as the likelihood calculation part 41, the minimum output from the square multiplier provides the maximum likelihood. The likelihood signal is fed to the maximum likelihood sequence estimator 42 to estimate the transmitted signal sequence.

The maximum likelihood sequence estimator 42 generates and outputs one state sequence candidate vector for the sequence of sequential transition of the received signal. Next, a modulation signal generating part 44 modulates the candidate vector into a transmission signal sequence candidate vector (a vector using a complex symbol) and sends it to the desired signal estimation part 10. The estimation error signal e corresponding to this transmitted signal sequence candidate vector is fed to the state estimation part 40 and converted by the likelihood calculation part 41 into a likelihood signal. Then, another state sequence candidate vector is generated and the corresponding likelihood signal is produced following the same procedure as described above. Thus, the same processing is repeated to obtain the likelihood signal for each possible state sequence candidate. By this, a likelihood signal (called a branch metric) $-|\epsilon|^2$ is provided for every branch possible of transition from each state $S_j(n)$ (j=0, 1, . . . ,M−1) at time nT to each state $S_j(n+1)$ at time (n+1)T. By repeating such processing from time nT to (n+G−1) T, the likelihood signal (i.e. the branch metric) $-|\epsilon|^2$ is obtained for each branch corresponding to each transition. Assuming, for example, that each state $S_j$ (n) at time nT is possible of transition to any of M states at the next time (n+1)T, a total of $M^G$ paths exist which are possible for the transition of an arbitrary one of the M states at time nT to an arbitrary one of the M states at time (N+G−1). According to the maximum likelihood sequence estimation scheme, an accumulated value (corresponding to a path metric) of the likelihood signal $-|\epsilon|^2$ (corresponding to the branch metric) of the branch between two successive points in time is calculated every path for transition and that one of these $M^G$ paths which has the largest path metric (or smallest accumulated value of the square error $|\epsilon|^2$) is estimated to be the state transition sequence of the transmitted signal. Since the state transition sequence corresponds to the signal sequence, it is possible to use the estimated state transition sequence to make a decision of the received signal sequence. The decision output is provided at an output terminal OUTd in FIG. 1.

Such a received signal decision is made by selecting that one of the sequences corresponding to the G input samples which provides the highest likelihood. With a large value set for G, the probability of being the estimated state sequence being correct is high and the maximum likelihood detection is provided, but since the total number $M^G$ of paths used increases exponentially, the total amount of processing required also increased exponentially. On the other hand, a small value for G decreases the total amount of processing involved but lessens the probability of the estimated state sequence being correct. With the Viterbi algorithm which is one of the maximum likelihood sequence estimation schemes, the branch metrics of M branches for transition from each state at the immediately preceding point in time are calculated for each state at each time point and the branch metrics thus calculated are added respective path metrics until the immediately preceding time; then, that one of the paths which has the largest path metric (i.e. the highest likelihood) is selected and the remaining paths are discarded. In this way, the Viterbi algorithm reduces the total amount of processing involved.

Incidentally, according to the maximum likelihood sequence estimation scheme which is known as a signal decision scheme, upon each input of the signal sample value y(n), a new path metric is calculated for each state $S_j(n)$ (j=1, 0, . . . ,M−1) as described above, then that one of the paths which provides the highest likelihood (or the largest path metric) is decided to be the path used for signal transition and a signal decision value is produced calculating the path metric in the past.

The tap coefficient control part 51 comprises, as shown in FIG. 2B, a tap coefficient storage part 511, a tap coefficient change-over switch 512 and a tap coefficient updating part 513. The tap coefficient storage part 511 is a circuit which stores sets of tap coefficients (tap coefficient vectors) corresponding to respective states. The tap coefficient change-over switch 512 selects from the tap coefficient storage part 511 the tap coefficient vector corresponding to each state and feeds it to the transversal filter 11. Upon completion of updating the path metric for each state in the maximum likelihood sequence estimator 42, the tap coefficient updating part 513 updates the plurality of sets of tap coefficients (a plurality of tap coefficient vectors) stored in the tap coefficient storage part 511 in correspondence to the respective states. The updating of the tap coefficients is performed using the signal sequence outputted from the state estimation part 40 and the estimation error signal e from the error estimation part 30. This updating is carried out, by a known RLS, LMS (Least Mean-Square) or similar adaptation algorithm, for each tap coefficient vector corresponding to each state so that the square $|\epsilon|^2$ of the estimation error signal is reduced. Consequently, the thus updated tap coefficient vector for each state reflects the current channel impulse response; hence, when the radio channel moves at high speed with time due to fading as in mobile radio communication, the channel tracking property improves, providing an excellent receiving characteristic.

The maximum likelihood sequence estimation (MLSE) scheme, which is used as a signal decision scheme, is an estimation scheme that calculates the likelihood for all possible complex symbol sequence candidates and selects, as the signal decision value, that one of the complex symbol sequence candidates which provides the highest likelihood. As the complex symbol sequence becomes longer, the number of possible sequences increases exponentially; it is therefore a general practice in the art to use a state estimation scheme which reduces the number of sequences and hence suppresses the total amount of processing through utilization of the Viterbi algorithm.

In an adaptive equalizer which is used to cancel a channel distortion by known multi-path propagation, a delay wave (letting its maximum delay time be an Ld symbol time) is taken into account. In this case, however, assume that no co-channel interference signal exists.

Representing the complex symbol at time t=nT by a(n), the state S(n) at time t=nT is defined by a sequence of values of immediately preceding Ld selected complex symbol candidates and is expressed by the following equation.

$$S(n)=\{a(n-1), a(n-2), \ldots, a(n-Ld+1), a(n-Ld)\} \quad (1)$$

Here, in the case of an M-ary signaling modulation system, the complex symbol candidates $a(n-1)$, $a(n-2)$, ..., $a(n-Ld+1)$, $a(n-Ld)$ each take one of M complex symbols $C_p$ ($0 \leq p \leq M-1$). The complex symbol herein mentioned represents a signal whose in-phase and quadrature-phase components I and Q correspond to real and imaginary parts, respectively. Accordingly, the total number of states S(n) at time t=nT is $M^{Ld}$. For example, in the case of BPSK signaling modulation, the complex symbol $C_p$ is as follows:

$$\begin{aligned} C_p &= 1 \quad (p=0) \\ &= -1 \quad (p=1) \end{aligned} \quad (1\text{-}A)$$

Hence, the total number of states is $2^{Ld}$. In the case of QPSK signaling modulation, the complex symbol $C_p$ is as follows:

$$\begin{aligned} C_p &= \frac{1}{\sqrt{2}} + j\frac{1}{\sqrt{2}} \quad (p=0) \\ &= -\frac{1}{\sqrt{2}} + j\frac{1}{\sqrt{2}} \quad (p=1) \\ &= -\frac{1}{\sqrt{2}} - j\frac{1}{\sqrt{2}} \quad (p=2) \\ &= \frac{1}{\sqrt{2}} - j\frac{1}{\sqrt{2}} \quad (p=3) \end{aligned} \quad (1\text{-}B)$$

where j is the imaginary unit, and the total number of states is $4^{Ld}$.

To cancel the delay signal component (a multi-path component) having propagated through a different transmission path, a delay of about one- or two-symbol time needs only to be considered in practice, though dependent on the symbol rate of the transmitted signal; hence, one or two delay stages of the transversal filter in actual receivers, for instance, produces the intended effect. The transversal filter 11 with one delay stage (Ld=1) and an m-th transmitted symbol sequence candidate $\{a_m(n-1), a_m(n)\}$ which is provided to the filter are such as referred to previously with respect to FIG. 2A.

FIG. 2C is a state transition trellis diagram in the case of QPSK modulation. In the case of one delay stage (one-symbol delay), the number of states at each point in time is $4^{Ld}=4^1=4$ and transition is allowed to each state from any state at the immediately preceding time. Now, let a j-th state at time nT be represented by $S_j(n)$, where $0 \leq j \leq 3$, and when time elapses from nT to (n+1)T, the state transition occurs. In this instance, each state at time nT is possible of transition to any states at time (n+1)T; hence, one state is allowed to transition to four states. As shown in FIG. 2C, each state branches into four states, which, in turn, merge into one state. To select one of four merging transitions, the Viterbi algorithm uses the path metric $J_c[S_j'(n+1), S_j(n)]$ of a path for transition to the state $S_j'(n+1)$ via the state $S_j(n)$.

The path metric $J_c[S_j'(n+1), S_j(n)]$ of the path for transition to the state $S_j'(n+1)$ via the state $S_j(n)$ is computed by the following equation, using a branch metric $\Lambda[S_j'(n+1), S_j(n)]$.

$$J_c[S_j'(n+1), S_j(n)]=J[S_j(n)]+\Lambda[S_j'(n+1), S_j(n)] \quad (2)$$

In the above, $$\Lambda[S_j'(n+1), S_j(n)]=-|\epsilon_m(n)|^2 \quad (3)$$

where $\epsilon_m(n)$ is an estimation error expressed by $\epsilon_m(n)=y(n)-y_m(n)$ and $J[S_j(n)]$ is the path metric surviving at the state $S_j(n)$ at time nT, which corresponds to the likelihood. The m-th complex symbol sequence candidate in the state transition from $S_j(n)$ to $S_j'(n+1)$ is expressed by $\{a_m(n), a_m(n+1)\}$. In the Viterbi algorithm, $$\begin{aligned} J[S_j'(n+1)] &= \text{MAX}\{J_c[S_j'(n+1), S_j(n)]\} \\ &= \text{MAX}\{J[S_j(n)] + \Lambda[S_j'(n+1), S_j(n)]\} \end{aligned} \quad (2)'$$

where MAX represents the maximum value when the value j is changed from 0 to 3. Equation (2)' is used to select the path metric $J[S_j'(n+1)]$ at time (n+1)T. Letting the value j which provides the maximum value in the right side of Eq. (2)' be represented by $j_{max}$, the path that survives in this case is a path which reaches the state $S_j'(n+1)$ via $Sj_{max}$. Repeating this operation thereafter, paths of the same number as the states survive at each point in time. These paths are called survivors. Incidentally, because of the limited space of the memory used, the time sequence of states that are stored usually goes back only to previous time (D−Ld+1)T (where $D \geq Ld$ and T is the symbol period); when the remaining paths do not merge at the previous time (D−Ld+1)T, the signal decision is made going back by a period DT on the basis of the path which has the maximum likelihood or the largest path metric at the current point in time. The signal that is decided in this case is a signal delayed by DT relative to the current point, and DT is called a decision delay time (G. Ungerboeck, "Adaptive maximum likelihood receiver for carrier-modulated data-transmission systems," IEEE Trans. Commun., vol. COM-22, pp. 624–636, 1974).

Incidentally, in the receiver using the maximum likelihood sequence estimator with the adaptive equalization feature, the error estimation part 30 in FIG. 1 calculates the difference between the received signal and the desired signal estimated for reception to obtain an estimation error signal and the likelihood calculation part 41 calculates the likelihood. Hence, when an interference signal, such as an inter-symbol interference signal, is caused by a delayed signal of its own, its replica is generated which can be used to cancel the influence of the inter-symbol interference. When the received signal contains an interference signal from another station, the interference signal component still remains in an estimation error signal and at the output of the likelihood calculation part 41 it is regarded as similar to noise—this presents a problem that the receiving performance is seriously impaired. In mobile radio communication in which each cell may sometimes receive a co-channel interference signal from an adjacent cell, in particular, there is a strong demand for cancelling the influence of the interference signal.

SUMMARY OF THE INVENTION

An object of the present invention is to provide a receiver with an interference cancelling feature which makes an interference signal estimation not only for a desired received signal but also for an interference signal from another station and subtracts the desired received signal and the estimated interference signal from the received signal to cancel the interference signal component contained in an estimation error signal and hence provide an excellent receiving performance for the received signal containing the interference signal from another station. Another object of the present invention is to provide an interference cancelling method.

According to the present invention, a desired signal sequence candidate corresponding to the state transition of the desired signal which is to be received and an interference signal sequence candidate corresponding to the state transition of the interference signal from another station are generated in a state estimation part. Then, an estimated desired signal which is to be received and an estimated interference signal which is to be received are generated from the above-mentioned candidates in a desired signal estimation part and an interference signal estimation part, respectively. The estimated desired signal and the estimated interference signal are subtracted in an error estimation part from the received signal to compute estimation error signals. The state estimation part estimates a desired signal sequence and an interference signal sequence on the basis of the estimation error signals obtained for the respective candidates. A channel parameter estimation part controls conversion parameters of the desired signal estimation part and the interference signal estimation part by an adaptation algorithm on the basis of the estimated desired signal and interference signal sequences and the estimation error signals.

For the same set of signal sequence candidates as the set of transmitted correct desired signal and interference signal sequences, the interference signal component has been removed, and hence the estimation error signal becomes a noise component alone. Consequently, the maximum likelihood estimation of the received signal is free from the influence of the interference signal; so that even if the received signal contains an interference signal, it is possible to provide an excellent receiving performance unaffected by the interference signal.

DESCRIPTION OF THE PREFERRED EMBODIMENTS

Figure 3:
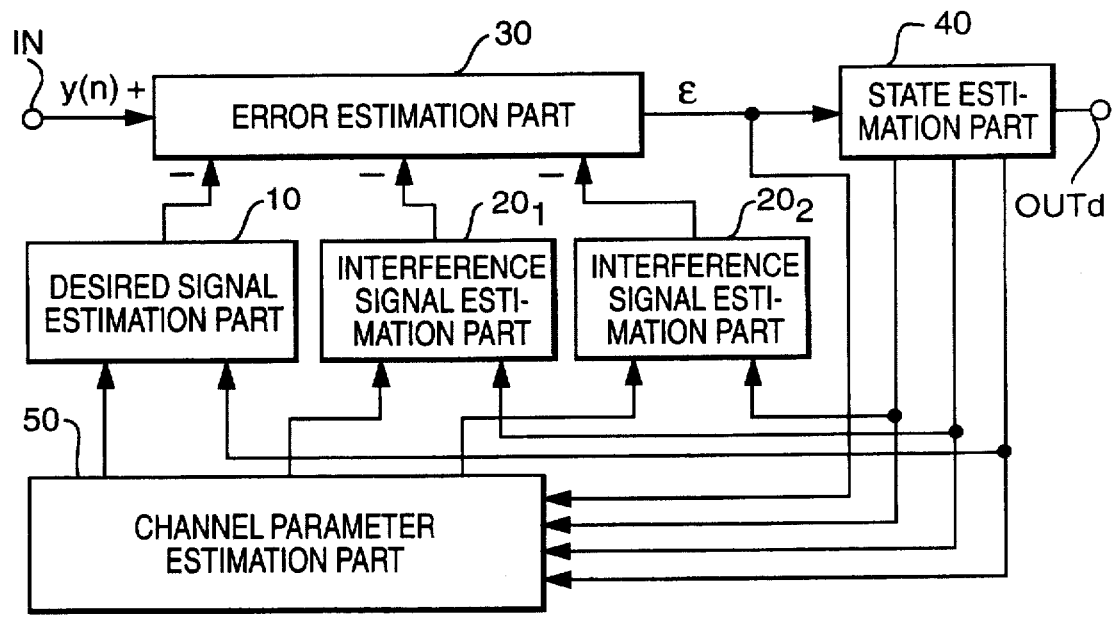
FIG. 3 is a block diagram illustrating the conceptual construction of the present invention.

FIG. 3 illustrates in block form the conceptual configuration of a first embodiment of the receiver according to the present invention.

Figure 1:
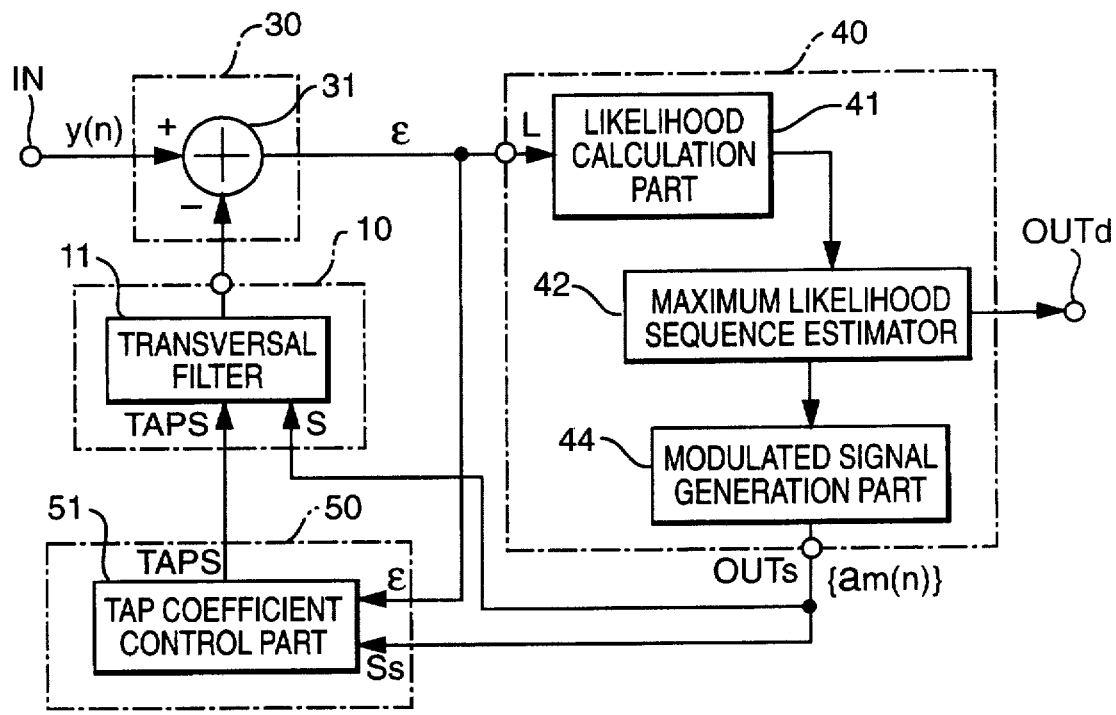
FIG. 1 is a block diagram of a receiver using a maximum likelihood sequence estimator with a conventional adaptive equalization feature.

This embodiment, as compared with the prior art example of FIG. 1, features a configuration wherein the received interference signal is also estimated and subtracted from the received signal to cancel the interference signal component contained in the estimation error signal, thereby providing increased likelihood of estimation of the desired signal to receive by the state estimation part. That is, at least one received interference signal estimation part for generating an estimated received interference signal is added to the FIG. 1 configuration; in this embodiment, two received interference signal estimation parts $20_1$ and $20_2$ are provided and the error estimation part 30 generates the estimation error signal $\epsilon$ by subtracting the estimated received desired signal and the estimated received interference signal from the received signal y(n) fed to the input terminal IN. The state estimation part 40 generates a plurality of desired signal sequence candidates (candidates for the desired signal estimated to have been transmitted to the local station from the radio station communicating therewith) corresponding to a plurality of transition states of the desired signal and provides the candidates to the desired signal estimation part 10, while at the same time the state estimation part 40 generates a plurality of interference signal sequence candidates (candidates for the interference signal estimated to have been transmitted to another station which interferes with the local station) corresponding to a plurality of transition states of each interference signal and provides the candidates to the interference signal estimation parts $20_1$ and $20_2$. The estimation error signal $\epsilon$, which is obtained corresponding to the desired signal sequence candidates and the interference signal sequence candidates, is used to calculate the likelihood, which is used to estimate the desired signal sequence and the interference signal sequence that are contained in the received signal y(n). Based on the estimation error signal and the desired and interference signal sequences, the channel parameter estimation part 50 controls, by an adaptation algorithm, conversion parameters of the desired signal estimation part 10 and the interference signal estimation parts $20_1$ and $20_2$, that is, the channel impulse response.

Figure 4:
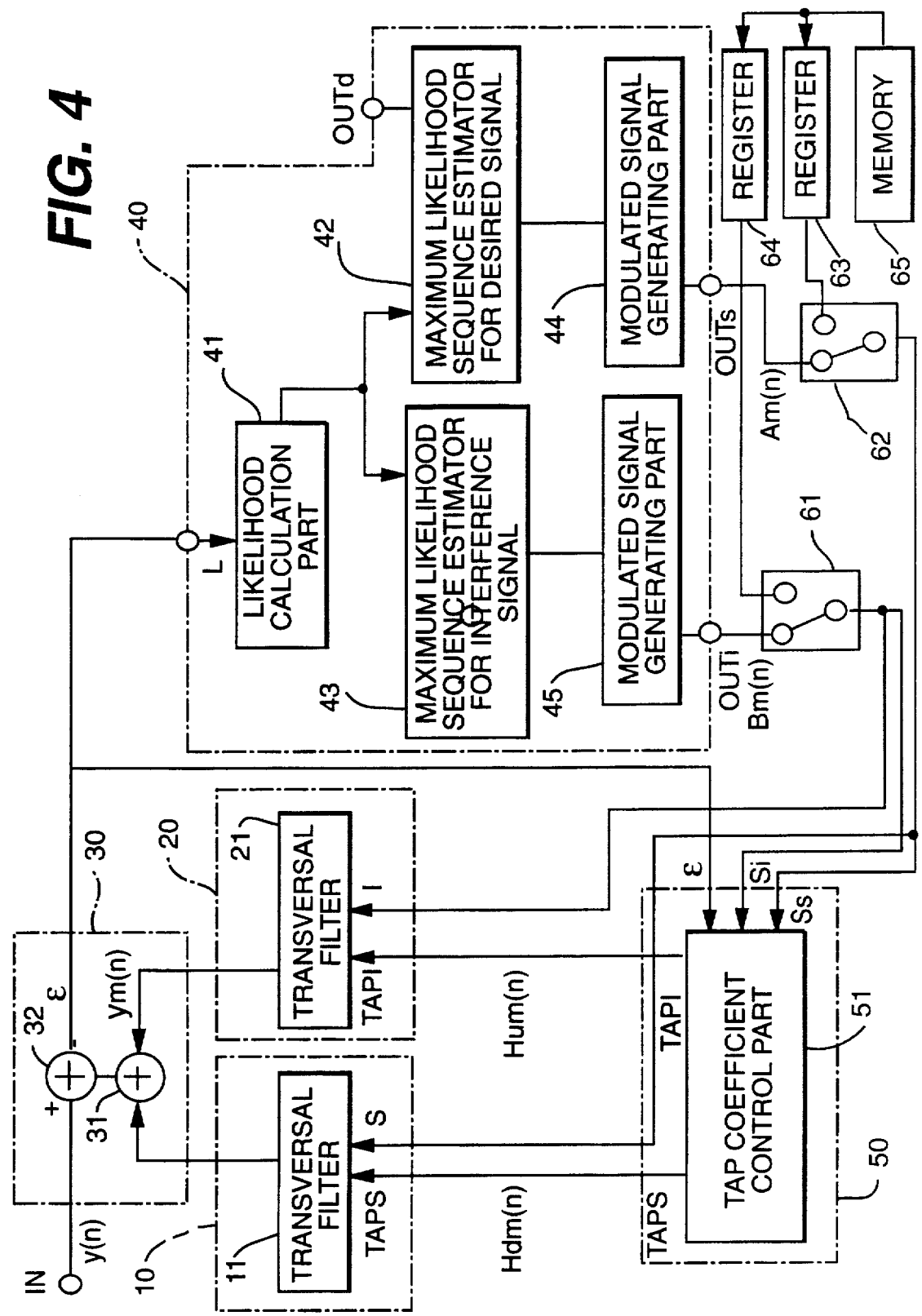
FIG. 4 is a block diagram of a specific operative example of the present invention.

FIG. 4 is a block diagram illustrating a concrete configuration of the FIG. 3 embodiment. The FIG. 4 embodiment is shown to cancel one interference signal contained in the received signal, and when it is desirable to cancel a plurality of interference signals which are usually contained in the received signal, those parts of the interference signal estimation part 20, the channel parameter estimation part 50 and the state estimation part 40 which are related to the interference signals need only to be extended by the number of interference signals desired to cancel.

In the FIG. 4 embodiment, the desired signal estimation part 10 and the interference signal estimation part 20 are formed by transversal filters 11 and 21, respectively. The error estimation part 30 is made up of an adder 31 which adds the estimated received desired signal and the estimated received interference signal, and a subtractor 32 which subtracts the added output $y_m(n)$ of the adder 31 from the received signal y(n) applied to the terminal IN and outputs the estimation error signal $\epsilon$.

The state estimation part 40 comprises: a likelihood calculation part 41 which calculates the likelihood from the estimation error signal; a maximum likelihood sequence estimator 42 which generates a signal sequence candidate corresponding to the state of transition of the desired signal and makes a decision of the desired signal sequence on the basis of the likelihood signal that is provided from the likelihood calculation part 41 corresponding to the desired signal sequence; a maximum likelihood sequence estimator 43 which generates a signal sequence candidate corresponding to the state of transition of the interference signal and makes a decision of the interference signal sequence on the basis of the likelihood signal corresponding thereto; a modulated signal generating part 44 which converts the desired signal sequence candidate into a modulated signal waveform sequence; and a modulated signal generating part 45 which converts the interference signal sequence candidate into a modulated signal waveform sequence.

Figure 2A:
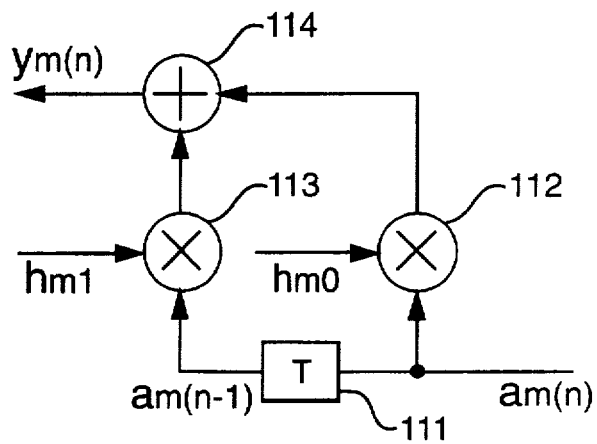
FIG. 2A is a block diagram of a transversal filter with two taps in FIG. 1.
Figure 2B:
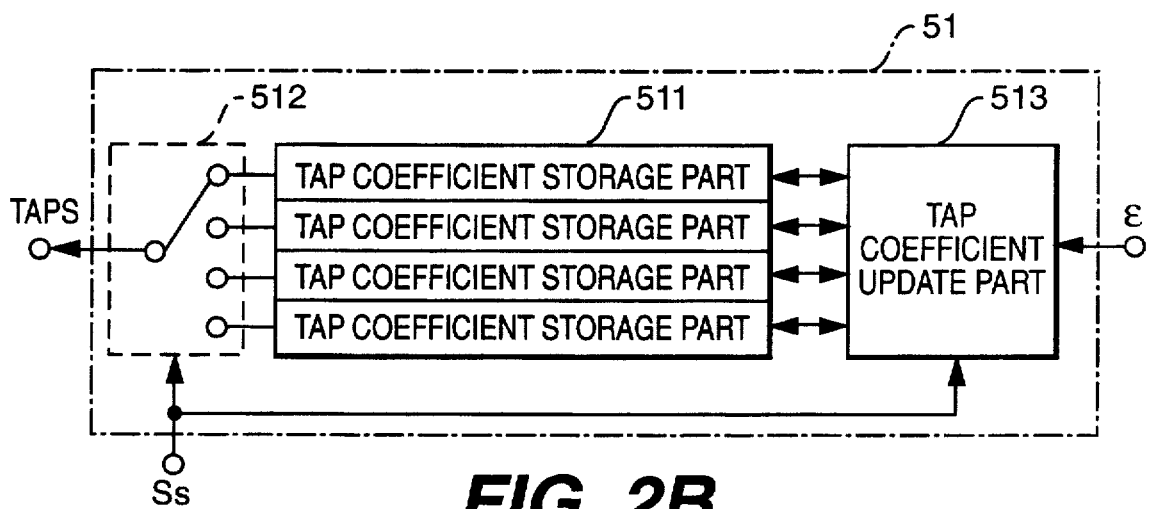
FIG. 2B is a block diagram of a tap coefficient control part in FIG. 1.
Figure 2C:
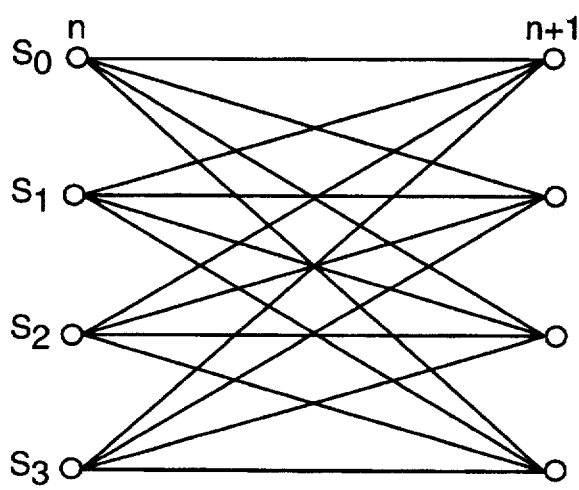
FIG. 2C is a trellis diagram showing the state transition when the number of states is 4.
Figure 5:
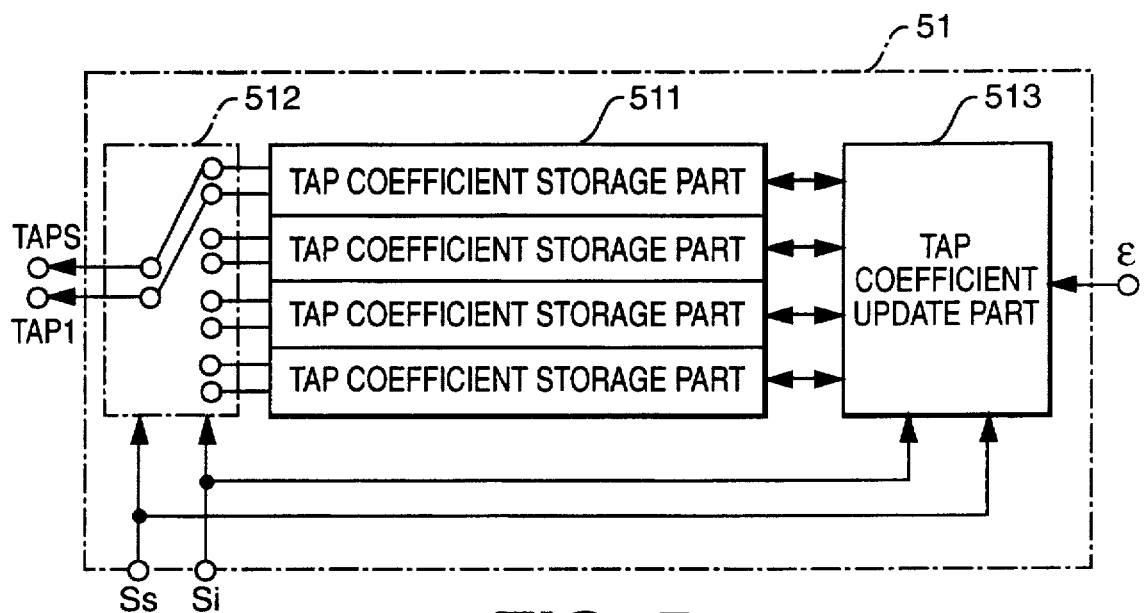
FIG. 5 is a block diagram of a tap coefficient control part in FIG. 4.

The channel parameter estimation part 50 is formed by a tap coefficient control part 51 which controls the tap coefficients of the transversal filter 11 for the desired signal and the transversal filter 21 for the interference signal. The tap coefficient control part 51 comprises, as shown in FIG. 5, a tap coefficient storage part 511, a tap coefficient change-over switch 512 and a tap coefficient updating part 513. The tap coefficient control part 51 differs from the conventional tap coefficient control part of FIG. 2B in that the configuration for the interference signal is added to the configuration for the desired signal. The tap coefficient storage part 511 holds a set of tap coefficients (vectors) for each state into which both the desired signal and the interference signal can transit. The tap coefficient update part 513 updates the tap coefficient vectors prepared for each state by an RLS, LMS or similar adaptation algorithm. The tap coefficient change-over switch 512 selects tap coefficients corresponding to the states of the desired signal and the interference signal that are outputted from the state estimation part 40, the selected tap coefficients being provided to the desired signal estimation part 10 and the interference signal estimation part 20.

Letting the transmitted complex symbol sequence vector of the desired signal at time nT, the impulse response vector of the channel for the desired signal, the transmitted complex symbol sequence vector of a q-th interference signal of Q-wave interference signal and the impulse response vector of the channel for the q-th interference signal be represented by $C_d(n)$, $H_d(n)$, $C_{uq}(n)$ and $H_{uq}(n)$, respectively, the quasi-coherently detected signal sample value $y(n)$ can be expressed as follows:

$$y(n) = C_d^H(n)H_d(n) + \sum_{q=1}^{Q} C_{uq}^H(n)H_{uq}(n) + N(n) \quad (4)$$

where $\Sigma$ indicates the summation from $q=1$ to $Q$ and the superscript H indicates a complex conjugate transposition.
Furthermore, $$C_d^H(n)=[a(n-L_d), a(n-L_d+1), \ldots, a(n)] \quad (5)$$

$$C_{uq}^H(n)=[b(n-L_{uq}), b(n-L_{uq}+1), \ldots, b(n)] \quad (6)$$

where $a(n)$ and $b(n)$ represent complex symbols of the desired signal and the interference signal at time $nT$, respectively. For example, in the case of the QPSK modulation system, $a(n)$ and $b(n)$ each take any one of four complex symbols $C_p$ (where $0 \leq p \leq 3$) expressed by Eq. (1-B). The transmitted complex symbol vectors $C_d(n)$ and $C_{uq}(n)$ are each one that uses any one of the four kinds of complex symbols as its element. $H_d(n)$ and $H_{uq}(n)$ are channel impulse response vectors that are expressed as follows:

$$H_d(n)=[h_d(L_d), h_d(L_d-1), \ldots, h_d(0)]^T \quad (7)$$

$$H_{uq}(n)=[h_{uq}(L_{uq}), h_{uq}(L_{uq}-1), \ldots, h_{uq}(0)]^T \quad (8)$$

$N(n)$ is the sample value of white noise after the passage through a low-pass filter. $L_d$ and $L_{uq}$ are non-negative integers the impulse response time lengths (delay times) of the channel for the desired signal and the interference signal which need to be taken into account.

A description will be given, with reference to FIG. 4, of the case where the desired signal and the interference signal are each single.

The transversal filters 11 and 21 each calculate the inner product of the signal sequence candidate vector input thereinto and the tap coefficient vector provided from the tap coefficient control part 51 (a convolutional operation of the signal sequence candidate and the tap coefficient) and output the calculated result. That is, a complex symbol sequence candidate vector $$A_m^H(n)=[a_m(n-L_d), a_m(L_d+1), \ldots, a_m(n)] \quad (9)$$

which is a transmitted signal sequence candidate from the modulated signal generating part 44 for the desired signal is provided as the input signal sequence to the transversal filter 11, while at the same time a channel impulse response estimated value for the desired signal, which is outputted from the tap coefficient control part 51, is provided to the transversal filter 11 as a tap coefficient vector $$H_{dm}(n-1)=[hd_m(L_d)h_{dm}(L_d-1), \ldots, h_{dm}(0)]^T \quad (10)$$

The transversal filter 11 calculates the inner product of the complex symbol sequence candidate vector and the tap coefficient vector $H_{dm}(n-1)$ (a convolutional operation) and provides the calculated output as an estimated received signal. Similarly, a complex symbol sequence candidate vector $$B_m^H(n)=[b_m(n-Lu), b_m(n-L_u+1), \ldots, b_m(0)] \quad (11)$$

which is the transmitted interference signal sequence from the modulated signal generating part 45 for the interference signal is provided as the input signal sequence to the transversal filter 21, while at the same time a channel impulse response estimated value for the interference signal is provided to the transversal filter 21 as a tap coefficient vector $$H_{um}(n-1)=[h_{um}(L_u), h_{um}(L_u-1), \ldots, h_{um}(0)]^T \quad (12)$$

The transversal filter 21 calculates the inner product of the signal sequence candidate vector $B_m^H$ and the tap coefficient vector $H_{um}(n-1)$ (a convolutional operation) and provides the calculated output as an estimated received interference signal. The estimated received desired signal from the transversal filter 11 and the estimated received interference signal from the transversal filter 21 are added by the adder 31, which yields the added output as the signal estimated value $y_m(n)$. This estimated value $y_m(n)$ can be expressed by the following equation.

$$y_m(n)=A_m^H(n)H_{dm}(n-1)+B_m^H(n)H_{um}(n-1) \quad (13)$$

The signal estimated value $y_m(n)$ is subtracted by the subtractor 32 from the quasi-coherently detected sample value $y(n)$ from the input terminal IN and the difference is provided as the estimation error signal $\epsilon=\alpha_m(n)$. The square of the estimation error $\epsilon$ is calculated by the likelihood calculation part 41. The maximum likelihood sequence estimator 42 for the desired signal selectively outputs in succession all desired signal sequence candidate vectors which are determinedly a predetermined number of previous states and the states into which the previous ones are possible of transition. The signal sequence candidates thus provided are each modulated in the modulated signal generating part 44, from which it is outputted as the desired signal complex symbol sequence candidate vector $A_m(n)$. Likewise, the maximum likelihood sequence estimator 43 outputs a selected one of the interference signal sequence candidates upon each calculation of the likelihood. The output from the interference signal maximum likelihood sequence estimator 43 is modulated by the modulated signal generating part 45, from which it is provided as the interference signal complex symbol sequence candidate vector $B_m(n)$. The desired signal maximum sequence estimator 42 and the interference signal maximum sequence estimator 43 compare, in terms of likelihood, respective combinations of their outputted desired and interference signal sequence candidate vectors $A_m(n)$ and $B_m(n)$ and store, for each state, the combination of vectors $A_m(n)$ and $B_m(n)$ which provides the maximum likelihood, together with the path for signal transition at that time.

In the above, the present invention has been described in connection with the case where the desired and interference signals are both single, but in general, when the interference signal is Q-wave, the invention can be extended accordingly. Let the complex symbol sequence candidate vector of the estimated transmitted interference signal from the q-th interference wave modulated signal generating part be represented by $$B_{qm}^H(n)=[b_{qm}(n-L_{uq}), b_{qm}(n-L_{uq}+1), \ldots, b_{qm}(n)] \quad (14)$$

and the tap coefficient vector of the transversal filter for the q-th interference signal by $$H_{uqm}(n-1)=[h_{uqm}(L_{uq}), h_{uqm}(L_{uq}-1), \ldots, H_{uqm}(0)]T \quad (15)$$

The inner product of the signal sequence candidate vector and the tap coefficient vector is calculated (a convolutional operation) and the calculated output is provided as an estimated received interference signal for the q-th interference signal. Such estimated received interference signals for the Q waves are added together by an adder, the output of which is added by the adder 31 with the estimated received desired signal from the transversal filter 11 to obtain the signal estimated value $y_m(n)$. This estimated value $Y_m(n)$ can be expressed by the following equation.

$$y_m(n) = A_m^H(n)H_{dm}(n-1) + \sum_{q=1}^{Q} B_{qm}^H(n)H_{uqm}(n-1) \quad (16)$$

where $\Sigma$ indicates the summation from q=1 to Q.

Then, desired signal sequence candidates and interference signal sequence candidates are selectively outputted one after another from the desired signal maximum likelihood sequence estimator 42 and interference signal maximum likelihood sequence estimators $43_1$–$43_Q$ and the likelihood corresponding to them is calculated to estimate the sequences of desired signal and a plurality of interference signals which provide the maximum likelihood.

Figure 6:
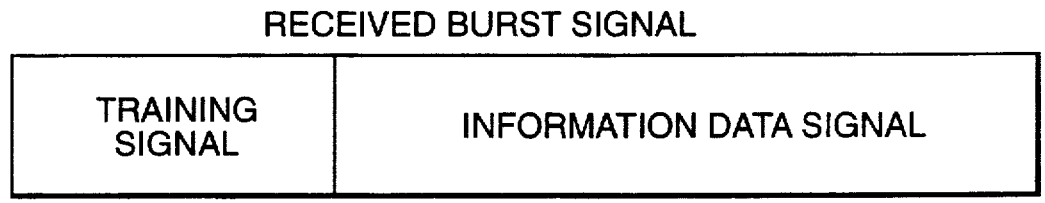
FIG. 6 is a diagram showing the configuration of a received burst signal.

Let it be assumed, for example, that each base station transmits with such a burst configuration as shown in FIG. 6, wherein a training signal (a training pattern) of a unique signal sequence is added to the beginning, intermediate portion or end of a data signal. Signals from base stations other than that transmitting a desired signal are regarded as interference signals. According to this embodiment, in the training period or section of the received signal, preknown training signals for the desired and interference signals are fed by change-over switches 61 and 62 to the transversal filters 11 and 21 to converge conversion parameters (i.e. tap coefficients) therefor through training. A training pattern of the base station which is being currently selected for reception (i.e. a training pattern for the desired signal) and a training pattern of another base station which forms an interference signal (i.e. a training pattern for the interference signal), both read out of a memory 65, are preset in training pattern registers 63 and 64, respectively.

During reception of the training signal contained in the received burst signal, the change-over switches 61 and 62 are connected to the registers 63 and 64 to provide therefrom the desired signal training pattern and the interference signal training pattern to the desired signal estimation part 10, the interference signal estimation part 20 and the channel parameter estimation part 50. The channel parameter estimation part 50 controls the conversion parameters of the desired signal estimation part 10 and the interference signal estimation part 20 to determine the tap coefficient vectors $H_{dm}(n)$ and $H_{um}(n)$ which minimize the square $|\epsilon|^2$ of the output error $\epsilon$ of the subtractor 32. This permits an accurate estimation of the channel impulse response for the desired signal and the channel impulse response for the interference signal, and hence provides increased accuracy in the signal estimation by the desired and interference signal estimation parts 10 and 20. It is preferable that the training patterns unique to respective base stations be patterns which are high in the auto-correlation of symbol sequences of their own but low in the cross-correlation between the patterns themselves. With the use of training patterns whose symbol patterns are orthogonal to each other, it is possible to generate the desired and interference signal components separately with a particularly high degree of accuracy. When a plurality of interference signals are present, they can be separately generated with high accuracy by making the symbol sequences of their training signals orthogonal to each other.

Thus, in the embodiment of FIG. 4, it is necessary to preknow the training signals for the interference signal as well as for the desired signal. To this end, training patterns of all base stations that are likely to receive are prestored in the memory 65. The training pattern for the interference signal may be such as follows: Of training signals of other base stations which are expected to interfere with signals from a particular base station currently selected to receive, the training pattern which has the highest correlation to the composite received signal of the training section or period from the currently interfering base station is selected for use as the training pattern for the interference signal. Similarly, such training patterns can be provided for a plurality of interference signals. As described later with reference to FIG. 16, a tentative symbol decision is made using the estimation error signal which is provided from the error estimation part 30 in the training process for the desired signal, then the decision result is used to estimate an unknown training signal for the interference signal and the estimated signal is used as the training signal for the interference signal. Alternatively, as described later, the training signal for the interference signal can be estimated by the tentative symbol decision even if the training pattern of the interference signal is unknown. In the cellular automobile telephone system, information about training signals of an interfering station and a station suffering the interference is transmitted following a predetermined procedure under control of the mobile station or base station side and is used to effect switching control, by which the training signals for the desired and interference signals can be made preknown.

In the data signal section or period, the channel impulse response may be estimated using complex symbol signal sequence candidates for the desired and interference signals by connecting the switches 61 and 62 to the outputs of the modulation circuits 44 and 45, respectively.

Next, a description will be given mainly of the processing of the received signal in the FIG. 4 embodiment after the tap coefficient vectors for the transversal filters 11 and 21 have been determined as described above. In this embodiment, the state estimation part is described to make the maximum likelihood sequence estimation for the signal component of each of the desired and interference signals.

The desired signal maximum likelihood sequence estimator 42 sequentially generates all candidates for the signal sequence representing the state of transition of the desired signal and provides them to the modulated signal generating part 44. The modulated signal generating part 44 modulates the candidates for the signal sequence representing the state of transition of the desired signal and provides at a terminal OUTs transmitted desired signal sequence vector candidates which are complex symbol sequence candidates. At the same time, that one of these symbol sequence candidates which has the maximum likelihood (i.e. the smallest square error $|\epsilon|^2$) is provided as a decided received signal at the terminal OUTs. On the other hand, the interference signal maximum likelihood sequence estimator 43 sequentially generates all candidates for the signal sequence representing the state of transition of the interference signal and provides them to the modulated signal generating part 45. The modulated signal generating part 45 modulates the candidates for the signal sequence representing the state of transition and provides at terminal OUTi transmitted interference signal sequence vector candidates which are complex symbol sequence candidates.

For instance, in the case where the communication system employs a quadrature phase shift keying modulation system (QPSK) and a delay wave (Ld=1) up to one symbol delay is taken into account, there exist the four complex symbols Cp ($0 \leq p < 3$) expressed by Eq. (1-B) on the basis of combinations "00", "01", "11" and "10" of transmitted binary data of two bits "1" and "0."

The state $S_j$ (n) at this time is expressed by $$S_j(n)=\{a(n-1)\} \quad (17)$$

where the integer j is a subscript for distinguishing the four states from one another; for example, the state in which a(n−1) takes the complex symbol $C_j$ is expressed by $S_j(n)$, and consequently $0 \leq j < 3$. Thus, the modulated signal generating part 44 for the desired signal and the modulated signal generating part 45 for the interference signal each receive the time sequence signal vector of this state $S_j$ and generate the modulated output corresponding to this state of transition. More specifically, in the QPSK system, either one of two values that can be taken for each of an in-phase component (I channel) and a quadrature component (Q channel) is generated for four states that can be taken, and the complex transmitted symbol sequence candidate vector $A_m(n)$ is outputted which uses as its element the complex symbol using the generated values as I and Q channel components. In a 16 QAM system, 16 signal states are each assigned any one of four values that can be taken for each of the I and Q components and the complex transmitted symbol sequence candidate vector $A_m(n)$ is outputted which uses as its element the complex symbol using them as I and Q channel components.

The transmitted desired signal sequence candidate and the transmitted interference signal sequence candidate thus outputted from the state estimation part 40 are input into the desired signal estimation part 10 and the interference signal estimation part 20, respectively. The desired signal estimation part 10 converts the transmitted desired signal sequence candidate into an estimated received signal and the interference signal estimation part 20 converts the transmitted interference signal sequence candidate into an estimated received interference signal. As referred to previously, this embodiment uses transversal filters as the desired and interference signal estimation parts 10 and 20. The tap coefficients of the transversal filters 11 and 21, determined using the training patterns described previously, are set in the tap coefficient control part 51 via terminals TAPS and TAPI. The tap coefficients of the transversal filters 11 and 21 represent the impulse responses of the desired and interference signal channels. Hence, the outputs from the transversal filter 11 for the desired signal and the transversal filter 21 for the interference signal constitute the estimated received desired signal and the estimated received interference signal that reflect the conditions of the channels such as channel distortions.

The received signal is applied to the terminal IN; in this example, the sample value y(n) of the received signal expressed by Eq. (4) will be handled as mentioned previously. The adder adds together the estimated received desired signal from the received desired signal estimation part 10 and the estimated received interference signal from the received interference signal estimation part 20 and outputs the estimated signal $y_m(n)$ given by Eq. (13). Thus, if the signal sequence candidate selectively outputted from the interference signal maximum likelihood sequence estimator 43 is the same as the corresponding signal sequence of the transmitted interference signal, the subtraction of the above-said adder output from the received signal sample value y(n) by the subtractor 32 provides therefrom an output signal which is free from the interference signal component and contains only a noise component N(n). When a plurality of interference waves exist, the plurality of interference wave components can similarly be cancelled by obtaining the sum of estimated received interference signals corresponding to all of the interference waves by means of a plurality of adders and then subtracting the sum from the received signal.

The estimation error signal ε which is outputted from the error estimation part 30 is converted by the likelihood calculation part 41 of the state estimation part 40 into a likelihood signal. The likelihood calculation part 41 may be formed by, for example, a square circuit which squares the estimation error signal ε. In this case, the log likelihood (the branch metric) Lm for the m-th candidate is given by the following equation.

$$Lm=-|\epsilon|^2=-|y(n)-y_m(n)|^2 \quad (18)$$

The likelihood signal is input into the desired signal maximum likelihood sequence estimator 42 and the interference maximum likelihood sequence estimator 43, wherein it is used for the estimation of the desired and interference signal sequences. When a plurality of interference signals are present, a plurality of interference signal maximum likelihood sequence estimators 43 are prepared to make the sequence estimation for the respective interference signals.

Next, the operations of the desired signal maximum likelihood sequence estimator 42 and the interference signal maximum likelihood sequence estimator 43 will be described. The desired signal maximum likelihood sequence estimator 42 sequentially outputs a plurality of desired signal sequence candidates and supplies them to the desired signal estimation part 10 via the modulated signal generating part 44. At the same time, the interference signal maximum likelihood sequence estimator 43 also sequentially outputs a plurality of interference signal sequence candidates and provides them to the interference signal estimation part 20 via the modulated signal generating part 45. Then, likelihood signals are obtained corresponding to respective combinations of such desired and interference signal sequence candidates; desired and interference signal sequence candidates of that combination which maximizes the likelihood of the likelihood signal (i.e. minimizes the square error $|\epsilon|^2$) are selected as desired and interference signal sequences, respectively. In this instance, the desired signal sequence is selected by the desired signal maximum likelihood sequence estimator 42 and the interference signal sequence by the interference signal maximum likelihood sequence estimator 43. It is also possible to obtain likelihood signals for all combinations of the desired and interference signal sequence candidates and estimate the desired and interference signal sequences; the amount of processing required can be reduced by limiting the number of paths representing the state transitions of signals through utilization of the viterbi algorithm.

Figure 7A:
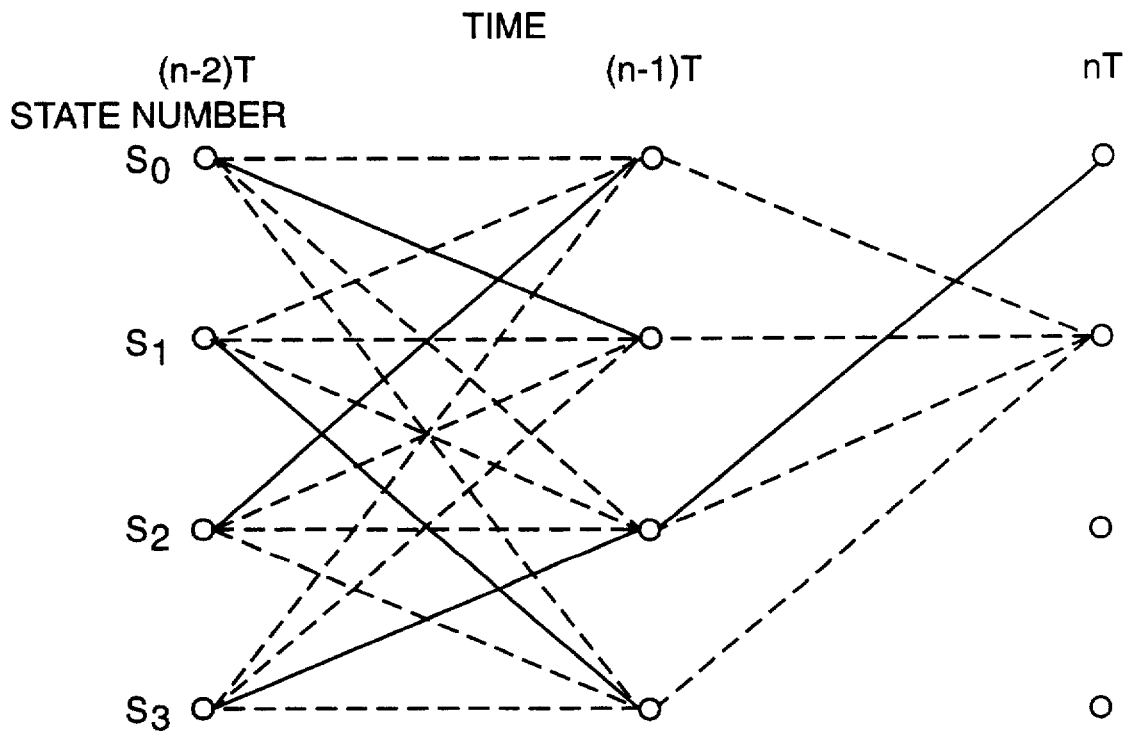
FIG. 7A is a trellis diagram showing the state transition in a maximum likelihood sequence estimator for a desired signal.
Figure 7B:
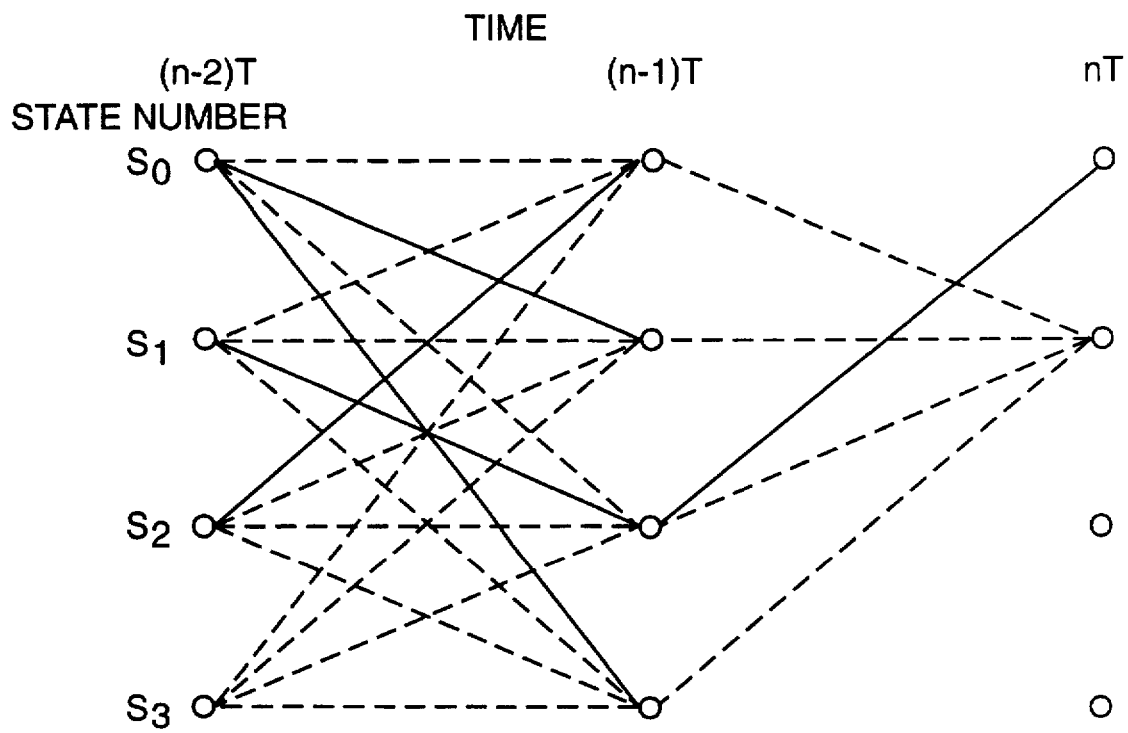
FIG. 7B is a trellis diagram showing the state transition in a maximum likelihood sequence estimator for an interference signal.

This will be described in connection with the case of this embodiment being applied to a quadrature phase shift keying modulation (QPSK) system. FIG. 7A is a trellis diagram showing an example of the state transition of the desired signal in the desired signal maximum likelihood sequence estimator 42 and FIG. 7B a trellis diagram showing an example of the state transition of the interference signal in the interference signal maximum likelihood sequence estimator 43. These trellis diagrams are provided in, for example, a memory device, as a look-up table which stores the state transition hysteresis of signals up to the current point in time. With the Viterbi algorithm, the paths for transition from the signal state at previous time (n−1)T to the state at the current time nT is limited to one for each of the states S0–S3 at time nT, by which the amount of processing required is reduced.

For example, in FIG. 7A, the number of paths possible of transition from each state at time (n−b 1)T to each state at time nT is four as indicated by the broken line for the state S1 and that one of the four paths which has the largest path metric is chosen as a survivor path. Assuming that the path metric of the path of transition from the state S2 at time (n−1)T to the state S0 at time nT is larger than the path metrics of the paths from the other states S0, S1 and S3, the survivor path to the state S0 at time nT is the path of transition from the state S2 at time (n−1)T. In this embodiment, survivor paths are calculated for both of the desired and interference signals by the Viterbi algorithm and the signal sequence which passes through the path of the largest likelihood is estimated as the desired signal sequence or interference signal sequence.

Figure 8:
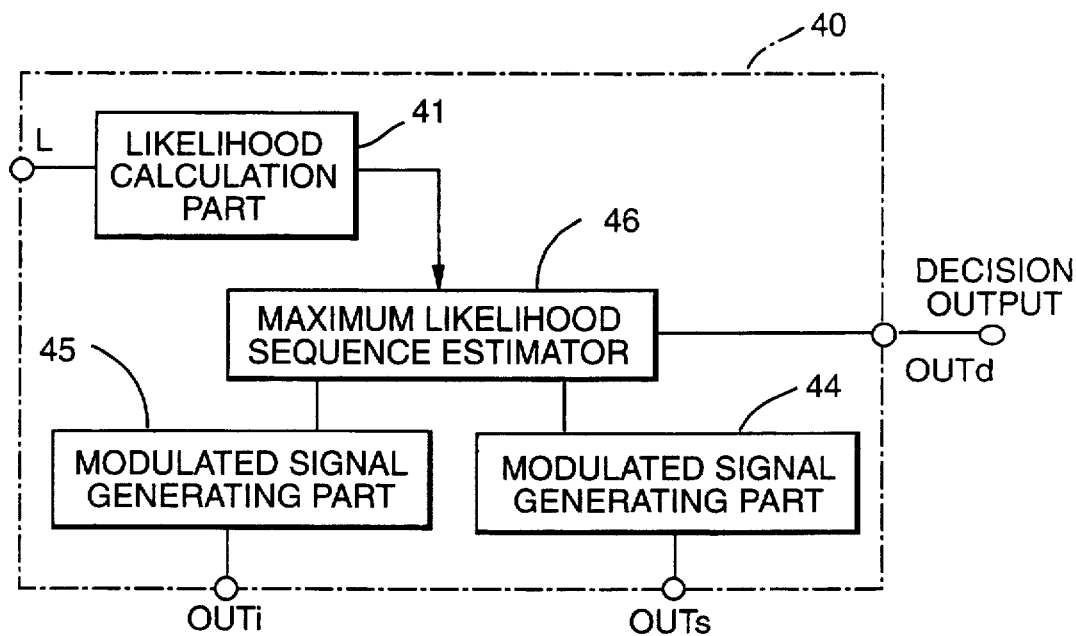
FIG. 8 is a block diagram of a state estimation part using a maximum likelihood sequence estimator which is common to the desired signal and the interference signal.

In the embodiment of FIG. 4, it is possible to utilize a scheme by which combinations of state transitions by desired and interference signal sequences are regarded as state transitions of single signal sequences and the signal sequence of the maximum likelihood is estimated by one maximum likelihood sequence estimator. FIG. 8 illustrates the construction of the state estimation part 40 for use in such a scheme. This example shows the case where one interference signal is present other than the desired signal. As shown in FIG. 8, one maximum likelihood sequence estimator 46 is provided in place of the desired signal maximum likelihood sequence estimator 42 and the interference signal maximum likelihood sequence estimator 43 in FIG. 4. Assume that the state S(n) at the current time nT in the case where the transition of Ld and Lu complex symbols of desired and interference signal sequences is considered going back from the current time nT is expressed by the following equation combining the complex symbol sequences of the desired and interference signals.

$$S(n)=\{a(n-1), a(n-2), \ldots, a(n-Ld),$$

$$b(n-1), b(n-2), \ldots, b(n-Lu)\} \quad (19)$$

where Ld and Lu represent the maximum delays of delayed waves of the desired and interference signals, respectively. In an M-ary modulation system, $a(n-1), a(n-2), \ldots, a(n-Ld), b(n-1), b(n-2), \ldots, b(n-Lu)$ in Eq. (19) are each allowed to take M kinds of complex symbols Cp ($0 \leq p \leq M-1$)1; hence, the number of states possible for the state $S(n)$ is $M^{(Ld+Lu)}$. To distinguish the $M^{(Ld+Lu)}$ states S(n), the state S(n) will hereinafter be described as follows:

$$S_{ijk\ldots}(n)=\{a(n-1), a(n-2), \ldots, a(n-Ld), b(n-1), b(n-2), \ldots, b(n-Lu)\} \quad (20)$$

where the subscript ijk . . . to S indicates the kind p of the complex symbol Cp ($0 \leq p \leq M-1$) which $a(n-1), a(n-2), \ldots, a(n-Ld), b(n-1), b(n-2), \ldots, b(n-Lu)$ in Eq. (19) are each allowed to take.

For example, in the case of a BPSK modulation system with Ld=Lu=1, Cp ($0 \leq p \leq 1$) may take two values, and consequently, the number of states is $2^{Ld+Lu}=4$ and the state S (n) can be expressed by $$S_{ij}(n)=\{a(n-1), b(n-1)\} \quad (21)$$

where i and j represent that $a(n-1)$ and $b(n-1)$ are allowed to take complex symbols $C_i$ and $C_j$, respectively, and $0 \leq i \leq 1$ and $0 \leq j \leq 1$. At this time, i corresponds to the state $S_i(n)$ in the case of considering the desired signal alone and j the state $S_j(n)$ in the case of considering the interference signal alone.

Figure 9:
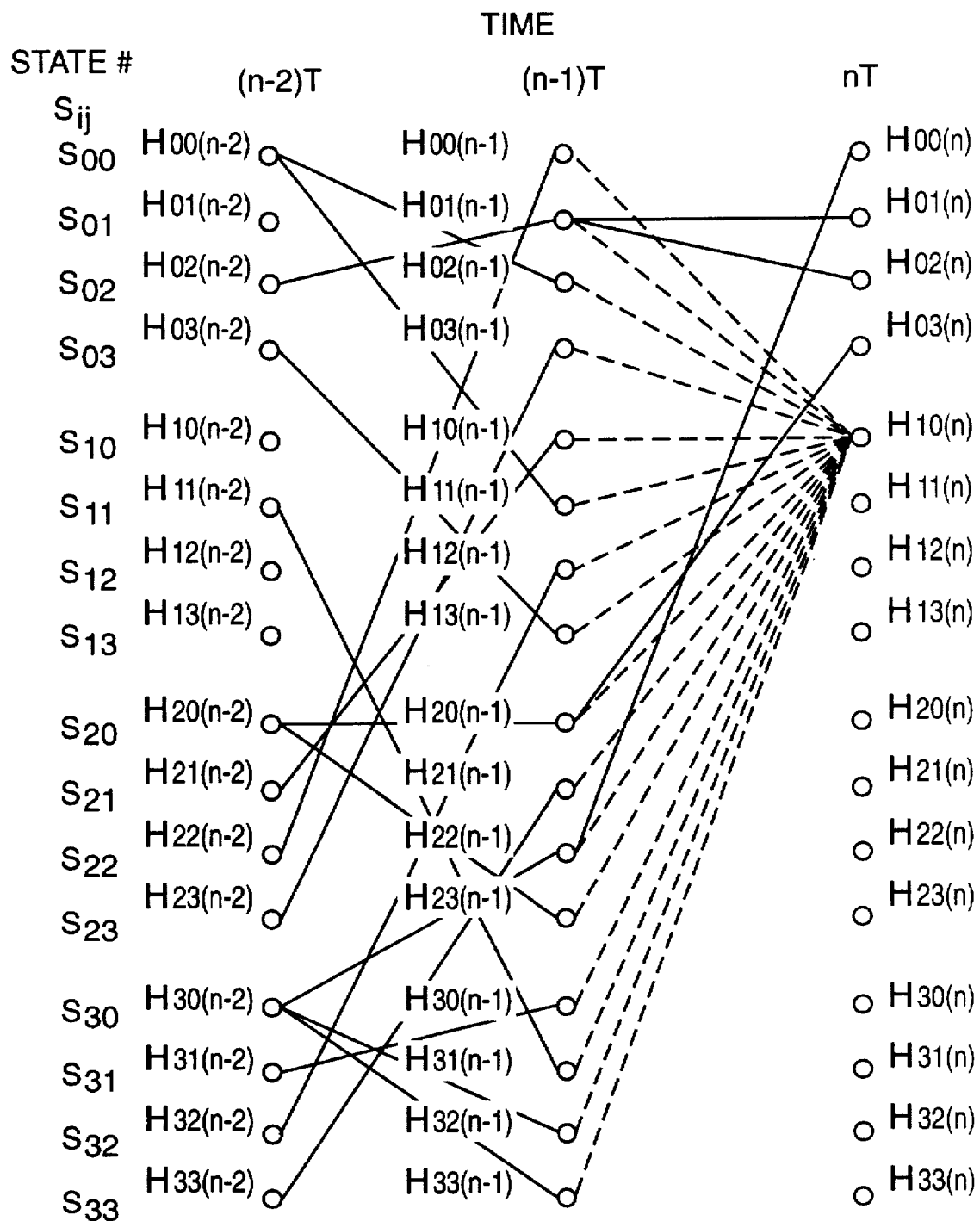
FIG. 9 is a trellis diagram in the case of making a maximum likelihood sequence estimation of the states of the both desired and interference signals by the Viterbi algorithm.

In the case of a QPSK modulation system with Ld=Lu=2, since the complex symbol Cp ($0 \leq p \leq 3$) is possible of taking four values, the number of states is $4^{Ld+Lu}=256$ and the state S(n) can be expressed by $$S_{ijkl}(n)=\{a(n-1), a(n-2), b(n-1), b(n-2)\} \quad (22)$$

where i, j, k and 1 indicate that the complex symbols which $a(n-1), a(n-2), b(n-1)$ and $b(n-2)$ may take are $C_i, C_j, C_k$ and $C_l$ in this order. At this time, ij corresponds to the state $S_{ij}(n)$ in the case of considering the desired signal alone and kl the state $S_{kl}(n)$ in the case of considering the interference signal alone. The path metric for the transition from the state $S_{ijkl}(n)$ to $S_{i'j'k'l'}(n+1)$ can be defined in the same manner as in Eqs. (2), (3) and (2)'. The trellis diagram of FIG. 9 shows the case of the QPSK modulation system with Ld=Lu=1, in which four states that the interference signal can take on are added to each of four trellis states that the desired signal can take on; namely, the four-state scheme is extended to a 16-state one. In FIG. 9, i and j of the state number $S_{ij}$ indicate the state numbers of the desired and interference signals, respectively. For instance, the state number S23 indicates that the state number i of the desired signal is 2 and that the state number j of the interference signal is 3.

Now, a description will be given, with reference to FIG. 9, of a method for making the maximum likelihood sequence estimation of the desired and interference signal sequences and a method for the estimation of the channel parameters which is made at the same time. Consider that the modulation system is the QPSK one and that one interference signal exists other than the desired signal. Furthermore, delay waves of up to one symbol time are considered for desired and interference signals, as inter-symbol interference conditions. That is, Ld=Lu=1.

In FIG. 9, the state $S_{ij}$ represents a combination of the state i (i=0.1.2.3) of the desired signal and the state j (j=0.1.2.3) of the interference signal. In FIG. 9, there are 16 states from $S_{00}$ to $S_{33}$. Since the characteristic of the mobile radio channel varies at high speed due to fading as compared with the signal transmission rate, the tap coefficient vector $H_{ij}(n)$ which is the channel parameter is prepared for each state $S_{ij}$. Here, n represents a discrete time (a point in time) normalized by the symbol interval T. In this embodiment, 16 sets of tap coefficient vectors $H_{ij}(n)$ are defined corresponding to the 16 states, respectively.

In general, in the case of considering delayed waves of delay times which are up to the desired wave Ld and the interference wave Lu, the tap coefficient vector $H_{ijk\ldots}(n)$ corresponding to the state $S_{ijk\ldots}(n)$ can be expressed by $$H_{ijk\ldots}(n) = [h_{d,ijk\ldots}(Ld), h_{d,ijk\ldots}(Ld-1), \ldots, \quad (23)$$
$$h_{d,ijk\ldots}(0), h_{u,ijkl\ldots}(Lu), h_{u,ijkl\ldots}(Lu-1),$$
$$\ldots, h_{u,ijkl\ldots}(0)]^T$$

and the number of its elements (tap coefficients) is (Ld+Lu+2). In the above, T indicates transposition. Now, vectors $H_{d,ijk\ldots}(n)$ and $H_{u,ijk\ldots}(n)$ which are expressed by the following equations using the elements of the above-noted vector $H_{ijk\ldots}(n)$ are the tap coefficient vectors of the desired and interference signals in the state $S_{ijk\ldots}(n)$ which correspond to Eqs. (10) and (12), respectively.

$$H_{d,ijk\ldots}(n) = [h_{d,ijk\ldots}(Ld), h_{d,ijk\ldots}(Ld-1), \quad (24)$$
$$\ldots, h_{d,ijk\ldots}(0)]^T$$

$$H_{u,ijk\ldots}(n) = [h_{u,ijk\ldots}(Lu), h_{u,ijk\ldots}(Lu-1), \quad (25)$$
$$\ldots, h_{u,ijk\ldots}(0)]^T$$

While the invention has been described here with respect to the case where the desired and interference signals are single, the invention can easily be applied to the case where a plurality of interference signals are present, by extending the above-mentioned equations.

In the example of FIG. 9, Eq. (23) becomes as follows:

$$H_{ij}(n)=[h_{d,ij}(1),h_{d,ij}(0),\ldots h_{u,ij}(1), h_{u,ij}(0)]^T \quad (26)$$

where $h_{d,ij}(0)$ and $h_{d,ij}(1)$ are tap coefficients for the desired signal and $h_{u,ij}(0)$ and $h_{u,ij}(1)$ are tap coefficients for the interference signal.

In practice, the present invention is implemented by a digital signal processor, microprocessor or wired logic circuits such as custom LSI; so that the tap coefficient vectors for each state are stored in a memory device in many cases. The tap coefficient vectors for each state are initialized in the training period, using training signals for the desired and interference signals.

In FIG. 9, when the branch (or path) for transition from the state $S_{ij}$ (n−1) to $S_{k1}$(n) is determined, the corresponding complex symbol sequence candidate vectors $U_{ij,k1}$(n) for desired and interference signals are uniquely determined and can be expressed by the following equation.

$$U^H_{ij,kl}(n) = [a(n-1), a(n), b(n-1), b(n)] \quad (27)$$
$$= [C_i, C_k, C_j, C_l]$$

Here, $$A_{ik}^H(n)=[a(n-1), a(n)] \quad (28)$$

$$B_{jl}^H(n)=[b(n-1), b(n)] \quad (29)$$

expressed using the elements of the vectors by Eq. (27) are complex symbol sequence candidate vectors for the desired and interference signals corresponding to Eqs. (9) and (11), respectively. $C_i$ and $Ck$ are complex symbols which are obtainable corresponding to the state transition of the desired signal, whereas $C_j$ and $C_l$ are complex symbols which are obtainable corresponding to the state transition of the interference signal. For example, when the desired and interference signals are modulated by the QPSK modulation scheme, the complex symbols $C_i$, $C_k$, $C_j$ and $C_l$ each assume any one of four signal points in a complex plane representing the signal space, that is, $(1/\sqrt{2}, 1/\sqrt{2})$, $(-1/\sqrt{2}, 1\sqrt{2})$, $(-1/\sqrt{2}, -1/\sqrt{2})$, and $(1/\sqrt{2}, -1/\sqrt{2})$, according to the values i, k, j and 1. When different kind of modulation systems are used for the desired signal and the interference signal, the complex symbols $C_k$, $C_k$ and $C_j$, $C_l$ take on different values. For example, when the QPSK and 16 QAM modulation systems are used for the desired and interference signals, respectively, the I and Q components of the complex symbols $C_j$ and $C_k$ are binary and the I and Q components of the complex symbols $C_j$ and $C_l$ are quaternary.

The branch metric $A[S_{k1}(n), S_{ij}(n-1)]$ for the branch of transition from the state $S_{ij}(n-1)$ to $S_{k1}(n)$ in FIG. 9 is calculated by the following equation.

$$\Lambda[S_{k1}(n), S_{ij}(n-1)]=-|y(n)-y_m(n)|^2=-|y(n)-U_{ij,kl}^H(n)\cdot H_{ij}(n-1)|^2 \quad (30)$$

where H indicates a complex conjugate transposition. In the above equation, $y_m(n)$ represents a received signal estimated value for the m-th complex symbol sequence candidate, m being an integer which is uniquely determined by k, l, i and j.

The path metric is updated by selecting that one of paths merging from respective states $S_{ij}(n-1)$ at time (n−1) into respective states $S_{k1}(n)$ at time n which has the largest path metric, through use of the following equation.

$$J[S_{k1}(n)]=MAX\{\Lambda[S_{k1}(n), S_{ij}(n-1)]+J[S_{ij}(n-1)]\} \quad (31)$$

where MAX represents the maximum value in { } when varying i from 0 to M−1 and j from 0 to M'−1.

In the FIG. 9 embodiment, M=M'=4. In this instance, the survival path is the path of transition to the state $S_{k1}$ (n) via the state $S_{ij}$ (n−1) which has i and j which maximize Eq. (31). Similarly, one survival path is selected for each state at time n. More specifically, the selection of the survival path that merges into the state $S_{10}(n)$ at time nT in FIG. 9 is made by calculating the path metrics corresponding to the paths (indicated by the broken lines in FIG. 9) of transition from the 16 states $S_{00}$ through $S_{33}$ at time (n−1) to the state $S_{10}(n)$, then adding the thus calculated values to the path metrics of the respective states at time (n−1)T into new path metrics and selecting that one of the paths whose path metric provides the maximum likelihood.

At this time, the tap coefficient vector in each state at time nT is updated along the above-mentioned survival path. When the path of transition from the state $S_{ij}(n-1)$ to $S_{k1}(n)$ survives by Eq. (31), the new tap coefficient vector $H_{k1}$ in the state $S_{k1}$ (n) is computed by updating the tap coefficient vector $H_{ij}(n-1)$ of the state $S_{ij}(n-1)$ at time (n−1) through use of an adaptation algorithm. The adaptation algorithm may be an RLS or LMS algorithm; this example will be described in connection with the case of using the LMS algorithm.

When the path of transition from the state $S_{ij}(n-1)$ to the state $S_{k1}(n)$ survives, the tap coefficient vector $H_{k1}(n)$ of the state $S_{k1}(n)$ is expressed by the following equation.

$$H_{k1}(n)=H_{ij}(n-1)+\mu\epsilon U_{ij,k1}(n) \quad (32)$$

where $\epsilon$ represents an error signal at the time of transition from the state $S_{ij}(n-1)$ to $S_{k1}(n)$ and $\mu$ a step size of a small real number (0.1, for instance). Supposing that in FIG. 9 the survival path for the state $S_{00}$ at time nT is a path merging from the state $S_{22}$ at time (n−1)T by the Viterbi algorithm, the new tap coefficient vector $H_{00}(n)$ at time nT is computed by updating the tap coefficient vector $H_{22}(n-1)$ at time (n−1)T with the adaptation algorithm. Thus, the tap coefficient vector is updated for each state of the Viterbi algorithm along the survival path in real time by use of signal candidates at the same time as the updating of the path metric; hence the channel parameter can be estimated with higher accuracy than in the case of estimating it on the basis of the delayed decision results. This technique is indispensable to the interference canceller which is required to estimate desired and interference signals with high accuracy although their phases and amplitudes undergo abrupt variations as in the mobile radio communication.

Figure 10:
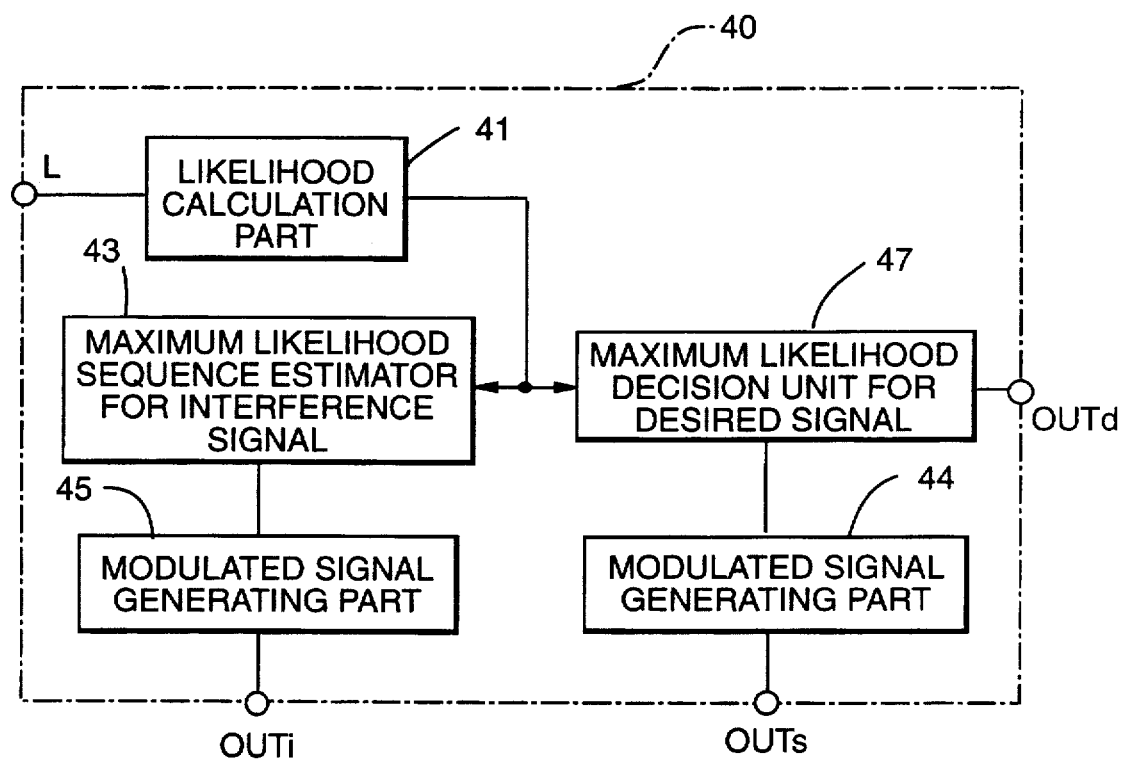
FIG. 10 is a block diagram of the state estimation part in the case of using the maximum likelihood estimator for the desired signal.
Figure 11:
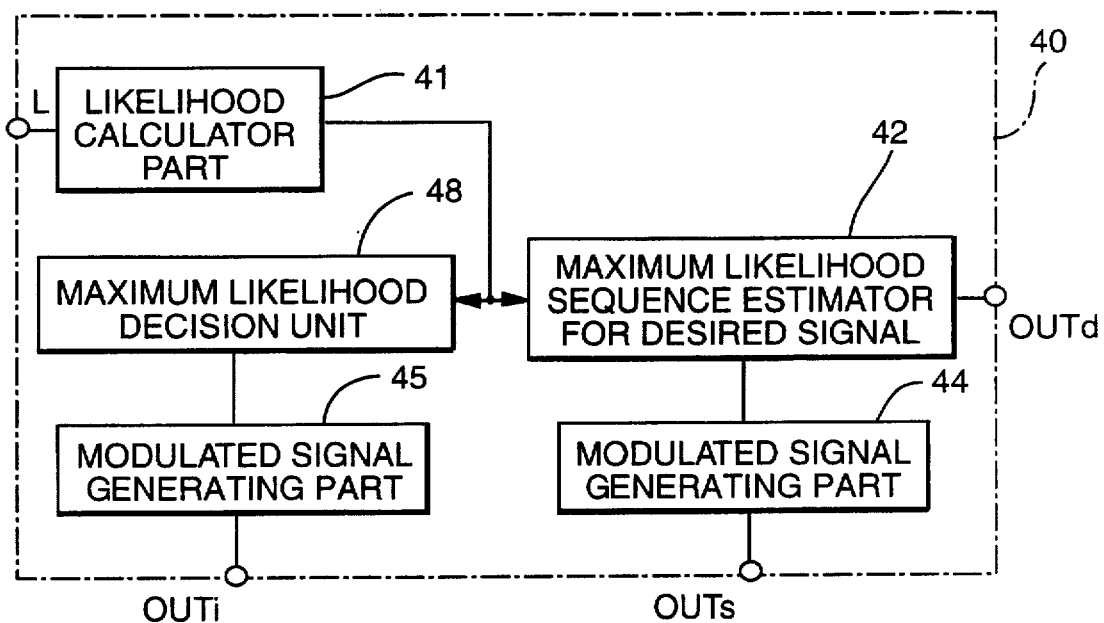
FIG. 11 is a block diagram of the state estimation part in the case of using the maximum likelihood estimator for the interference signal.
Figure 12:
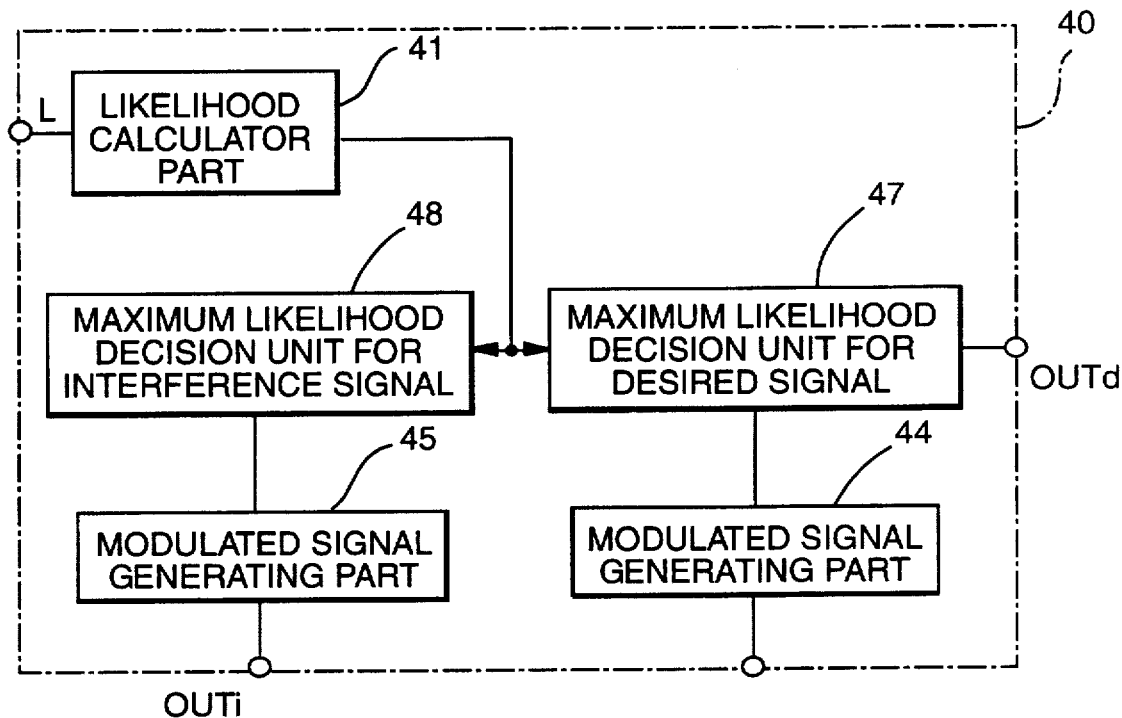
FIG. 12 is a block diagram of the state estimation part in the case of using the maximum likelihood estimator for both of the desired and interference signals.

While in the above the FIG. 4 embodiment has been described to estimate signal sequences by the maximum likelihood sequence estimators 42, 43 or 46 for both of the desired and interference signals, it is not always necessary to make the maximum likelihood sequence estimation for both signals. In the state estimation part 40 shown in FIG. 10, the maximum likelihood sequence estimation is made for the interference signal alone and a symbol-by-symbol maximum likelihood decision is made for the desired signal at each point by a desired signal maximum likelihood estimator. Alternatively, as shown in FIG. 11, the maximum likelihood sequence estimation is made only for the desired signal and the symbol-by-symbol maximum likelihood decision is made for the interference signal by an interference signal maximum likelihood estimator 48. It is also possible to use such a scheme as shown in FIG. 12, in which no maximum likelihood sequence estimation is made for both the desired and interference signals but instead the symbol-by-symbol maximum likelihood decision is made for both signals by the maximum likelihood estimators 47 and 48 at each point in time. The amount of processing required can be reduced by making the symbol-by-symbol maximum likelihood decision at each point instead of making the maximum likelihood sequence estimation as described above.

Figure 13:
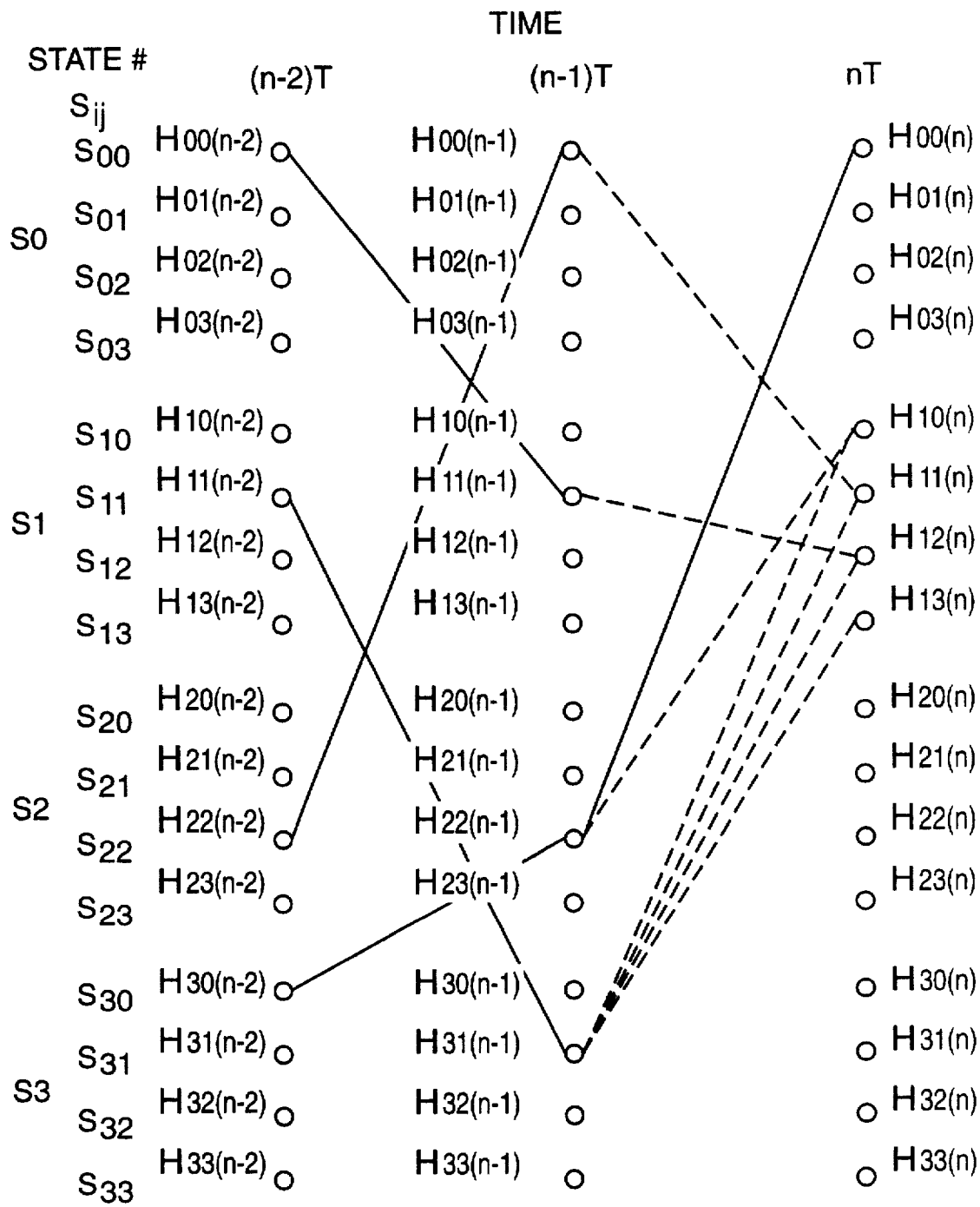
FIG. 13 is a trellis diagram in the case of making a maximum sequence estimation of the desired signal and a symbol-by-symbol maximum decision for the interference signal.

Next, a concrete description will be given, with reference to the trellis diagram shown in FIG. 13, of the operation that is carried out in the FIG. 11 example which makes the maximum likelihood sequence estimation for the desired signal and the symbol-by-symbol maximum likelihood decision for the interference signal at each point.

In the trellis diagram of FIG. 13, 16 states are split into four groups $S_i$ (i=0, 1, 2, 3) according to the state of the desired signal as shown below.

$$S_i = \{S_{ij}\}(j=0, 1, 2, 3) \tag{33}$$

The number of branch metrics to be calculated between the respective groups is limited to one. That is, the branch metric $\Lambda[S_{i'}(n), S_i(n-1)]$ for the transition from the group $S_i(n-1)$ at time (n-1)T to the group $S_{i'}(n)$ at time nT is defined as follows:

$$\Lambda[S_{i'}(n), S_i(n-1)] = \max_{j'}\{\Lambda[S_{i'j'}(n), S_{ij}(n-1)]\} \tag{34}$$

Here, $\Lambda[S_{i'j'}(n), S_{ij}(n-1)]$ represents the branch metric for the transition from the state Sij at time (n-1) to the state $S_{i'j'}$ at time nT and $\max_{j'}\{\ \}$ the maximum value of $\{\ \}$ when changing j' from 0 to 3. The j' that provides this maximum value is the state number of the interference signal at time nT. Since the symbol-by-symbol maximum likelihood decision is thus uniquely made for the state of the interference signal at each point, an already decided value can be used as the state number j of the interference signal at time (n-1)T in Eq. (34).

The updating of the path metric is made for the path of transition between the respective groups. The path metric $J[S_{i'}(n)]$ of the survival path of the group $S_{i'}(n)$ at time nT is updated, for i=0, 1, 2, 3, by the following equation:

$$J[S_{i'}(n)] = \max_i\{\Lambda[S_{i'}(n), S_i(n-1)] + J[S_i(n-1)]\} \tag{35}$$

where $J[S_{i'}(n)]$ represents the path metric of the survival path of the group $S_{i'}(n)$ at time nT. At this time, the state i of the desired signal at time (n-1)T for transition to the group $S_{i'}(n)$ at time nT is determined.

Taking both of the desired and interference signals into account, the number of states to be considered is 16. However, since the interference signal maximum likelihood sequence estimator is replaced with the maximum likelihood decision device 48 as shown in FIG. 11 and since the state transition takes place for each group $S_i$ of the same desired signal state, the number of survival paths to be considered is reduced to 4, which is the same as in the case of the trellis for the desired signal alone. Furthermore, the number of sets of tap coefficient vectors of the transversal filters 11 and 21 which are prepared for each state transition is four, because the sets of tap coefficient vectors need only to be prepared for each group $S_i$ classified according to the state transition of the desired signal. Accordingly, the number of path metrics to be calculated and the number of sets of tap coefficients to be updated are reduced—this permits substantial reduction of the amount of processing involved.

The updating of the tap coefficient is performed using the desired signal sequence and interference signal sequence from the state estimation part 40 and the error estimation part after the determination of the path of transition from the state at time (n-1)T to the state at time nT in the maximum likelihood sequence estimator 42. This updating takes place along a survival path for a plurality of tap coefficient vectors prepared for each state. Moreover, this updating is carried out for each transition state by the RLS, LMS or similar adaptation algorithm so that the square $|e|^2$ of the estimation error signal becomes small. In consequence, the tap coefficient thus updated is one that reflects the impulse responses of the channels for the desired and interference signals at the current point in time; hence, an excellent receiving characteristic can be obtained even in the case where the channel varies at high speed with time due to fading as in the mobile radio communication. When the channel variation by fading is relatively gentle as in the case of a portable radiotelephone, the influence of the delay in channel estimation is not great, and hence the tap coefficient can be updated using the signal sequences decided by the state estimation part.

The present invention may also employ, for instance, a configuration in which: (1) a received signal sample value is used which is obtained by sampling the received signal at shorter intervals than the signal symbol interval T; (2) fractional interval transversal filters in which tap coefficients set with the sample period are provided in the interference and desired signal estimation parts 20 and 10 each having a delay stage of the same delay as the sample interval; and (3) a state estimation part which outputs a transmitted signal sample value sequence of the sample period shorter than the symbol intervals which is obtained by interpolating on the time axis complex symbol sequence candidates corresponding to desired and interference signal sequence candidates which are outputted with the signal symbol period. This configuration is effective in preventing degradation which is caused by different timing of clocks or signal frames of the desired and interference signals.

Figure 14:
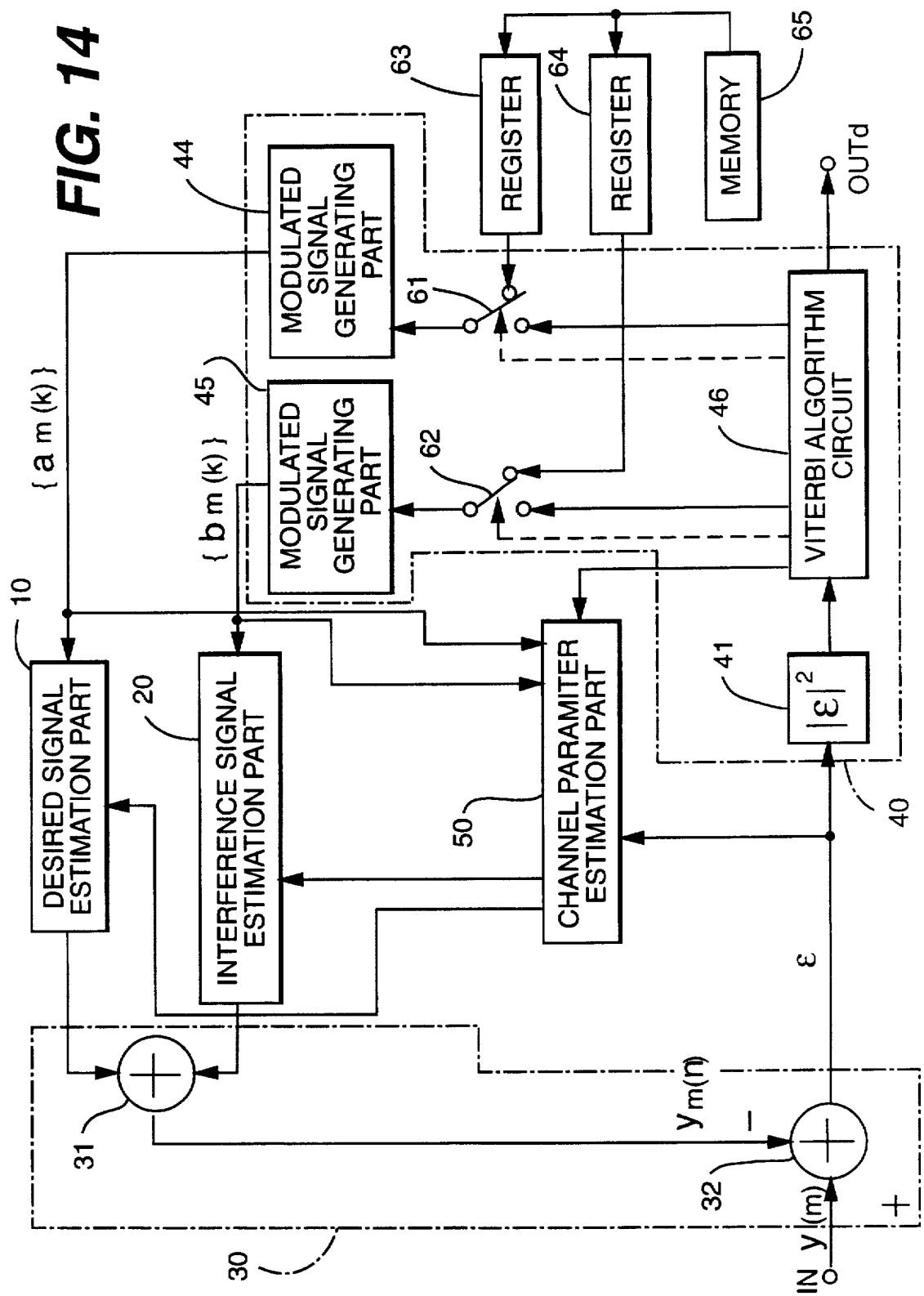
FIG. 14 is a block diagram of an embodiment designed to estimate signal states by the Viterbi algorithm in accordance with a combination of transition states of the desired and interference signals.

In the embodiment of FIG. 4, the switches 61 and 62 are provided at the output sides of the modulated signal generating parts 44 and 45, training signals are held in the registers 63 and 64 as complex symbol sequences modulated by the symbol sequences and during the training period for the received burst signal the training signals are fed to the transversal filters 11 and 21 and the tap coefficient control part 51, but as shown in FIG. 14, the switches 61 and 62 may also be provided between the maximum likelihood sequence estimation part and the modulated signal generating parts 44 and 45, respectively. In this case, training symbol sequences for modulation are held in the registers and during the training period they are supplied to the modulated signal generating parts 44 and 45. Incidentally, the embodiment of FIG. 14 is shown to use a Viterbi algorithm circuit 46 instead of using the two maximum likelihood sequence estimators 42 and 43 depicted in FIG. 4.

The training signal registers 63 and 64 output training patterns of digital symbol sequences which are the same as the training signals of the desired and interference signals, respectively. The switch 61 selects, during the period of receiving the training signal of the desired wave in the received burst signal, the desired wave training pattern from the register 63 and selects, during the period of receiving the data signal following the data signal, the digital signal sequence corresponding to the state transition of the desired wave which is output from the Viterbi algorithm circuit 46. Similarly, the switch 62 selects the interference wave training pattern from the register 64 during the interference wave training signal receiving period and selects, during the data signal receiving period following the training signal receiving period, the digital signal sequence corresponding to the state transition of the interference wave which is output from the Viterbi algorithm circuit 46. The modulated signal generating parts 44 and 45 are each a baseband modulating circuit which modulates the input digital signal in accordance with the modulation system of the received wave into a complex symbol sequence. In the data signal section, the modulated signal generating parts 44 and 45 receive the output signals from the switches 61 and 62 and output complex symbol sequences candidates of desired and interference waves. The channel parameter estimation part 50 estimates channel impulse responses on the basis of the estimation error from the subtractor circuit 32, the complex symbol sequence candidates $\{a_m(n-Ld), a_m(n-Ld+1), \ldots, a_m(n)\}$ and $\{b_m(n-Lu), b_m(n-Lu+1), \ldots, b_m(n)\}$ of desired and interference waves from the modulated signal generating parts 44 and 45 and state estimation information from the Viterbi algorithm circuit 46 and sets the channel impulse response estimated values for the desired and interference waves, as the tap coefficient vectors of the transversal filters in the desired signal estimation part 10 and the interference signal estimation part 20, respectively.

Different channel impulse response estimation methods are used for the training and data signal periods of the burst signal. In the impulse response estimation during the training signal period, the switches 61 and 62 in FIG. 14 are connected to the training pattern registers 63 and 64, respectively, from which the training patterns are provided to the modulated signal generating parts 44 and 45. The channel parameter estimation part 50 are supplied with the complex symbol sequences corresponding to the desired and interference wave training patterns and the estimation error and updates the desired and interference signal channel impulse response estimated values by use of, for example, a successive least squares method (Haykin Adaptive Filter Theory, 1986, Prentice-Hall) so that the estimation error becomes minimum. In the channel impulse response estimation during the data signal period, the switches 61 and 62 are connected to the output side of the Viterbi algorithm circuit 46 to use transition state sequence candidates for the desired and interference signals. The number of the transition state sequence candidates is equal to the number of the state transitions and the estimation error differs with the candidates. In this instance, it is possible to use (i) a method which makes the channel estimation for the signal sequence decided by the Viterbi algorithm, (ii) a method which makes the channel estimation for the complex symbol sequence candidate which provides the maximum likelihood at each time and (iii) a method which makes the channel estimation for each survival path of each state of the Viterbi algorithm. The methods (i) and (ii) use the same channel impulse response estimated value for the complex symbol sequence candidates corresponding to the state transition. The method (iii) uses the same channel impulse response for the state transitions branching from the same state but, for state transitions branching from different states, channel impulse responses respectively corresponding to them. The method (iii) involves a larger amount of processing than the methods (i) and (ii) but is higher in channel estimation accuracy.

Furthermore, it is possible to use, in the training signal period, the RLS algorithm which permits a rapid convergence of the channel impulse response estimated value and, in the data receiving period, the LMS or like algorithm which is small in the amount of processing required.

Figure 15:
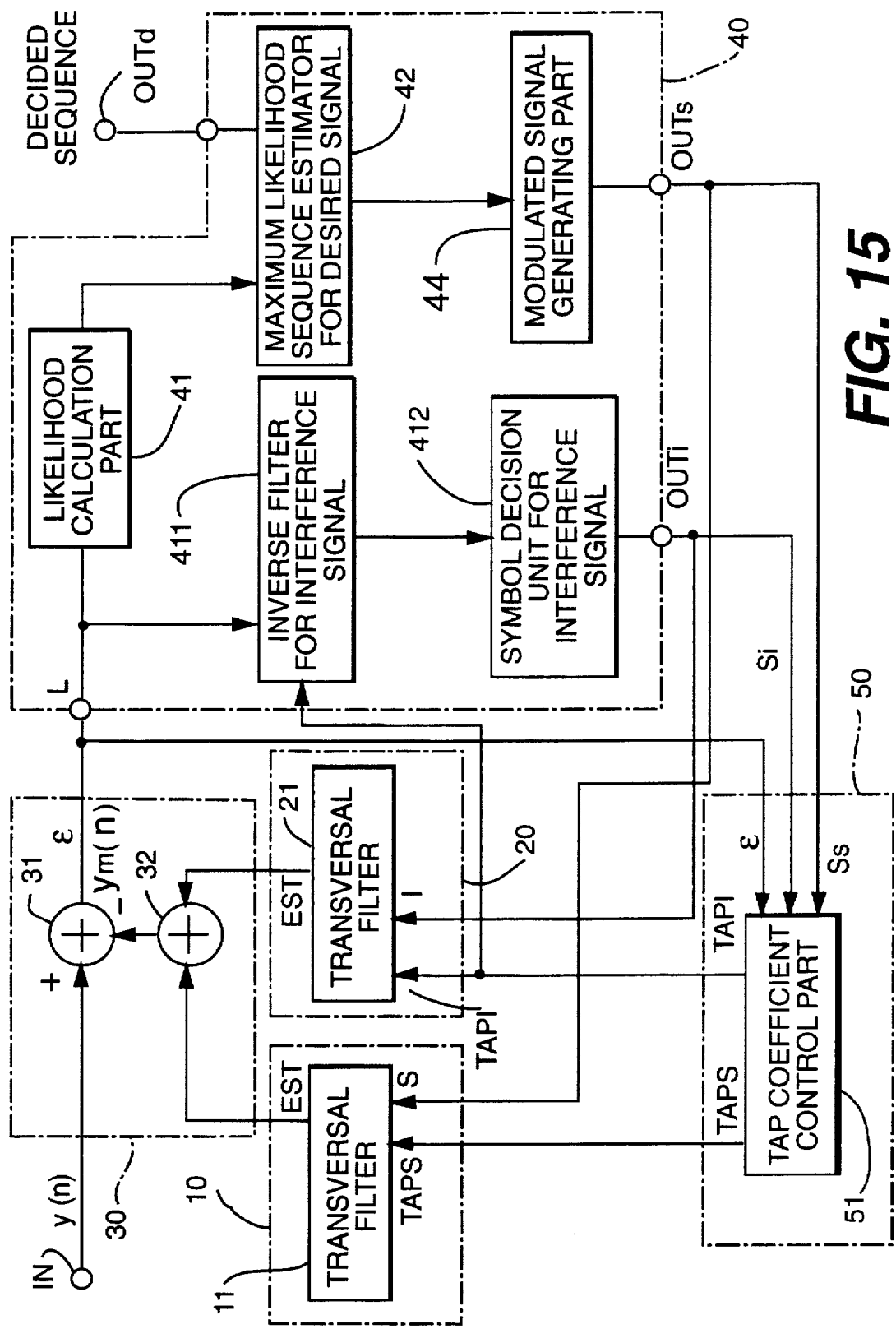
FIG. 15 is a block diagram of an embodiment using an inverse filter in the state estimation part.

FIG. 15 illustrates another embodiment which employs a different configuration of the state estimation part 40. The embodiment of FIG. 15 uses an inverse filter 411 and a symbol decision unit 412 as means for generating complex symbol sequence candidates for the interference signal in the state estimation part 40. This embodiment will be described with respect to the case of making the symbol-by-symbol decision for the state of the interference signal at each time.

While the modulation system used is the QPSK system, other modulation systems can be used.

This embodiment differs from the above-described embodiments in the interference signal estimation method. In the embodiment which makes the maximum likelihood decision in place of the maximum likelihood sequence estimation employed in the embodiments described above, the interference signal sequence candidates which are input into the transversal filter 21 for the interference signal are sequentially output therefrom in accordance with the state of transition of the interference signal. Estimated received interference signals are produced for all the candidates and the likelihood decision is made for them, thereby making the symbol-by-symbol decision. In the QPSK system, four candidates are considered for the signal state at the current time nT. In the embodiment which involves the likelihood decision, the signal states at the previous times $(n-1)T, (n-2)T, \ldots (n-Lu)T$ (where Lu is an integer which is determinedly the delay amount of the delay wave considered) are already determined by the symbol-by-symbol likelihood decision at each time; hence, the branch metric is calculated for each of the four candidates and the symbol-by-symbol decision is made in terms of the branch metric.

In contrast to the above, according to the method of the FIG. 15 embodiment which employs the inverse filter 411, an estimated received interference signal (a delayed wave component of the interference signal) which does not contain the component corresponding to the current symbol of the interference signal at time nT is generated by the transversal filter 21, and this signal and the estimated received desired signal are subtracted by the subtractor 31 from the received signal y(n) to obtain the estimation error signal $\epsilon$. The estimated received interference signal, which does not contain the component corresponding to the current symbol of the interference signal at time nT, can be produced using the symbol sequence decided and determined at a previous time for the interference signal sequence and the tap coefficient of the transversal filter 21 corresponding to the previous time. Since the estimated received desired signal has also been subtracted by the subtractor 31, the estimation error signal is composed of the interference signal component corresponding to the current symbol at time nT and noise. This estimation error signal is applied to the inverse filter 411 to compensate for the distortion of the channel. The inverse filter 411 is a one-tap filter that obtains from the tap coefficient control part 51 the tap coefficient of the tap corresponding to time nT and has its inverse as a complex tap coefficient. Accordingly, the output from the inverse filter 411 is an estimated value of the complex symbol of the interference signal transmitted at time nT. This estimated value is subjected to the symbol-by-symbol decision by the symbol decision unit 412 to estimate the symbol transmitted at time nT.

Next, the thus obtained symbol of the interference signal at time nT is used to generate, by the transversal filter 21, an estimated received interference signal which contains the component corresponding to the state of the interference signal at time nT, and this estimated received interference signal and the estimated received desired signal are subtracted by the subtractor 31 from the received signal y(n) to compute a new estimated error signal $\epsilon$. This estimation error has no interference signal component and is composed only of a noise component. For the desired signal, a likelihood signal is derived from this estimation error signal by the likelihood calculation part 41 and a maximum likelihood sequence decision is made. The updating of the tap coefficient is performed by the adaptation algorithm for each state of the desired signal maximum likelihood sequence estimator 412, using the interference signal sequence obtained by the decision.

This method permits reduction of the amount of signal processing as compared with that involved in the embodiment which obtains the likelihood for the four candidates and makes the maximum likelihood decision therefor. Likewise, this embodiment may be modified to make the maximum likelihood sequence estimation for the interference signal and the symbol-by-symbol decision by the inverse filter and the symbol decision unit for the desired signal.

In the embodiments of FIGS. 4 and 14, the training signals of the desired and interference waves are used to determine the tap coefficients of the transversal filters 11 and 21; in digital mobile communication it is often unknown from which zone the interference wave comes, and hence the training signal of the interference wave is unknown in many cases. Further, the signal may sometimes be transmitted with a burst signal structure which does not use the training signal. When the interference wave comes from a remote zone, the desired signal and the interference signal appreciably differ in their frame timing, in which case it may sometimes be impossible to conduct training with the training signal of the interference signal. In such an instance, it is necessary to estimate the channel parameter for the interference wave through training with the signal of the data signal period of the interference wave. In the above case, however, the receivers of the FIGS. 4 and 14 embodiments according to the present invention may sometimes be inoperative because they do not operate unless the interference wave training signal as well as the desired wave training signal are preknown.

Figure 16:
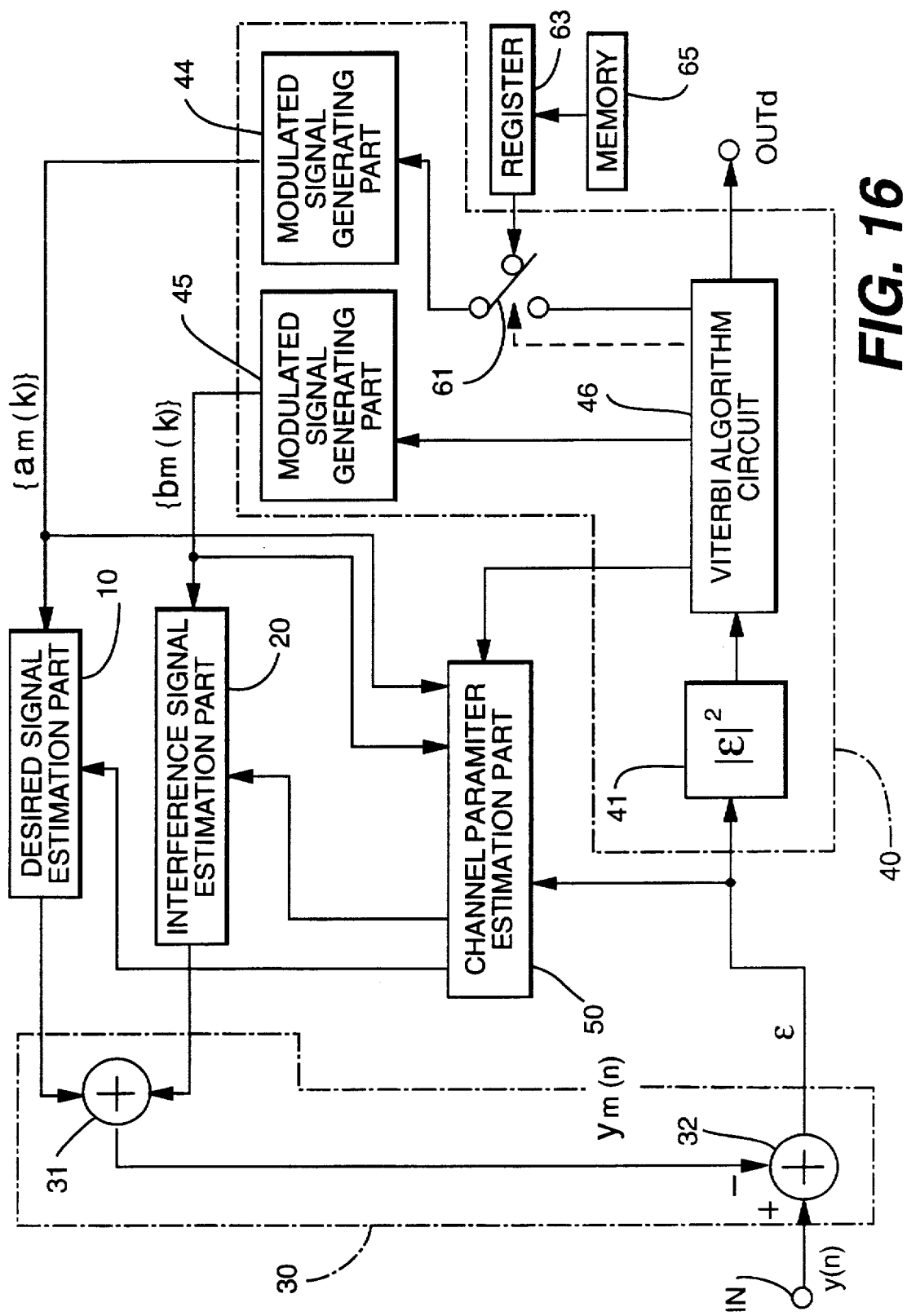
FIG. 16 is a block diagram of an embodiment which is applicable when interference training signals are unknown.

In FIG. 16 there is shown a modified form of the FIG. 14 embodiment intended as a solution to the above-noted problem, the parts corresponding to those in FIG. 14 being identified by the same reference numerals. Now, suppose that the desired wave training signal is preknown, whereas the interference wave training signal is unknown. This embodiment differs from the FIG. 14 embodiment in that the switch 62 and the training pattern register 64 in FIG. 14 are omitted and the maximum likelihood sequence estimation Viterbi algorithm circuit 46 is connected directly to the modulated signal generating part 45. A difference in operation is the channel estimation in the desired wave training signal period. This will be described below.

When the mobile station communicates with the base station while moving, the channel impulse response changes every moment owing to fading. Hence, it is necessary to quickly converge the channel estimation. To this end, the channel estimation is made using the known training signal; however, the desired wave training signal is known, whereas the interference wave training signal is unknown. Then, for the interference wave training signal, a signal decision is made on the basis of the state estimation by the Viterbi algorithm. As expressed by $\{b_m(n-1), b_m(n-2), \ldots, b_m(n-\text{Lex})\}$, the state of the Viterbi algorithm is composed of complex symbols of the interference wave alone unlike in the case of FIG. 14, and by selecting the number of symbols Lex to be larger than the number of delayed symbols (i.e. the number of delay stages) Lu to be considered in the transversal filter 21, the number of possible states is increased.

The delay time of the delayed wave to be taken into account is about one to two symbol periods at most as in the embodiments described above; therefore, the numbers of delay stages Ld and Lu of the transversal filters 11 and 21 are also selected to be one, for instance. Assuming that the length of the training signal which is transmitted with the burst signal is, for example, about 10-symbol, the updating of tap coefficients and the maximum likelihood estimation are performed for all interference signal sequence candidates that can be generated with the 10-symbol length in the training period and the tap coefficient vector corresponding to the path of the maximum likelihood is regarded as the channel impulse response estimated using the training signal although the actual interference wave training signal is not referred to. At this time, in the case of the BPSK modulation system, $2^{10}=1024$ paths are required, that is, the likelihood (path metric) calculation and the tap coefficient updating need to be performed for 1024 interference signal sequence candidates. In practice, the length of the symbol sequence for the maximum sequence candidate estimation need not always be made equal to the symbol sequence length of the training pattern; the length Lex of the symbol sequence candidate needs only to be selected to such an extent that the probability of the correct training pattern being detected (that is, the estimated value of the impulse response being converged) is higher than a predetermined value. For example, Lex=2 Lu. For signal transmission at a rate of about 40 Kb/s, the required number of taps of the transversal filter needs only to be several (two taps, for instance); hence, the training length necessary for the estimation of the channel parameter for the interference signal may be twice the number of taps, for example, four-symbol or so. Thus, the correct channel impulse response for the interference wave can be obtained by increasing the number of states of the interference wave to some extent and observing individually the states of transition of the interference wave over several symbols in the past.

Figure 16A:
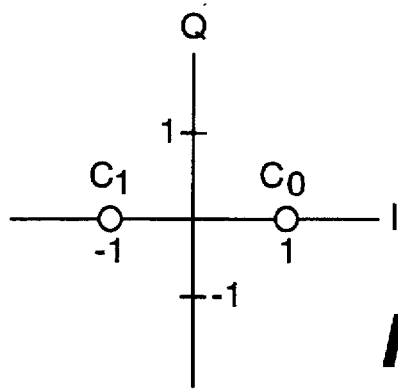
FIG. 16A is a signal constellation diagram showing the signal point arrangement in the BPSK transmission system.
Figure 16B:
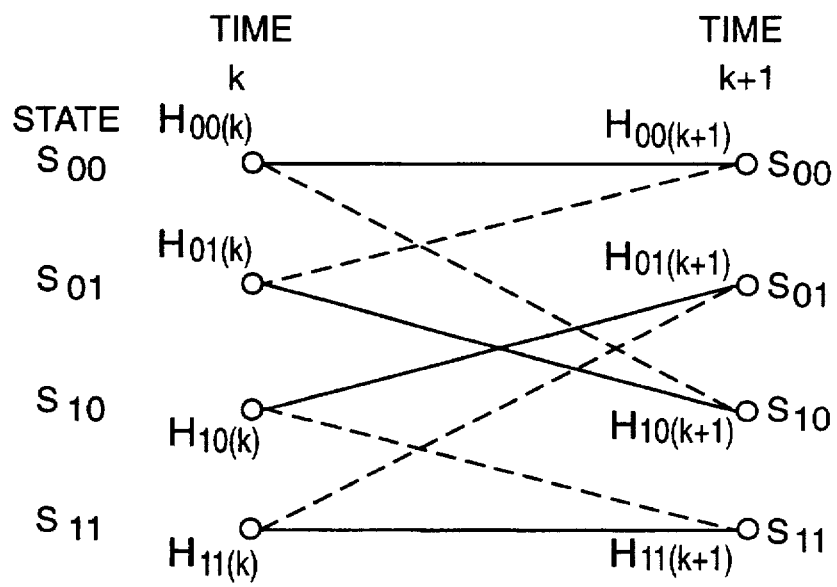
FIG. 16B is a trellis diagram in the case where the number of states of the interference signal is increased to permit observations up to a 2-symbol time.

In view of the above, in this embodiment, the symbol sequence candidate length, for which the maximum likelihood sequence estimator 46 is allowed to provide individual indications of increased states of transition of the interference wave on the trellis diagram in the training signal receiving period, is set to an Lex symbol time longer than an Lu symbol time. Then, the symbol sequence candidates of the minimum error (i.e. of the maximum likelihood) is chosen and regarded as the interference wave training pattern, and the tap coefficient vector obtained at that time is used as a tap coefficient vector converged through training. Hence, the length Lex of the symbol sequence candidate which can be observed individually is determined to such an extent that the probability of the symbol sequence candidate of the maximum likelihood matching the correct training pattern is sufficiently high. In this embodiment, Lex=2. Now, this embodiment will be described in connection with such a BPSK transmission system as depicted in FIG. 16A. FIG. 16B is a trellis diagram. In this example, the number of states of the interference wave is increased and up to two-symbol time can be distinguished with one state. Referring first to FIG. 16, the flow of signals will be mainly described. The numbers of delay stages of the transversal filter in the desired signal estimation part 10 and the transversal filter in the interference signal estimation part 20 are set to Ld=Lu=1, for instance. In the training signal receiving period, a transmitted sequence candidate of the interference signal corresponding to an extended state of transition is outputted from the viterbi algorithm circuit 46. The interference signal transmitted sequence candidate is converted by the modulated signal generating part 45 to the corresponding complex symbol sequence candidate. The thus converted complex symbol sequence candidate is provided to the transversal filter in the interference signal estimation part 20. At this time, the desired wave training signal is fed to the modulated signal generating part 44 via the switch 61 connected to the training pattern register 63 side. Then, the complex symbol sequence corresponding to the desired wave training signal is applied to the transversal filter in the desired signal estimation part 10. The estimated desired signal from the desired signal estimation part 10 and the estimated interference signal from the interference signal estimation part 20 are added by the adder 31 to provide an estimated value $y_m(n)$ of the received signal. In the subtractor 32 the received signal estimated value $y_m(n)$ is subtracted from the received signal $y(n)$ to provide the estimation error $\epsilon$.

The channel parameter estimation part 50 makes the channel estimation on the basis of the complex symbol sequence corresponding to the desired wave training signal from the modulated signal generating part 44, the interference wave complex symbol sequence candidate from the modulated signal generating part 45, the estimation error from the subtractor 32 and the state estimation information from the Viterbi algorithm circuit 46. The channel estimation is made in parallel with the state estimation for the interference wave and for each survival path of the Viterbi algorithm. In accordance with the survival path into which the interference wave complex symbol sequence candidate from the modulated signal generating part 45 branches, the channel parameter estimation part 50 sets in the desired signal estimation part 10 and the interference signal estimation part 20 channel impulse response estimated values for the desired and interference signals corresponding to the survival path concerned. The above-described operations are repeated. For the last symbol in the training signal period, the channel impulse responds estimated value corresponding to the path which provides the maximum likelihood at that time, that is, the interference wave complex symbol sequence candidate of the maximum likelihood at that time, is selected and set in each of the desired and interference signal estimation parts 10 and 20, with which the above-mentioned operations is completed. Incidentally, in the data signal period the state estimation is carried out with the Viterbi algorithm to make the signal decision.

Turning next to the trellis diagram of FIG. 16B, the initialization of the tap coefficient will be described concretely in connection with the case of one interference wave. Also in the training period, for the interference wave, one survival path is selected for each state by the viterbi algorithm in accordance with the trellis diagram of FIG. 16B. Further, the tap coefficient exists for each state and, as described previously, each tap coefficient is updated along the survival path for each state. In FIG. 16B, $H_{ij}(k)$ denotes the tap coefficient vector in the state $S_{ij}$ at time kT. For convenience of description, assume that survival paths for the transition of states from time kT to (k+1)T, for example, are the paths indicated by the solid lines. Moreover, suppose that the time of completion of the desired signal training is (k+1)T and that the path which provides the maximum path metric (i.e. the maximum likelihood) until time (k+1)T is the full-lined path merging into a state $S_{01}(k+1)$. According to the present invention, the tap coefficient vector $H_{01}(k+1)$ corresponding to the state $S_{01}(k+1)$ becomes an estimated value of the channel impulse response. At this time, the tap coefficient vector $H_{01}(k+1)$ becomes the tap coefficient vector after completion of the training regarding, as the training signal sequence for the interference signal, the complex symbol sequence candidate corresponding to the path for transition to the state $S_{01}(k+1)$ via $S_{10}(k)$. In this example, the estimated value of the channel impulse response can be regarded as converging with the three-symbol training length.

Figure 17:
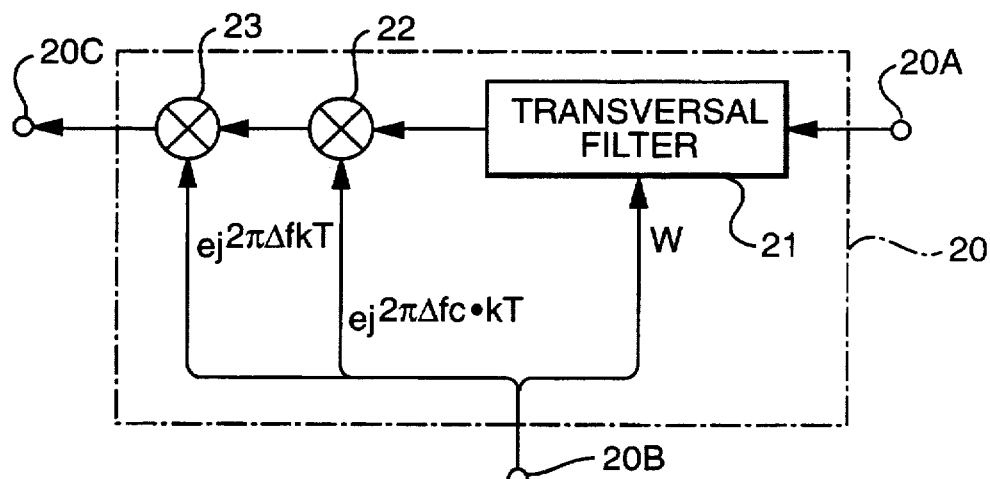
FIG. 17 is a block diagram of the received interference signal estimation part which is used when the desired and interference signals have different carrier frequencies.

The embodiments of the present invention described so far are also applicable when the carrier frequency of the interference wave differs from the carrier frequency of the desired wave; in this instance, the interference signal estimation part 20 needs only to be modified as shown in FIG. 17. With the illustrated configuration, the input complex symbol sequence candidate from a terminal 20A is subjected to a convolutional operation in the transversal filter 21 with a tap coefficient vector W input via a terminal 20B and the result of the operation is multiplied in a complex multiplier 22 by $\exp(j2\pi\Delta f_n nT)$, by which is provided a rotation corresponding to the carrier center frequency difference $\Delta f_c$ between the interference and desired waves. In the mobile radio communication system, a co-channel interference wave may sometimes be received, since a limited number of frequency channels are repeatedly assigned to a large number of zones. In such an instance, a slight shift of frequencies for the same frequency channel that are assigned to different zones will reduce the correlation of fading of channels reaching the mobile station; hence, the use of the FIG. 17 configuration will facilitate the cancelling of interference signals. Of course, the complex multiplier 22 need not always be provided at the output side of the transversal filter 21 and, though not shown, it may be provided at the output side of the transversal filter 11 or at the output side of each of them.

Moreover, this embodiment is designed also to compensate for a frequency offset $\Delta f$ which is the difference between the transmitting carrier center frequency and the received carrier center frequency of the receiver and in which the output signal from the complex multiplier 22 is multiplied by $\exp(j2\pi\Delta f_n T)$. Though not shown, a similar complex multiplier for offset compensation use is provided at the output side of the transversal filter 11 as well. By this, the estimated received desired signal and the estimated interference signal are rotated in phase in accordance with the carrier frequency offset $\Delta f$. The carrier center frequency difference $\Delta f_c$ and the carrier frequency offset $\Delta f$ are provided via the terminal 20B from the channel parameter estimation part 50. Incidentally, the frequency offset $\Delta f_c$ between the desired and interference signals may be preset between transmitting stations and made preknown at the receiver side.

Figure 18A:
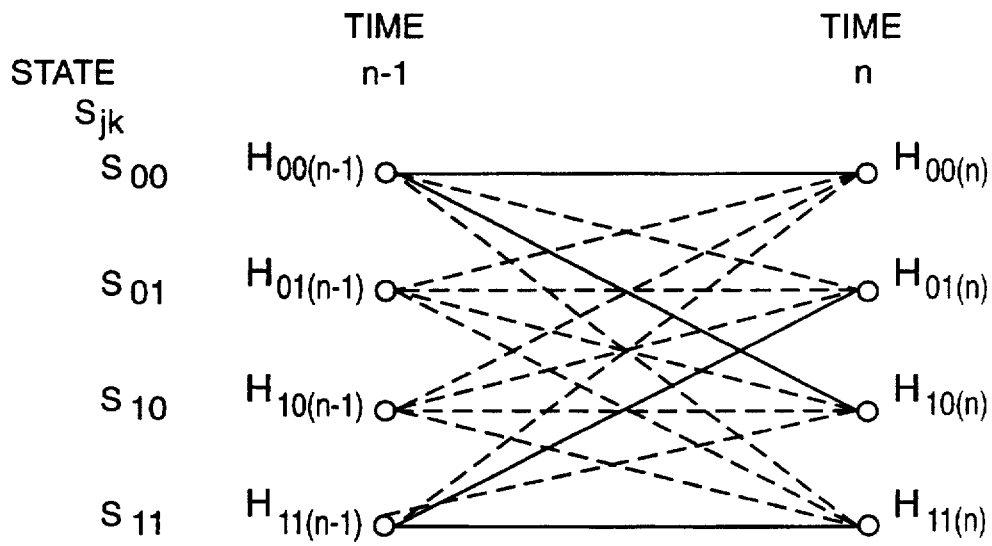
FIG. 18A is a trellis diagram in the case where Ld=Lu=1 in the BPSK transmission system.
Figure 18:
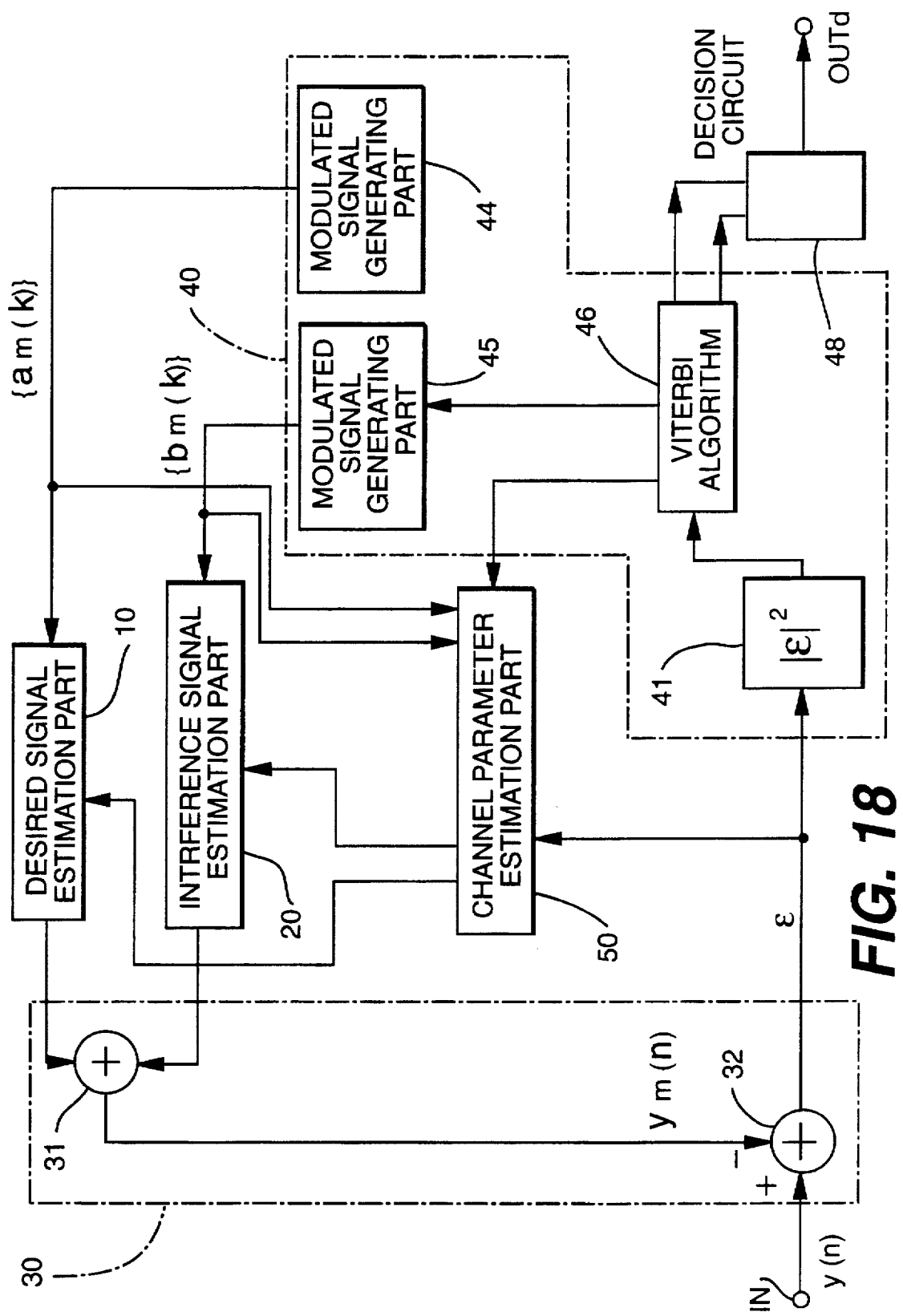
FIG. 18 is a block diagram of an embodiment which is applicable when training signals for the desired and interference signals are unknown.

FIG. 18 illustrates another modified form of the FIG. 16 embodiment in which the switch 61 and the training pattern register 63 for the desired signal are omitted. This is intended for use with a transmission system which does not transmit the preknown training signal for the desired signal as well; hence, in this case, the desired and interference wave training signals do not exist or they are unknown. The operation of this embodiment differs from the FIG. 16 embodiment in the channel estimation in the initial state and the discrimination of a decision signal for the desired signal by a decision circuit 48. The channel parameter estimation part 50 is operated to proceed from the initial state to the steady state, in which it operates in exactly the same manner as the operation in the data signal period described previously in respect of the embodiments of FIGS. 14 and 16. The operational differences will be described below.

In the initial state, the channel estimation should not be converged quickly. To meet this requirement, known training signals are usually used to make the channel estimation, but in this embodiment the training signals for the desired and interference waves do not exist or they are unknown. For the desired and interference waves, a signal decision is made by the state estimation with the Viterbi algorithm. In this instance, however, the channel estimation has not converged; hence, as in the case of the FIG. 14 embodiment, the number of states by the Viterbi algorithm needs to be increased from the steady state and {a(n−1), a(n−2), ..., a(n−Lexd), b(n−1), b(n−2), ..., b(n−Lexu)} is used. Here, a(n) and b(n) denote complex transmitted symbols of the desired and interference signals at time nT. Incidentally, Lexd≧Ld and Lexu≧Lu; for example, Lexd=2Ld and Lexu=2Lu. FIG. 18A shows a trellis diagram of the receiver of the present invention in the steady state when Ld=Lu=1. The modulation system used is BPSK, for instance. In the steady state, the state $S_{jk}(n)$ can be defined by the following equation, using possible transmitted symbols of the desired and interference signals.

$$S_{jk}(n)=\{a(n-1), b(n-1)\}$$

Here, a(n−1) and b(n−1) respectively take BPSK complex transmitted symbols $C_j$ and $C_k$ which are defined by the following equation, using j and k of the state $S_{jk}(n)$.

$$Cp = 1 \quad (p=0)$$
$$= -1 \quad (p=1)$$

Figure 18B:
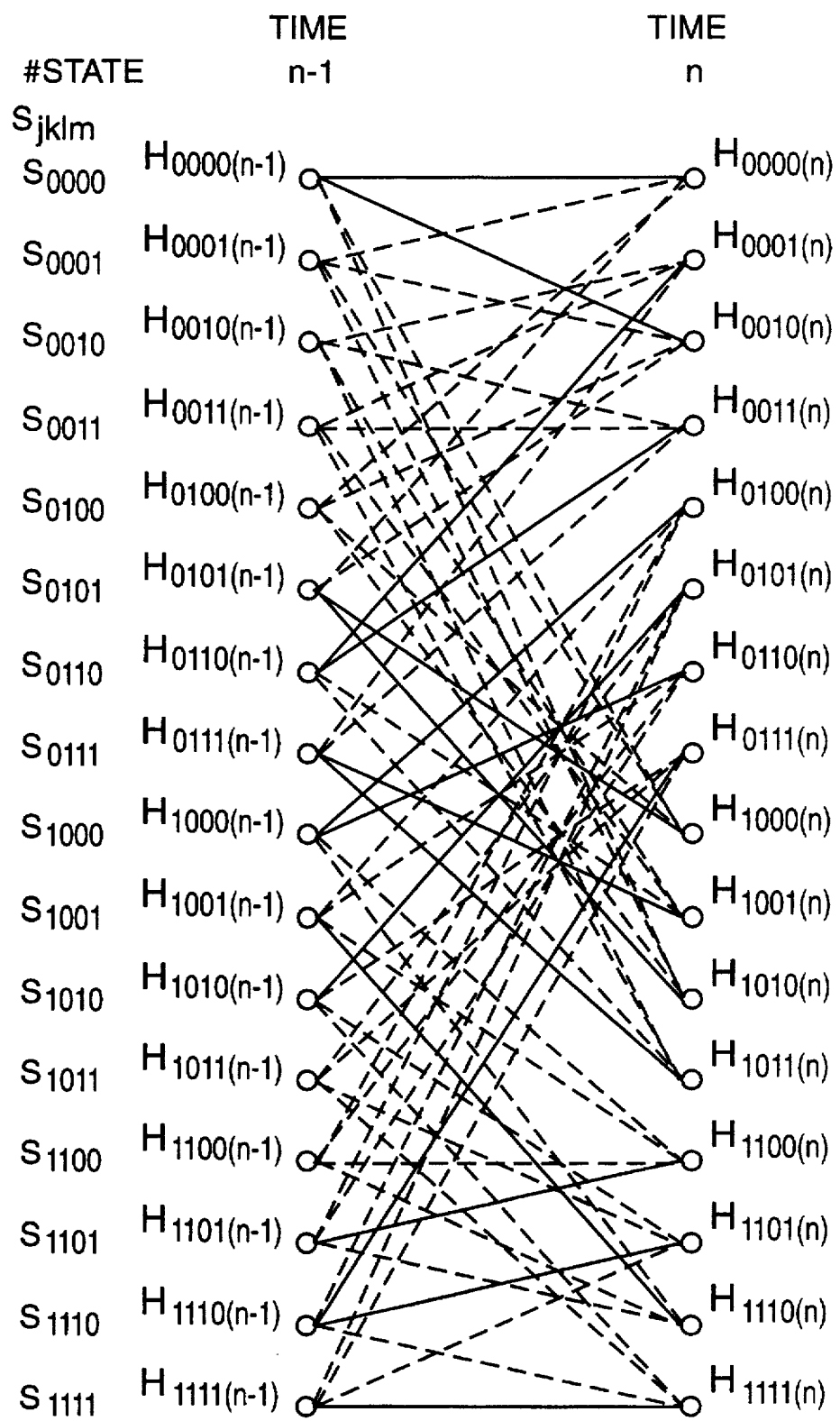
FIG. 18B is a trellis diagram in the case of increasing the numbers of states of the desired and interference signals, with Lexu=Lexd=2.

In this embodiment, the numbers of states are increased for the desired and interference signals. A description will be given of the case of having increased the numbers of states for the desired and interference signals by Ld=Lu=1, Lexd= 2Ld and Lexu=2Lu. FIG. 18B shows a trellis diagram in this case. In FIG. 18B, the BPSK modulation system is used. In this instance, the increased state $S_{jk1m}(n)$ is given by $$S_{jk1m}(n)=\{a(n-1), a(n-2), b(n-1), b(n-2)\} \quad (36)$$

where a(n−1), a(n−2), b(n−1) and b(n−2) assume, in turn, BPSK complex symbols $C_j$, $C_l$, $C_k$ and $C_m$. In general, where, in the case of BPSK system, Cp is defined as follows:

$$Cp = 1 \quad (p=0)$$
$$= -1 \quad (p=1)$$

In FIG. 18, the Viterbi algorithm circuit 46 outputs signal sequence candidate vectors corresponding to the state transitions of the desired and interference signals in accordance with the trellis of the increased number of states, and based on the outputted vectors, the modulated signal generating parts 44 and 45 output complex symbol sequence candidates for the desired and interference signals, respectively. The channel parameter estimation part 50 makes the channel estimation on the basis of the complex symbol sequence candidates for the desired and interference waves, the estimation error and the state estimation information from the Viterbi algorithm circuit 46. The channel estimation is made in parallel with the estimation states for the desired and interference signals and for each survival path of the Viterbi algorithm. Further, in accordance with the survival path into which the desired and interference wave complex symbol sequence candidates from the modulated signal generating part 44 and 45 each branch, the channel parameter estimation part 50 sets in the desired signal estimation part 10 and the interference signal estimation part 20 the channel impulse response estimated values of the survival paths concerned. The above-described operations are repeated. When the channel parameter estimation part 50 proceeds from the initial state to the steady one, it selects channel impulse response estimated values corresponding to the paths of the maximum likelihood at that time, that is, the complex symbol sequence candidates for the desired and interference signals which provides the maximum likelihood at that time; these estimated values are set in the signal estimation parts 10 and 20, with which the above operation is completed.

In FIG. 18B, the solid- and dashed-line paths indicate paths that are possible of transition from the states at time (n−1)T to the states at time nT. It is seen, in FIG. 18B, that four paths merge into each state at time nT. $H_{jk1m}(n)$ denotes the tap coefficient vector in the state $S_{jk1m}(n)$ at time nT and it has, as its elements, the tap coefficients $\{h_{d,jk1m}(1), h_{d,jk1m}(0)\}$ and the tap coefficient $\{h_{u,jk1m}(1), h_{u,jk1m}(0)\}$ that are set in the transversal filters 11 and 21 for the desired and interference signals, respectively; it is expressed by $$H_{jk1m}(n)=[h_{d,jk1m}(1), h_{d,jk1m}(0), h_{u,jk1m}(1), h_{u,jk1m}(0)]^T \quad (37)$$

In the above embodiment, the numbers of states of the desired and interference signals are increased by setting Lexd=Lexu=2, but since Ld=Lu=1, the number of taps of each of the transversal filters for the desired and interference signals is two.

The updating of the path metric and the updating of the tap coefficient vector are performed using the Viterbi algorithm, for instance, along a particular one of the paths that are possible of transition, shown in FIG. 18B. In more concrete terms, the path of the largest path metric value (i.e. of the maximum likelihood) for each state at time nT is left as a survival path and the tap coefficient vector is also updated along this survival path. Now, assume, for convenience of description, that the paths indicated by the solid lines are survival paths for each state at time nT in FIG. 18B. For example, the tap coefficient vector $H_{0001}(n)$ for the state $S_{0001}(n)$ at time nT is computed by updating the tap coefficient vector $H_{0110}(n-1)$ at the time (n−1)T through use of the adaptation algorithm. Suppose that time nT in FIG. 18B, for example, is the time when the channel parameter estimation part proceeds from its initial state to the steady one (the last sample point in the training period, for instance). In this case, that one of the paths for 16 states at time nT which provides the maximum path metric (the maximum likelihood) is selected and the tap coefficient vector at this time is used as the estimated value of the channel impulse response for each of the desired and interference signals. For example, if the path which merges into the state $S_{0010}(n)$ at time nT in FIG. 18B provides the maximum likelihood, the tap coefficient vector $H_{0010}(n)$ becomes the tap coefficient vector after completion of the training in which complex symbol sequences {1,1,1} and {1,1,−1} of the desired and interference signals, which are obtainable along the path of the maximum likelihood, are regarded as the training sequences.

Next, a description will be given of the operation of the decision circuit 48. The Viterbi algorithm circuit 46 makes a signal decision by the state estimation using the Viterbi algorithm and outputs decided signals for the desired and interference waves. Since no training signals are used for the desired and interference signals, the decided signals for the desired and interference waves cannot usually be distinguished from each other. When the carrier frequency of the interference wave differs from that of the desired wave, or when the modulation system for the interference wave differs from that for the desired wave, however, they can be distinguished from each other; the decision circuit 48 receives the decided signals for the desired and interference waves and discriminates and outputs the desired signal decided signal. While the present invention has been described in connection with the case of the single interference, the invention can easily be applied even when two or more interference waves exist.

Figure 19:
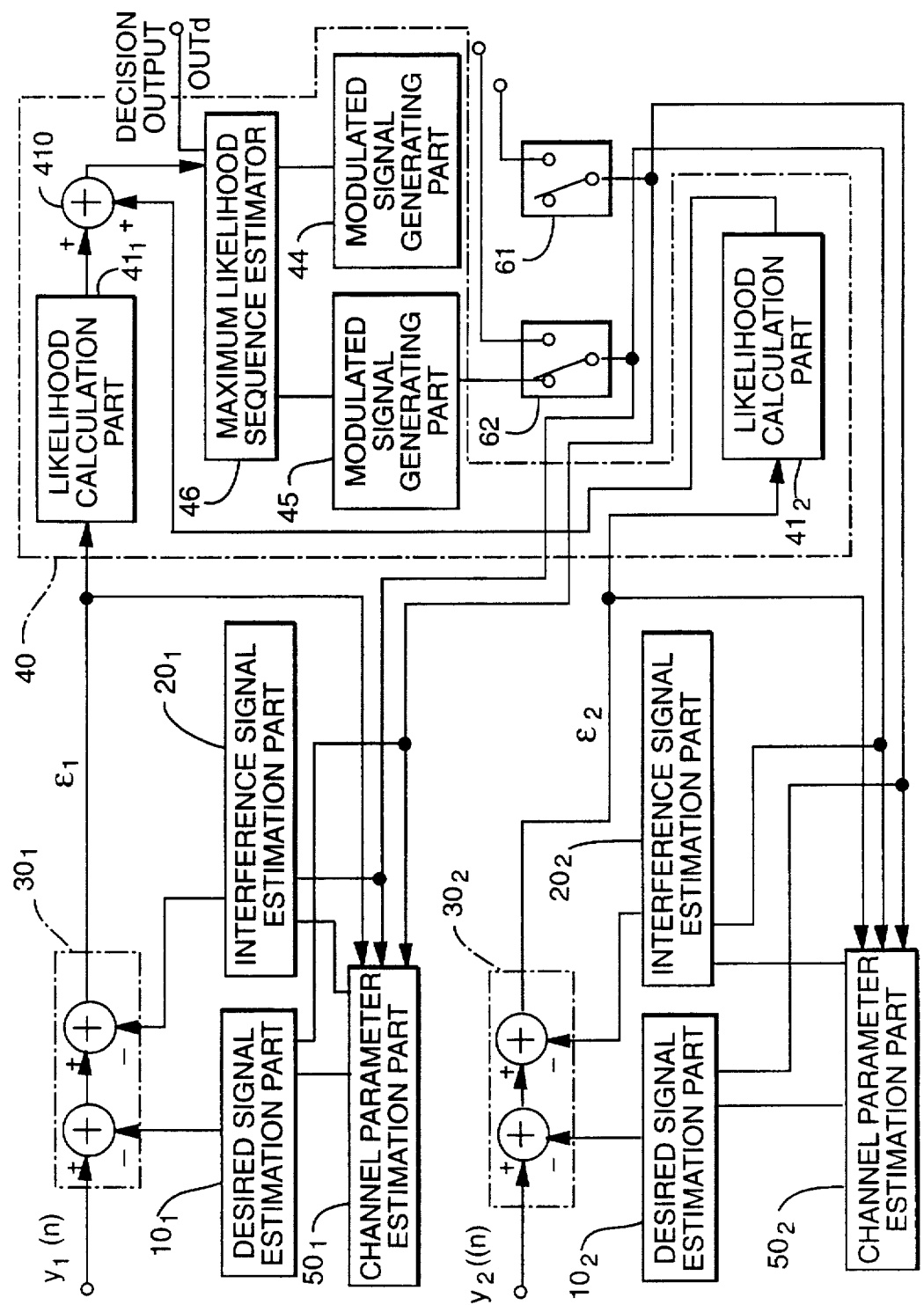
FIG. 19 is a block diagram of an embodiment for diversity reception.

The receiver according to the present invention, described above in each embodiment, can be formed as a diversity receiver, as exemplified in FIG. 19. In FIG. 19, the desired signal estimation part 10, the interference signal estimation part 20, the error estimation part 30 and the channel parameter estimation part 50 in FIG. 4 are each provided in pairs corresponding to two antennas not shown, and estimated received desired and interference signals are subtracted from received signals $y_1(n)$ and $y_2(n)$ in error estimation parts $30_1$ and $30_2$ to obtain estimation error signals $\epsilon_1$ and $\epsilon_2$. These estimation error signals $\epsilon_1$ and $\epsilon_2$ are used to calculate square errors $|\epsilon_1|^2$ and $|\epsilon_2|^2$ in likelihood calculation parts $41_1$ and $41_2$ to obtain likelihood signals (branch metrics) $-|\epsilon_1|^2$ and $-|\epsilon_2|^2$. These signals are added together by an adder 410 to obtain one likelihood signal (branch metric) $-|\epsilon|^2$. The output $-|\epsilon|^2$ from the adder 410 is applied to the maximum likelihood sequence estimator 46 provided in common to the desired and interference signals, as in the FIG. 8 embodiment, and based on the adder output, desired and interference signal sequences are estimated by the maximum likelihood sequence estimator. The complex symbol sequence candidates from the modulated signal generating parts 44 and 45 are provided to two desired signal estimation parts $10_1$ and $10_2$ and two interference signal estimation parts $20_1$ and $20_2$, respectively, while at the same time they are fed to tap coefficient control parts $50_1$ and $50_2$. The operations of these parts are evident from the descriptions given previously of FIGS. 4 and 8, and hence will not be described. According to the diversity scheme, also in the case of receiving signals from more than two antennas, the desired signal estimation parts 10, the interference signal estimation parts 20, the error estimation parts 30 and the channel parameter estimation parts 50 of the same number as that of the antennas are provided; respective branch metrics are calculated in the state estimation part 40 and their added value can be used to make the maximum likelihood estimation.

In the receiver of the present invention, the maximum likelihood sequence estimation is made by the maximum likelihood estimator, using the likelihood signal obtainable from the error signal common to the desired and interference signal sequences. Hence, there are cases where the discrimination between the desired and interference signals is difficult when they bear particular amplitude and phase relationships. This phenomenon will be described with reference to FIGS. 20A, 20B, 20C and 20D, 20E, 20F. The following description will be made of the case where the BPSK modulation system is used; but the same phenomenon occurs in connection with other modulation systems.

Figure 20A:
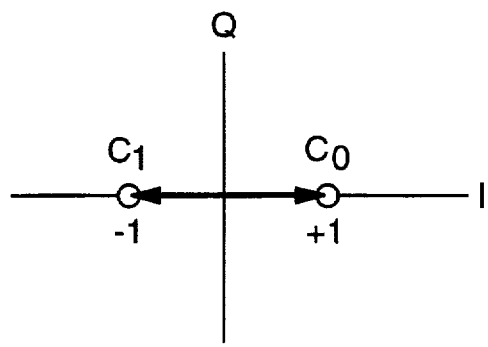
FIG. 20A is a diagram showing an example of the desired signal constellation in the BPSK transmission system.
Figure 20D:
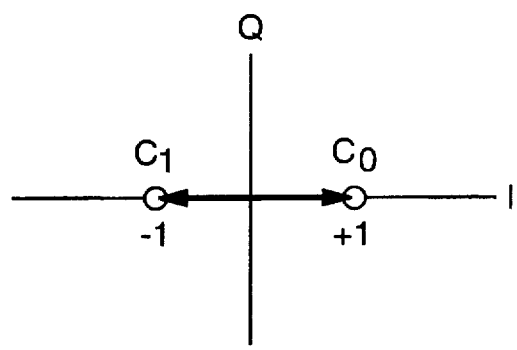
FIG. 20D is a diagram showing an example of the desired signal point in the BPSK transmission system.
Figure 20B:
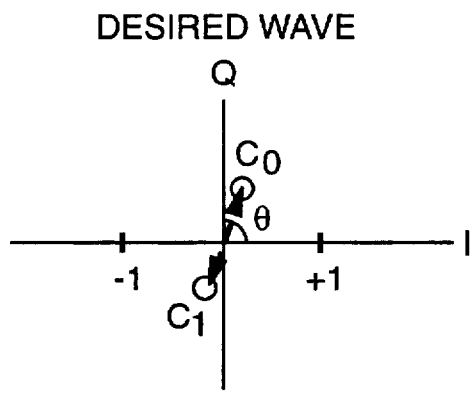
FIG. 20B is a diagram showing the interference signal point of CIR=3 dB and a phase difference θ with respect to the signal shown in FIG. 20A.
Figure 20E:
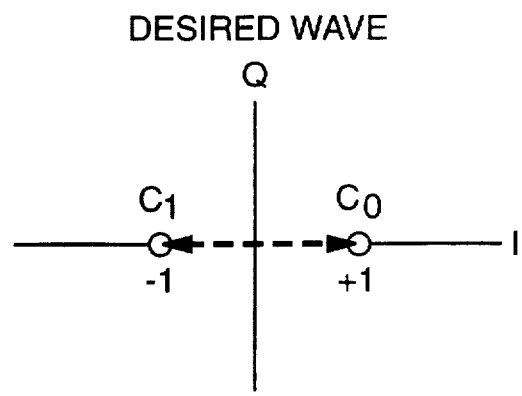
FIG. 20E is a diagram showing an interference signal which is equal in amplitude to and in-phase with the signal depicted in FIG. 20D.
Figure 20C:
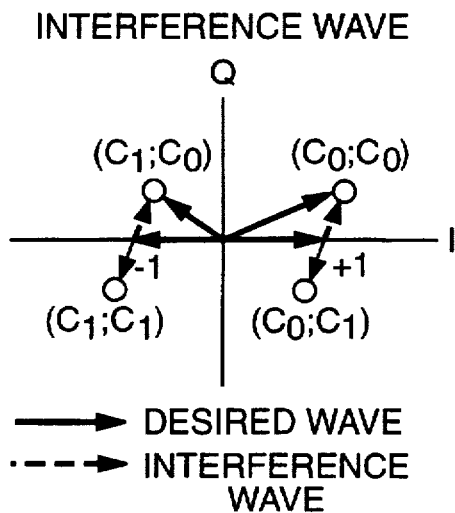
FIG. 20C is a diagram showing a received signal composed of the signals depicted in FIGS. 20A and 20B.

FIGS. 20A, 20B and 20C show, byway of example, the case where signal points of the desired and interference signals can be discriminated from each other. In FIG. 20C there is shown a composite or combined received signal when having received the desired signal of FIG. 20A and the interference signal of FIG. 20B which have a desired signal vs. interference signal power ratio (CIR) of 3 dB and are displaced a degree θ apart in phase. The two signals are displayed on the IQ plane. Let it be assumed, in FIG. 20C, that (C1; C0), for example, represents that the complex symbol of the desired signal is C1 and the complex symbol of the interference signal C0. In FIG. 20C, since the desired and interference signals have an amplitude level difference and a phase difference between them, the number of combined received signal points for the desired and interference signals is four and can be discriminated.

Figure 20F:
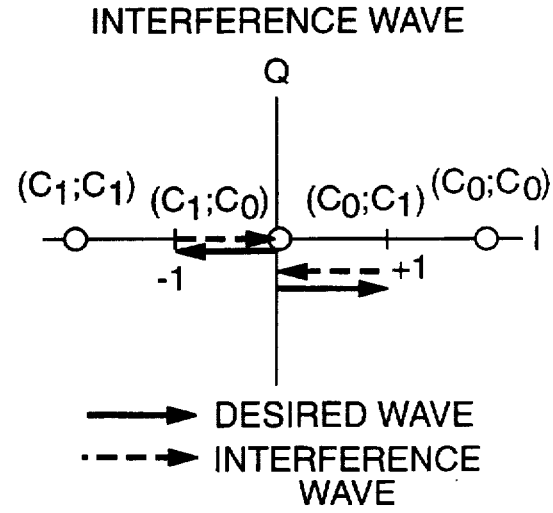
FIG. 20F is a diagram showing a received signal composed of the signals depicted in FIGS. 20D and 20E.

FIGS. 20D, 20E and 20F show, by way of example, the case where signal points of the desired and interference signals cannot be discriminated. FIG. 20F is a signal space diagram of a composite received wave when the desired signal of FIG. 20D and the interference signal of FIG. 20E, which have the same amplitude and the same phase, are superimposed on each other. When the sets of complex symbols of the desired and interference signals are (C0; C1) and (C1; C0) in FIG. 20F, the signal points of the composite received wave overlap at the origin in both cases; making it impossible to discriminate between (C0; C1) and (C1; C0) on the basis of the composite received signal.

Figure 21:
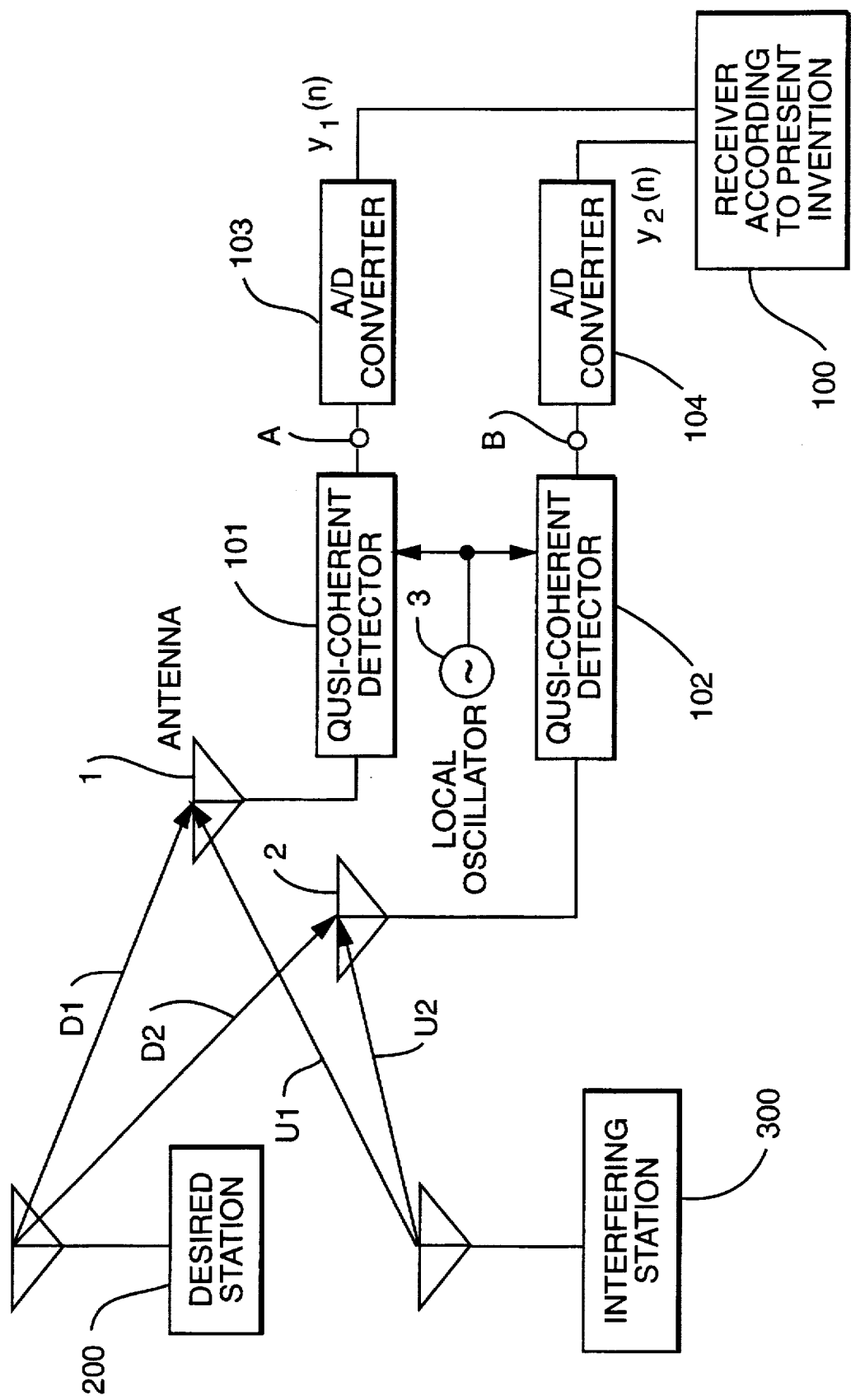
FIG. 21 is a block diagram of a communication system for diversity reception.

The diversity reception is effective in suppressing the degradation of the transmission characteristic which is caused when the amplitudes and phases of the desired and interference signals bear such particular relationships as referred to above. FIG. 21 illustrates in block form the transmitting-receiving system when the receiver according to the present invention, identified by 100, is formed as a diversity receiver. In FIG. 21, a receiving antenna 1 receives a desired signal transmitted over a channel D1 from a desired station 200 and an interference signal transmitted over a channel U1 from an interfering station 300. Another receiving antenna 2 receives a desired signal transmitted over a channel D2 from the desired station 200 and an interference signal transmitted over a channel U2 from the interfering station 300. Composite received waves from the receiving antennas 1 and 2 are quasi-coherently detected by quasi-coherent detectors 101 and 102 with a local signal from a local oscillator 3, and the detected outputs are converted by A/D converters 103 and 104 into digital signals $y_1(n)$ and $y_2(n)$, respectively, which are input into the receiver 100 of such a diversity configuration as shown in FIG. 19. In the diversity reception, the receiving antennas 1 and 2 are disposed apart from each other, and hence a path difference is present between them. Furthermore, the correlation of fading is also low between them. Accordingly, the diversity reception remarkably lessens the probability that the amplitude and phase relationships between desired and interference signal components of the combined or composite received signals $y_1(n)$ and $y_2(n)$ received by the receiving antennas 1 and 2 and then detected simultaneously become the above-mentioned amplitude and phase relationships which make the signal discrimination impossible. Thus, it is possible to suppress the degradation of the characteristic which is caused by the impossibility of the signal discrimination.

Figure 22:
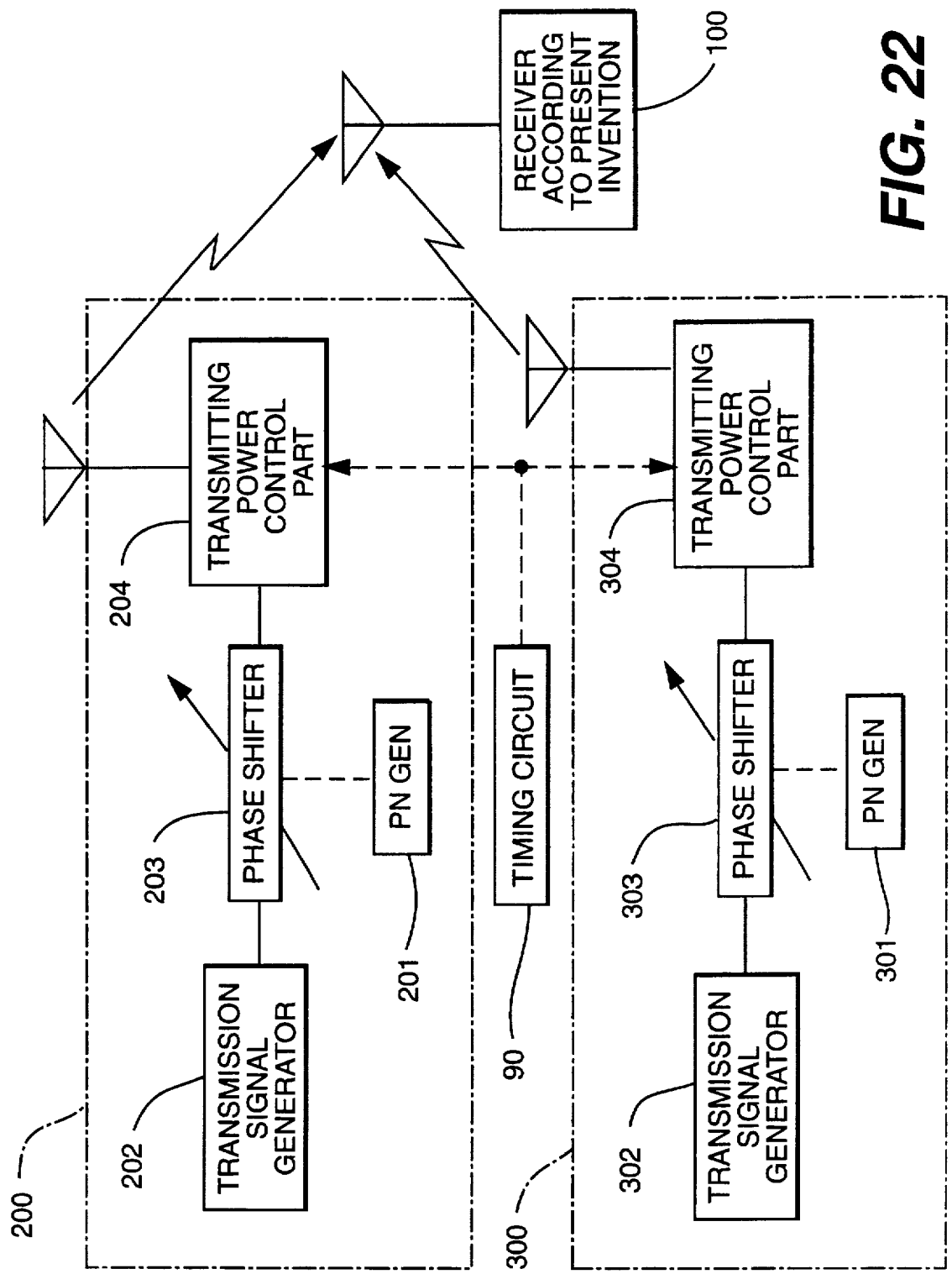
FIG. 22 is a block diagram of a communication system wherein different transmitting stations use different amplitudes and phases of signals for transmission.
Figure 23:
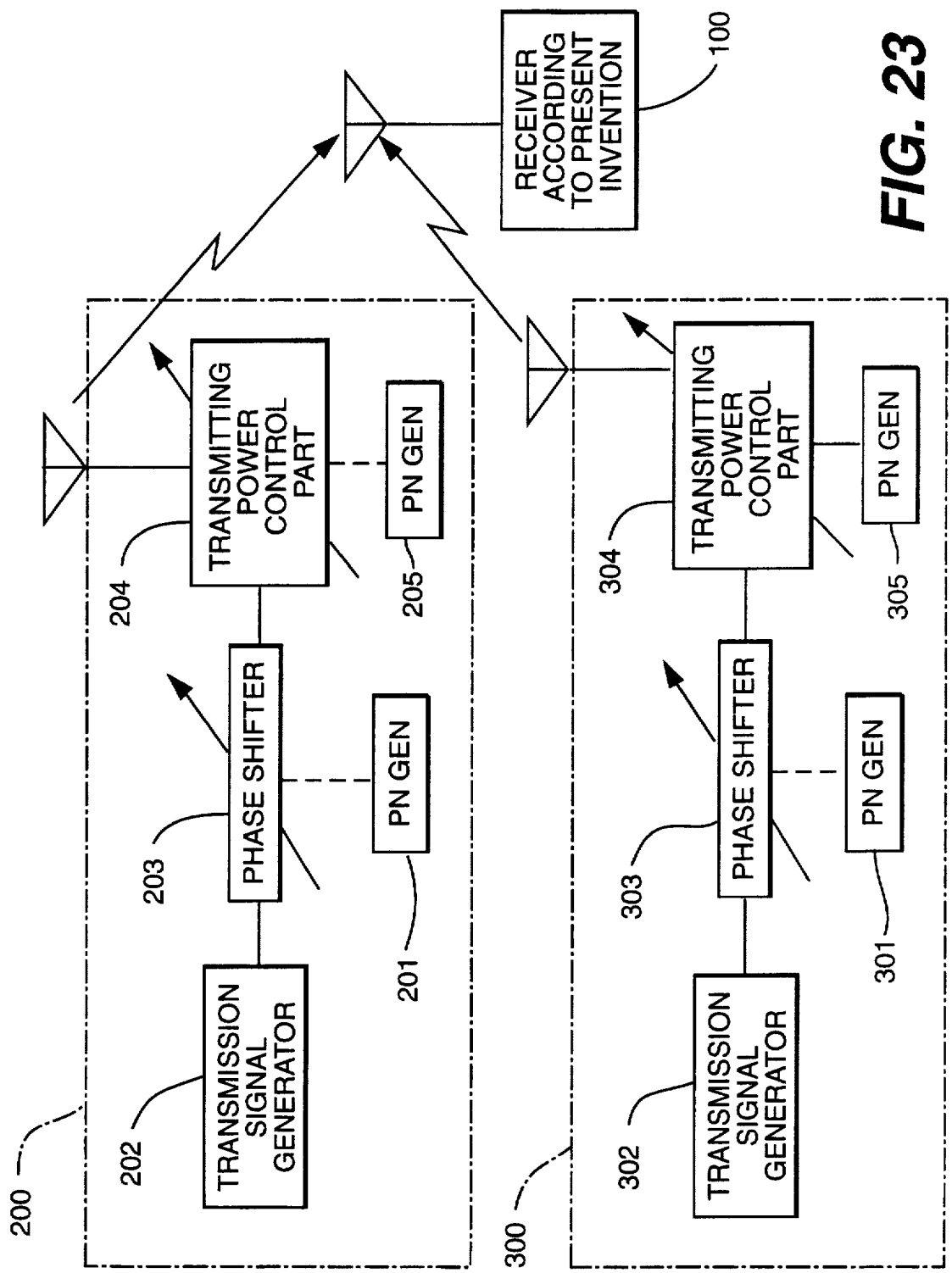
FIG. 23 is a block diagram of a communication system wherein different transmitting stations independently control the amplitudes and phases of signals for transmission.

The degradation of the transmission characteristic, which is caused by the particular amplitude and phase relationships between the desired and interference signals, could be suppressed by changing the amplitudes and phases of the transmitted desired and interference signals for each burst. FIGS. 22 and 23 illustrate in block form examples of a communication system designed therefor. The receiver 100 for use in this communication system may be the receiver described above in respect of each of the foregoing embodiments. In the communication system of FIG. 22, the desired station 200 and the interfering station 300 employ PN signal generators 201 and 301 which generate different pseudo-random sequences; random phases from 0 through $2\pi$ are generated by these PN signal generators, respectively, and the phases of transmission signals from transmission signal generators 202 and 302 are changed at random by phase shifters 203 and 303 for each burst to lessen the probability of the desired and interference signals continuing to bear the particular phase relationship which degrades the transmission characteristic. Thus, the degradation of the transmission characteristic is suppressed. Furthermore, in this example, a common timing signal is applied from a timing signal generator 90 to the interfering station 300 and the desired station 200 to provide synchronized timing of the transmission burst between the desired station 200 and the interfering station 300 so that transmitting power control parts 204 and 304 control the power of the transmission signals for each burst to provide a constant level difference between the both signals. This further suppresses the degradation of the transmission characteristic.

FIG. 23 illustrates another embodiment which controls the amplitudes and phases of transmission signals to prevent the desired signal and the interference signal from bearing the particular amplitude and phase relationships which degrade the transmission characteristic. In FIG. 23, the desired station 200 and the interfering station 300 respectively employ second PN generators 205 and 305 which generate different PN sequences, instead of controlling the transmitting power with the common timing signal as in the FIG. 22 example. The PN sequences by the PN generators 205 and 305 are used to randomly change the amplitudes of the desired and interference signals for each burst in the transmitting power control parts 204 and 304. Thus, the amplitudes and phases of the desired and interference signals are controlled so that they do not continue to bear the particular relationships which deteriorate the transmission characteristic.

As described above, according to the present invention, the degradation of the transmission characteristic by particular amplitude and phase relationships of the desired and interference signals can be suppressed by controlling the phases and amplitudes of the desired and interference signals at the transmitting sides. Incidentally, in the embodiments of FIGS. 22 and 23 either one of the amplitude control and the phase control may be omitted. The amplitudes and phases of the desired station 200 and the interfering station 300 may continuously be varied independently of each other, not for each burst. It is preferable that the amplitude and phase variations in this case be made within the range wherein the adaptation algorithm for the updating of the tap coefficient can track channel variations.

As described above, according to the present invention, the interference signal component, which is contained in the error signal obtained by subtracting the received desired signal estimated value from the received signal sample value, can be cancelled using the interference signal estimated value. Hence, the likelihood signal for the maximum likelihood sequence estimation of the desired signal can be made free from the influence of the interference wave, and consequently, even if the interference signal is contained in the received signal, it is possible to suppress the deterioration of the receiving performance by the interference wave and hence obtain an excellent receiving performance.

Figure 24A:
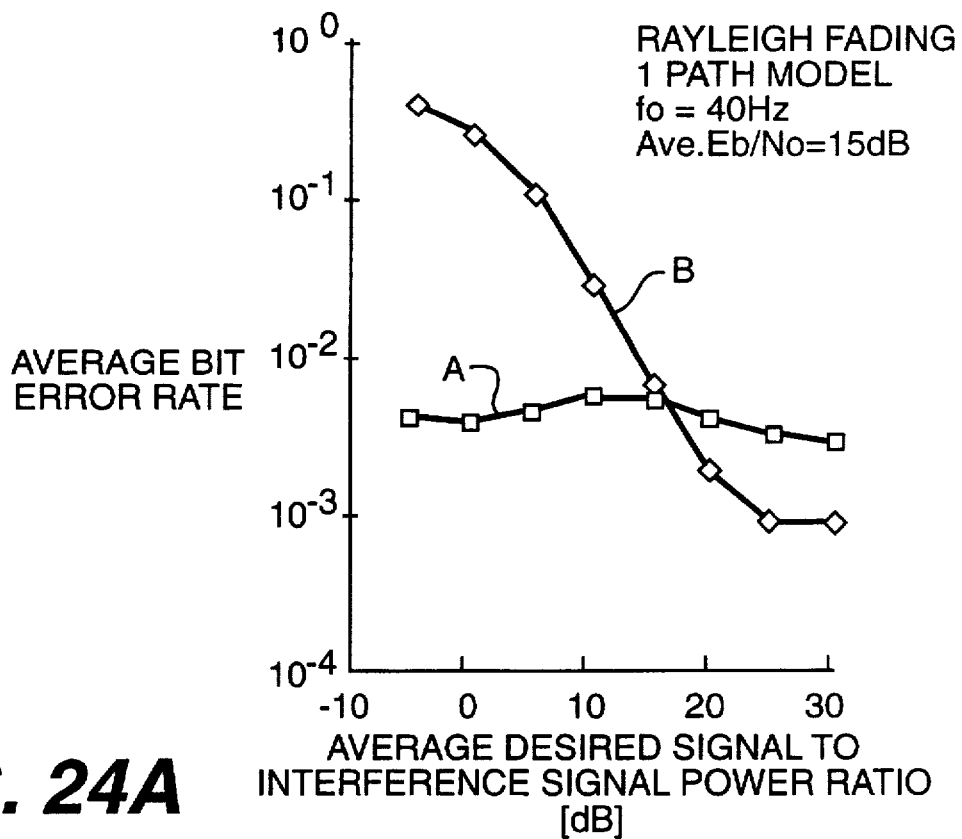
FIG. 24A is a graph showing an average bit error rate characteristic to demonstrate the effect of the present invention.
Figure 24B:
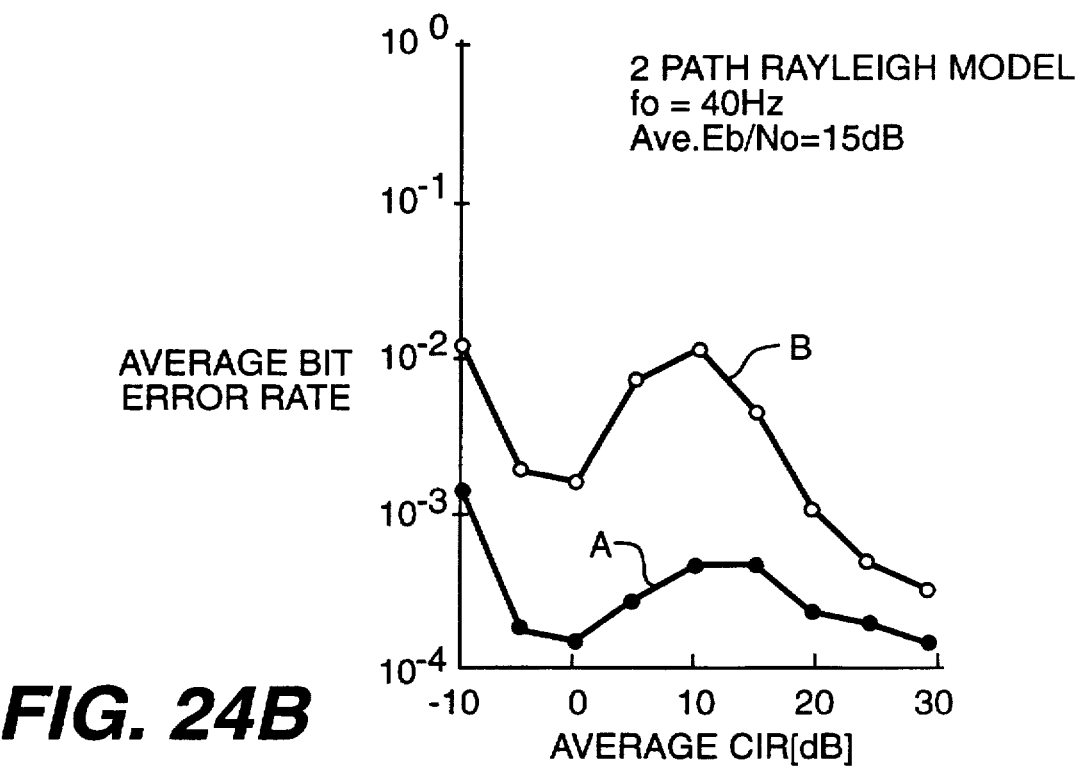
FIG. 24B is a graph showing the effect of the present invention which is produced when the received signal contains interference signals from two different stations.

To quantitatively demonstrate the effect of the present invention, an average bit error rate performance of a Rayleigh fading channel is shown in FIG. 24A. The curve A is the characteristic of the diversity receiver of FIG. 19. The curve B in FIG. 24A indicates the characteristic of the diversity type receiver which has the conventional adaptive equalization feature and uses the maximum likelihood sequence estimation scheme. In FIG. 24A the abscissa represents the power ratio (an average CIR) between the desired and interference signals and the ordinate represent the average bit error rate. As shown in FIG. 24A, the receiver of the present invention has an excellent performance in that the average bit error rate can be held below $10^{-2}$ even when the average CIR is −5 dB, that is, even when the interference signal level is higher than the desired signal level as much as 5 dB. The curve B in FIG. 24B indicates the characteristic of the receiver of the present invention when two interference signals are received. The receiver in this instance is a diversity one. From FIG. 24B it is seen that the present invention permits the cancelling of interference even if two interference waves are received.

While in the above the present invention has been described on the assumption that the same modulation system is used for the desired and interference signals, for example, that the modulated signal generating parts 44 and 45 in FIG. 4 are identical in construction, the invention is also applicable when different modulation systems are used for the desired and interference signals.

Figure 25:
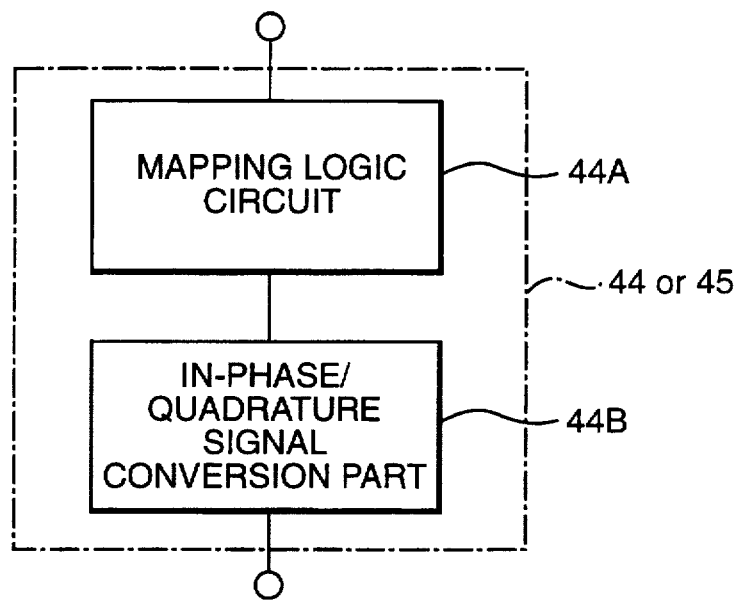
FIG. 25 is a block diagram of a modulated signal generating part capable of producing modulated signals corresponding to various modulation systems.

In FIG. 25 there is shown an example of the construction for the modulated signal generating parts 44 and 45 that can be used when different modulation systems are employed for the desired and interference signals in embodiments of FIGS. 4, 8, 10, 11, 12 and 14. The desired signal sequence candidate (a symbol sequence candidate) or interference signal sequence candidate (a symbol sequence candidate), which as provided from the maximum likelihood estimator 47 or 48, is mapped by a mapping logic circuit 44A into signal points on the IQ complex signal plane. An in-phase/ quadrature signal conversion part 44B converts the output from the mapping logic circuit 44A into an in-phase component (real part) signal I and a quadrature component (imaginary part) signal Q of a complex signal.

Figure 26:
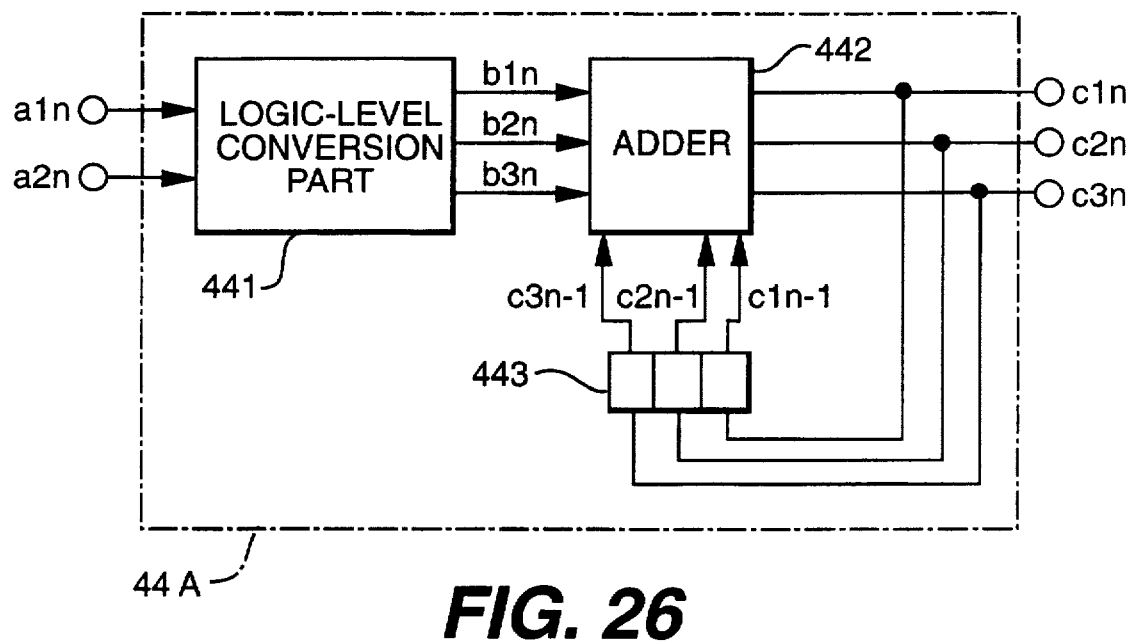
FIG. 26 is a block diagram of an example of a mapping logic circuit in FIG. 25.
Figures 27, 28, 29:
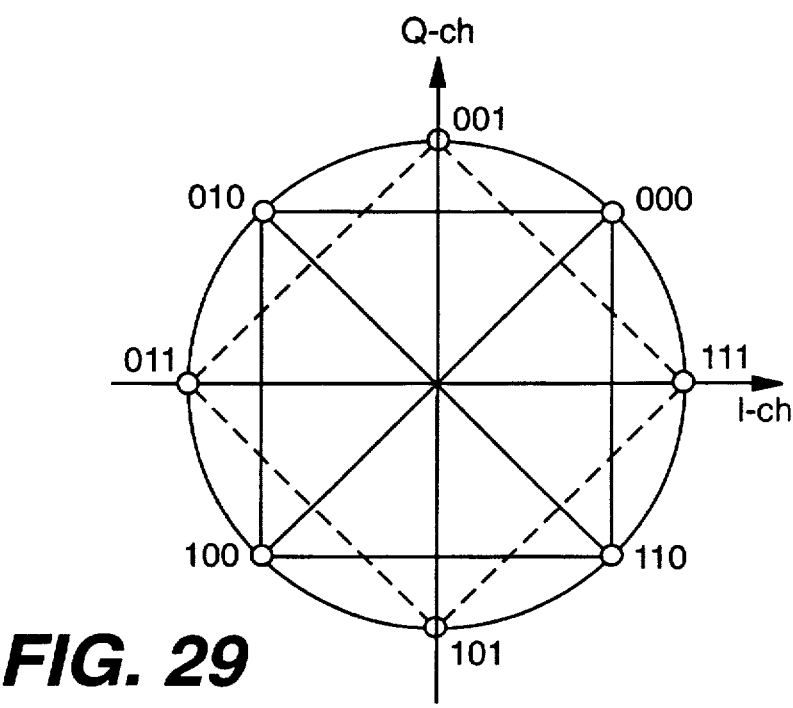
FIG. 27 is a diagram showing a reference table which is provided in a conversion part 441 in FIG. 26 for DQPSK modulation.
FIG. 28 is a diagram showing a reference table which is provided in the conversion part 41 in FIG. 26 for π/4 shift DQPSK modulation.
FIG. 29 is a diagram showing I and Q signal points for the DQPSK and the π/4 shift DQPSK modulation.

A description will be given of the case where DQPSK and π/4 shift DQPSK modulation systems are used for the desired and interference signals, respectively. FIG. 26 shows an example of the mapping logic circuit 44A for use in this embodiment. In this embodiment, the symbol sequence from the maximum likelihood sequence estimator 42 or 43 is input as two-bit information {a1n, a2n} into the mapping logic circuit 44A. The input two-bit information is converted into three-bit phase difference information {b1n, b2n, b3n} by a logic-level conversion part 441 having a DQPSK look-up table shown in FIG. 27 when the mapping logic circuit 44A is the modulated signal generating part 44 of the desired signal and by a logic-level conversion part 441 having a π/4 shift DQPSK look-up table shown in FIG. 28 when the mapping logic circuit is the modulated signal generating part 45 for the interference signal. The phase difference signal is differentially coded by an adder 442 and a memory circuit 443 and output as three-bit signal point positional information {c1n, c2n, c3n}, where n denotes time t=nT (T being a transmitted symbol period). The signal point positional information is input into the in-phase/ quadrature signal conversion part 44B, wherein it is converted into complex signals of I and Q channels shown in FIG. 29. In this embodiment, desired modulation systems can be used for the desired and interference signals by making the look-up tables of FIGS. 27 and 28 suitable for use with the respective modulation systems. While this embodiment has been described in connection with the case of using the DQPSK and π/4 shift DQPSK modulation systems, the present invention can easily be implemented as well in the cases of using QAM, GMSK, PSK, offset QPSK and trellis code modulation systems, by forming the modulated signal generating parts 44 and 45 in accordance with the individual modulation systems used. Even if two or more interference signals are received, the invention can easily be implemented by using the modulated signal generating parts 44 and 45 of the same number as the interference signals and corresponding to the modulation system used therefor.

As described above, according to the present invention, the desired and interference signals are estimated at the same time. When the received signal levels of the desired and interference signals are equal, there are cases where a plurality of signal points overlap in the combined received signal, making it difficult to estimate a correct signal sequence. This could be prevented by using different modulation systems for the desired and interference signals to enable discrimination of the signal points. In general, however, it is difficult to employ different modulation schemes in the same communication system. In such an instance, a correct combination of desired and interference signals can be selected from the overlapping signal points by utilizing a coding scheme for transmitted signals. A simple method is to use a trellis coded modulation scheme. With the trellis coded modulation scheme, an increase in the number of transmitted symbols prevents lowering of the transmission bit rate caused by coding and, at the same time, suppresses the state transition of the transmitted symbols. This permits observation of signals over a certain constraint length, increases the probability of avoiding the impossibility of discrimination between the desired and interference signals due to overlapping of both signals of the same level, and hence improves the average bit error rate characteristic. In the trellis coding, the use of different coders for the desired and interference signals further ensures avoidance of the impossibility of discrimination between the two signals. Moreover, in the trellis coded modulation scheme, the characteristic of the fading channel may sometimes be degraded. In this case, it is effective to perform the trellis coded modulation in accordance with the received signal levels of the desired and interference signals and the fading of the channel.

As described above, according to the present invention, the channel estimation is made using the results of estimation of the desired and interference signal sequences, and consequently, an erroneous decision of the desired and interference signal sequences will seriously affect the channel estimation. From FIG. 24A showing the effect of the FIG. 19 embodiment, it is seen that the average bit error rate in the present invention slightly increases in the vicinity of 15 dB although the average power ratio between the desired and interference signals increases. The tendency of this degradation may sometimes increase according to the channel condition. This can be explained as follows: When the average power ratio between the desired and interference signals increases, the received signal level itself of the interference signal lowers, while at the same time the signal-to-noise ratio of the interference signal gets worse, making it difficult to estimate the correct interference signal sequence. As a result, a wrong interference signal sequence is used to make the channel estimation for the interference signal and the accuracy of estimation of the conversion parameter (i.e. the tap coefficient) of the interference signal estimation part is seriously impaired. Consequently, the estimated interference signal is badly inaccurate and the estimation error signal is seriously affected. Thus, the accuracy of estimation of the desired signal sequence as well as the interference signal sequence in the state estimation part is also seriously impaired. This problem could be solved by subjecting transmission data to convolutional coding at the transmitting side and making an error correction at the receiving side to reduce the sequence estimation error due to the deterioration of the SN ratio.

The convolutional coding at the transmitting side decreases the signal transmission bit rate but provides a high degree of freedom to choose a coding scheme unlike the trellis coding modulation scheme. It is possible to employ, for example, a coding scheme in which the interference signal level dependent on the average desired signal to interference signal power ratio is low to such an extent as not to exert influence on the channel estimation and an error decreases in the estimation of the sequence of the interference signal having the SN ratio at that time. In mobile radio communication, the channel may sometimes perform a multi-path propagation. Under such propagation environment, it is effective to simultaneously perform, in the receiver, convolutional decoding by the coding of the transmitted data sequence and equalization of the influence by the convolution of the channel due to delay waves or the like. This could be implemented by limiting the state transition in view of the convolutional coding of the transmitted data sequence and by making the maximum likelihood sequence estimation in the state estimation part 40 in FIG. 4. In the convolutional coding of the transmitted data sequence, the same or different codes can be used for the desired and interference signals. It is also effective to effect ON-OFF control for a transmitted data sequence coding unit in accordance with the error rates for the desired and interference signals. In this case, a state estimation part of the trellis corresponding to the convolutional coding by the present invention and a state estimation part of a trellis corresponding to the convolutional coding, that is, taking into account the convolution of the channel alone, are selectively used.

Having thus described our invention, we claim:

1. A receiver comprising:

desired signal estimation means for converting a desired signal sequence candidate into an estimated received desired signal in accordance with a channel parameter and outputting said estimated received desired signal;

interference signal estimation means for converting an interference signal sequence candidate into an estimated received interference signal in accordance with a channel parameter and outputting said estimated received interference signal;

error estimation means connected to the outputs of said desired signal estimation means and said interference signal estimation means, for generating an estimation error signal by subtracting, from a received signal, said estimated received desired signal from said desired signal estimation means and said estimated received interference signal from said interference signal estimation means;

state estimation means connected to the output of said error estimation means and to inputs of said desired signal estimation means and said interference signal estimation means for producing a plurality of desired signal sequence candidates and a plurality of interference signal sequence candidates respectively corresponding to a predetermined plurality of sequences of states of signal transition and for providing said plurality of desired signal sequence candidates and said plurality of interference signal sequence candidates to said desired signal estimation means and said interference signal estimation means, respectively, said state estimation means being operative to output, as the result of a sequence decision, that one of said desired signal sequence candidates that is estimated to be a desired signal sequence contained in said received signal on the basis of said estimation error signal generated by said error estimation means; and control means connected to the output of said state estimation means and to inputs of said desired signal estimation means and said interference signal estimation means, for controlling said channel parameters of said desired signal estimation means and said interference signal estimation means by an adaptation algorithm on the basis of said desired signal sequence, said interference signal sequence and said estimation error signal;

said desired signal estimation means and said interference signal estimation means being formed by first and second transversal filters with predetermined numbers of taps, respectively, and said control means generating, as said channel parameters, first and second tap coefficient vectors representing channel impulse responses and providing said first and second tap coefficient vectors to said first and second transversal filters.

2. A receiver comprising:

desired signal estimation means for converting a desired signal sequence candidate into an estimated received desired signal in accordance with a channel parameter and outputting said estimated received desired signal;

interference signal estimation means for converting an interference signal sequence candidate into an estimated received interference signal in accordance with a channel parameter and outputting said estimated received interference signal;

error estimation means connected to the outputs of said desired signal estimation means and said interference signal estimation means, for generating an estimation error signal by subtracting, from a received signal, said estimated received desired signal from said desired signal estimation means and said estimated received interference signal from said interference signal estimation means;

state estimation means connected to the output of said error estimation means and to inputs of said desired signal estimation means and said interference signal estimation means for producing a plurality of desired signal sequence candidates and a plurality of interference signal sequence candidates respectively corresponding to a predetermined plurality of sequences of states of signal transition and for providing said plurality of desired signal sequence candidates and said plurality of interference signal sequence candidates to said desired signal estimation means and said interference signal estimation means, respectively, said state estimation means being operative to output, as the result of a sequence decision, that one of said desired signal sequence candidates that is estimated to be a desired signal sequence contained in said received signal on the basis of said estimation error signal generated by said error estimation means; and control means connected to the output of said state estimation means and to inputs of said desired signal estimation means and said interference signal estimation means, for controlling said channel parameters of said desired signal estimation means and said interference signal estimation means by an adaptation algorithm on the basis of said desired signal sequence, said interference signal sequence and said estimation error signal;

said desired signal estimation means, said interference signal estimation means, said error estimation means and said control means constituting a first diversity branch, said receiver including a second diversity branch of the same construction as said first diversity branch, said error estimation means of said first and second diversity branches being supplied with quasi-coherently detected signal sample values obtained from received signals at different positions, respectively, and said state estimation means comprising first and second square means for calculating the squares of estimation errors from said error estimation means of said first and second diversity branches and adder means which adds the outputs from said first and second square means and outputs the added result as a likelihood signal corresponding to its likelihood, said state estimation means generating a set of a desired signal symbol sequence candidate and an interference signal symbol sequence candidate and providing said set to said desired signal estimation means, said interference signal estimation means and said control means of said first and second diversity branches.

3. A receiver comprising:

desired signal estimation means for converting a desired signal sequence candidate into an estimated received desired signal in accordance with a channel parameter and outputting said estimated received desired signal;

interference signal estimation means for converting an interference signal sequence candidate into an estimated received interference signal in accordance with a channel parameter and outputting said estimated received interference signal;

error estimation means connected to the outputs of said desired signal estimation means and said interference signal estimation means, for generating an estimation error signal by subtracting, from a received signal, said estimated received desired signal from said desired signal estimation means and said estimated received interference signal from said interference signal estimation means;

state estimation means connected to the output of said error estimation means and to inputs of said desired signal estimation means and said interference signal estimation means for producing a plurality of desired signal sequence candidates and a plurality of interference signal sequence candidates respectively corresponding to a predetermined plurality of sequences of states of signal transition and for providing said plurality of desired signal sequence candidates and said plurality of interference signal sequence candidates to said desired signal estimation means and said interference signal estimation means, respectively, said state estimation means being operative to output, as the result of a sequence decision, that one of said desired signal sequence candidates that is estimated to be a desired signal sequence contained in said received signal on the basis of said estimation error signal generated by said error estimation means; and control means connected to the output of said state estimation means and to inputs of said desired signal estimation means and said interference signal estimation means, for controlling said channel parameters of said desired signal estimation means and said interference signal estimation means by an adaptation algorithm on the basis of said desired signal sequence, said interference signal sequence and said estimation error signal;

said state estimation means comprising: state sequence candidate generating means which generates a first transition state sequence candidate corresponding to said desired signal symbol sequence candidate and a second transition state sequence candidate corresponding to said interference signal symbol sequence candidate; and first and second modulated signal generating means which generate, as said desired signal sequence candidate and said interference signal sequence candidate, first and second symbol sequence candidates sequentially modulated in accordance with said first and second transition state sequence candidates, respectively.

4. A method for cancelling an interference signal from a received signal in a receiver which comprises error estimation means, state estimation means, desired signal estimation means, interference signal estimation means and channel estimation means, said method comprising:

A. a step wherein upon each input of a quasi-coherently detected signal sample value into said error estimation means, said state estimation means sequentially generates a plurality of first symbol sequence candidates and a plurality of second symbol sequence candidates corresponding to a plurality of transition state sequence candidates for received signals of desired and interference waves;

B. a step wherein said desired signal estimation means and said interference signal estimation means respectively perform convolutional operations of said first and second symbol sequence candidates and channel impulse response estimated values for said desired and interference waves from said channel estimation means to generate an estimated received interference signal;

C. a step wherein said error estimation means subtracts said estimated received desired signal and said estimated received interference signal from said sample value to generate an estimation error signal; and D. a step wherein said state estimation means calculates the likelihood corresponding to said estimation error signal for said set of first and second symbol sequence candidates to decide a desired signal sequence candidate of the maximum likelihood and outputs the result of said decision;

said method including an interference wave training signal period during which a symbol sequence corresponding to an interference wave training signal is provided, as a substitute for said second symbol sequence candidate, to said interference signal estimation means and said channel estimation means, and said channel estimation means outputs said channel impulse response estimated value corresponding to said symbol sequence candidate of said desired signal which provides the maximum likelihood.

5. A method for cancelling an interference signal from a received signal in a receiver which comprises error estimation means, state estimation means, desired signal estimation means, interference signal estimation means and channel estimation means, said method comprising:

A. a step wherein upon each input of a quasi-coherently detected signal sample value into said error estimation means, said state estimation means sequentially generates a plurality of first symbol sequence candidates and a plurality of second symbol sequence candidates corresponding to a plurality of transition state sequence candidates for received signals of desired and interference waves;

B. a step wherein said desired signal estimation means and said interference signal estimation means respectively perform convolutional operations of said first and second symbol sequence candidates and channel impulse response estimated values for said desired and interference waves from said channel estimation means to generate an estimated received interference signal;

C. a step wherein said error estimation means subtracts said estimated received desired signal and said estimated received interference signal from said sample value to generate an estimation error signal; and D. a step wherein said state estimation means calculates the likelihood corresponding to said estimation error signal for said set of first and second symbol sequence candidates to decide a desired signal sequence candidate of the maximum likelihood and outputs the result of said decision;

said step A being a step wherein, in a predetermined period of a received signal, said channel estimation means sets the number of states to a value larger than the numbers of possible transition states for desired and interference waves and increases the numbers of said first and second symbol sequence candidates accordingly and said channel estimation means outputs said channel impulse response estimated values corresponding to said first and second symbol sequence candidates of said desired and interference waves which provide the maximum likelihood in said predetermined period.

6. A method for cancelling an interference signal from a received signal in a receiver which comprises error estimation means, state estimation means, desired signal estimation means, interference signal estimation means and channel estimation means, said method comprising:

A. a step wherein upon each input of a quasi-coherently detected signal sample value into said error estimation means, said state estimation means sequentially generates a plurality of first symbol sequence candidates and a plurality of second symbol sequence candidates corresponding to a plurality of transition state sequence candidates for received signals of desired and interference waves;

B. a step wherein said desired signal estimation means and said interference signal estimation means respectively perform convolutional operations of said first and second symbol sequence candidates and channel impulse response estimated values for said desired and interference waves from said channel estimation means to generate an estimated received interference signal;

C. a step wherein said error estimation means subtracts said estimated received desired signal and said estimated received interference signal from said sample value to generate an estimation error signal;

D. a step wherein said state estimation means calculates the likelihood corresponding to said estimation error signal for said set of first and second symbol sequence candidates to decide a desired signal sequence candidate of the maximum likelihood and outputs the result of said decision; and E. a step wherein in desired and interference wave training signal periods, training signal symbol sequences respectively corresponding to desired and interference wave training signals are provided to said desired signal estimation means and said interference signal estimation means, as substitutes for said first and second symbol sequence candidates, said training symbol sequences being provided to said channel estimation means as well, and said channel impulse response estimated values to be provided to said desired signal estimation means and said interference signal estimation means are determined so that said estimation error signal of said error estimation means is minimized in said training signal periods.

7. A method for cancelling an interference signal from a received signal in a receiver which comprises error estimation means, state estimation means, desired signal estimation means, interference signal estimation means and channel estimation means, said method comprising:

A. a step wherein upon each input of a quasi-coherently detected signal sample value into said error estimation means, said state estimation means sequentially generates a plurality of first symbol sequence candidates and a plurality of second symbol sequence candidates corresponding to a plurality of transition state sequence candidates for received signals of desired and interference waves;

B. a step wherein said desired signal estimation means and said interference signal estimation means respectively perform convolutional operations of said first and second symbol sequence candidates and channel impulse response estimated values for said desired and interference waves from said channel estimation means to generate an estimated received interference signal;

C. a step wherein said error estimation means subtracts said estimated received desired signal and said estimated received interference signal from said sample value to generate an estimation error signal;

D. a step wherein said state estimation means calculates the likelihood corresponding to said estimation error signal for said set of first and second symbol sequence candidates to decide a desired signal sequence candidate of the maximum likelihood and outputs the result of said decision; and E. a step of selecting a path which provides the maximum state transition path metric, by use of the Viterbi algorithm, for each of all predetermined possible transition states of a combination of said desired and interference signals and, upon each selection of said path for each state at each point in time, updating channel parameters for said desired and interference signals on the basis of said first and second symbol sequence candidates corresponding to said selected path.

8. A method for cancelling an interference signal from a received signal in a receiver which comprises error estimation means, state estimation means, desired signal estimation means, interference signal estimation means and channel estimation means, said method comprising:

A. a step wherein upon each input of a quasi-coherently detected signal sample value into said error estimation means, said state estimation means sequentially generates a plurality of first symbol sequence candidates and a plurality of second symbol sequence candidates corresponding to a plurality of transition state sequence candidates for received signals of desired and interference waves;

B. a step wherein said desired signal estimation means and said interference signal estimation means respectively perform convolutional operations of said first and second symbol sequence candidates and channel impulse response estimated values for said desired and interference waves from said channel estimation means to generate an estimated received interference signal;

C. a step wherein said error estimation means subtracts said estimated received desired signal and said estimated received interference signal from said sample value to generate an estimation error signal;

D. a step wherein said state estimation means calculates the likelihood corresponding to said estimation error signal for said set of first and second symbol sequence candidates to decide a desired signal sequence candidate of the maximum likelihood and outputs the result of said decision; and E. a step wherein states groups composed of combinations of possible transition states of said desired signal and possible transition states of said interference signal are defined; the state transition between adjacent points in time is limited to one path which provides the maximum path metric between respective state groups; and upon each selection of one path on the basis of said path metric, channel impulse responses for said desired and interference signals are updated in accordance with said first and second symbol sequence candidates of said desired and interference signals corresponding to the selected state transition.

9. A communication system which uses a receiver to receive a desired signal in signals transmitted from a plurality of transmitting stations, said plurality of transmitting stations each including random generating means for generating a pseudo-random number and phase shift means for shifting the phase of the signal to be transmitted, by an amount corresponding to said pseudo-random number; said receiver comprising:

desired signal estimation means for converting a desired signal sequence candidate into an estimated received desired signal in accordance with a channel parameter and outputting said estimated received desired signal;

interference signal estimation means for converting an interference signal sequence candidate into an estimated received interference signal in accordance with a channel parameter and outputting said estimated received interference signal;

error estimation means connected to the outputs of said desired signal estimation means and said interference signal estimation means, for generating an estimation error signal by subtracting, from a received signal, said estimated received desired signal from said desired signal estimation means and said estimated received interference signal from said interference signal estimation means;

state estimation means connected to the output of said error estimation means and to inputs of said desired signal estimation means and said interference signal estimation means for producing a plurality of desired signal sequence candidates and a plurality of interference signal sequence candidates respectively corresponding to a predetermined plurality of sequences of states of signal transition and for providing said plurality of desired signal sequence candidates and said plurality of interference signal sequence candidates to said desired signal estimation means and said interference signal estimation means, respectively, said state estimation means being operative to output, as the result of a sequence decision, that one of said desired signal sequence candidates that is estimated to be a desired signal sequence contained in said received signal on the basis of said estimation error signal generated by said error estimation means; and control means connected to the output of said state estimation means and to inputs of said desired signal estimation means and said interference signal estimation means, for controlling said channel parameters of said desired signal estimation means and said interference signal estimation means by an adaptation algorithm on the basis of said desired signal sequence, said interference signal sequence and said estimation error signal.

10. A communication system which uses receiver to receive a desired signal in signals transmitted from a plurality of transmitting stations, each transmitting station including random generating means for generating a pseudo-random number and power control means for changing the amplitude of the signal to be transmitted in accordance with said pseudeo-random number; said receiver comprising:

desired signal estimation means for converting a desired signal sequence candidate into an estimated received desired signal in accordance with a channel parameter and outputting said estimated received desired signal;

interference signal estimation means for converting an interference signal sequence candidate into an estimated received interference signal in accordance with a channel parameter and outputting said estimated received interference signal;

error estimation mean connected to the outputs of said desired signal estimation means and said interference signal estimation means, for generating an estimation error signal by subtracting, from a received signal, said estimated received desired signal from said desired signal estimation means and said estimated received interference signal from said interference signal estimation means;

state estimation means connected to the output of said error estimation means and to inputs of said desired signal estimation means and said interference signal estimation means for producing a plurality of desired signal sequence candidates and a plurality of interference signal sequence candidates respectively corresponding to predetermined plurality of sequence of states of signal transition and for providing said plurality of desired signal sequence candidates and said plurality of interference signal sequence candidates to said desired signal estimation means and said interference signal estimation means, respectively, said state estimation means being operative to output, as the result of a sequence decision, that one of said desired signal sequence candidates that is estimated to be a desired signal sequence contained in said received signal on the basis of said estimation error signal generated by said error estimation means, and control mean connected to the output of said state estimation means and to inputs of said desired signal estimation means and said interference signal estimation means, for controlling said channel parameters of said parameters of said desired signal estimation means and said interference signal estimation means by an adaptation algorithm on the basis of said desired signal sequence, said interference signal sequence and said estimation error signal.

11. A method for cancelling an interference signal from a received signal in a receiver which comprises error estimation means, state estimation means, desired signal estimation means, interference signal estimation means and channel estimation means, said method comprising:

A. a step wherein upon each input of a quasi-coherently detected signal sample value into said error estimation means, said state estimation means sequentially generates a plurality of first symbol sequence candidates and a plurality of second symbol sequence candidates corresponding to a plurality of transition state sequence candidates for received signals of desired and interference waves;

B. a step wherein said desired signal estimation means and said interference signal estimation means respectively perform convolutional operations of said first and second symbol sequence candidates and channel impulse response estimated values for said desired and interference waves from said channel estimation means to generate an estimated received desired signal and an estimated received interference signal;

C. a step wherein said error estimation means subtracts said estimated received desired signal and said estimated received interference signal from said sample value to generate an estimation error signal; and D. a step wherein said state estimation means calculates the likelihood corresponding to said estimation error signal for said set of first and second symbol sequence candidates to decide a desired signal sequence candidate of the maximum likelihood and outputs the result of said decision;

said method including a desired wave training signal period during which a symbol sequence corresponding to a desired wave training signal is provided, as a substitute for said first symbol sequence candidate, to said desired signal estimation means and said channel estimation means, and said channel estimation means outputs said channel impulse response estimated value corresponding to said symbol sequence candidate of said interference wave which provides the maximum likelihood.

12. The receiver of claim 1, wherein said state estimation means comprises: first maximum likelihood sequence estimation means which generates a desired signal symbol sequence candidate for the transition state of said desired signal and makes a maximum likelihood sequence estimation for said desired signal symbol candidate on the basis of said estimation error signal from said error estimation means; desired signal modulated signal generating means which modulates said desired signal symbol sequence candidate from said first maximum likelihood sequence estimation means and outputs said desired signal sequence candidate to said desired signal estimation means; second maximum likelihood sequence estimation means which generates an interference signal symbol sequence candidate for the transition state of said interference signal and makes a maximum likelihood sequence estimation for said interference signal symbol sequence candidate on the basis of said estimation error signal from said error estimation means; and interference signal modulated signal generating means which modulates said interference signal symbol sequence candidate from said second maximum likelihood sequence estimation means and outputs said interference signal sequence candidate to said interference signal estimation means.

13. The receiver of claim 1, wherein said state estimation means comprises: maximum likelihood sequence estimation means which generates a plurality of sets of desired and interference signal symbol sequence candidates for respective state sequences each formed by a combination of the transition state for said desired signal and the transition state for said interference signal and makes a maximum likelihood estimation for each of said sets of desired and interference signal symbol sequence candidates on the basis of the corresponding estimation error signal from said error estimation means; and desired signal modulated signal generating means and interference signal modulated signal generating means which respectively modulate said desired signal sequence candidate and said interference signal sequence candidate obtainable from said sets of candidates outputted from said maximum likelihood sequence estimation means and output said desired signal sequence candidate and said interference signal sequence candidate to said desired signal estimation means and said interference signal estimation means, respectively.

14. The receiver of claim 1, wherein said state estimation means comprises: maximum likelihood sequence estimation means which generates a plurality of desired signal symbol sequence candidates for each state sequence of said desired signal and makes a maximum likelihood sequence estimation for each of said desired signal symbol sequence candidates on the basis of the corresponding estimation error signal from said error estimation means; desired signal modulated signal generating means which modulates each of said desired signal symbol sequence candidates from said maximum likelihood sequence estimation means and outputs said desired signal sequence candidate to said desired signal estimation means; maximum likelihood decision means which generates a plurality of interference signal symbol sequence candidates for each state sequence of said interference signal and makes a maximum likelihood decision for each to said interference signal symbol sequence candidates on the basis of the corresponding estimation error signal from said error estimation means; and interference signal modulated signal generating means which modulates each of said interference signal symbol sequence candidates from said maximum likelihood decision means and outputs said interference signal sequence candidate to said interference signal estimation means.

15. The receiver of claim 1, wherein said state estimation means comprises: maximum likelihood decision means which generates a plurality of desired signal symbol sequence candidates for each state sequence of said desired signal and makes a maximum likelihood decision for each of said desired signal symbol sequence candidates on the basis of the corresponding estimation error signal from said error estimation means; desired signal modulated signal generating means which modulates each of said desired signal symbol sequence candidates from said maximum likelihood decision means and outputs said desired signal sequence candidate to said desired signal estimation means; maximum likelihood sequence estimation means which generates a plurality of interference signal symbol sequence candidates for each state sequence of said interference signal and makes a maximum likelihood sequence estimation for each of said interference signal symbol sequences on the basis of the corresponding estimation error signal from said error estimation means; and interference signal modulated signal generating means which modulates each of said interference signal symbol sequence candidates from said maximum likelihood sequence estimation means and outputs said interference signal sequence candidate to said interference signal estimation means.

16. The receiver of claim 1, wherein said state estimation means comprises: maximum likelihood decision means which generates a plurality of desired signal symbol sequence candidates for each state sequence of said desired signal and make a maximum likelihood decision for each of said desired signal symbol sequence candidates on the basis of the corresponding estimation error signal from said error estimation means; desired signal modulated signal generating means which modulates each of said desired signal symbol sequence candidates from said maximum likelihood decision means and outputs said desired signal sequence candidate to said desired signal estimation means; maximum likelihood decision means which generates a plurality of interference signal symbol sequence candidates for each state sequence of the state sequence of said interference signal and makes a maximum likelihood decision for each of said interference signal symbol sequences on the basis of the corresponding to estimation error signal from said error estimation means; and interference signal modulated signal generating means which modulates each of said interference signal symbol sequence candidates from said maximum likelihood decision means and output said interference signal sequence candidate to said interference signal estimation means.

17. The receiver of claim 1, wherein said state estimation means comprises: maximum likelihood sequence estimation means which generates a plurality of desired signal symbol sequence candidates for each state sequence of said desired signal and makes a maximum likelihood sequence estimation for each of said desired signal symbol sequence candidates on the basis of the corresponding estimation error signal from said error estimation means; desired signal modulated signal generating means which modulates each of said desired signal symbol sequence candidates from said maximum likelihood sequence estimation means and outputs said desired signal sequence candidate to said desired signal estimation means; inverse filter means which is controlled by the inverse of said second tap coefficient vector and generates an interference signal sequence estimated from said estimation error signal; and symbol decision means which makes a symbol-by-symbol decision for said estimated interference signal sequence and outputs it as said interference signal sequence candidate.

18. The receiver of any one of claims 1 through 12, wherein said control means comprises: tap coefficient update means which is supplied with said desired signal symbol sequence candidate and said interference signal symbol sequence candidate from said state estimation means and said estimation error signal from said error estimation means and whereby said first and second tap coefficient vectors stored for each transition state are updated for each possible transition state of said desired signal and said interference signal through said adaptation algorithm; tap coefficient holding means which holds said updated first and second tap coefficient vectors for each transition state; and tap coefficient switching means which selects, for each transition state, the corresponding first and second tap coefficient vectors from said tap coefficient holding means and sets them in said first and second transversal filters.

19. The receiver of any one of claims 12 through 15, wherein said maximum likelihood sequence estimation means is means which makes said estimation following a Viterbi algorithm.

20. The receiver of claim 1, which further comprises: training signal storage means having stored therein training signals of a plurality of base stations; and first switching means whereby, in a training signal period of a received signal of a desired wave, said desired signal symbol sequence candidate from said state estimation means is switched to a desired wave training signal symbol sequence for supply to said first transversal filter and said control means from said training signal storage means; and wherein said control means adaptively updates, on the basis of said estimation error signal, said first tap coefficient vector for each transition state of said desired wave training signal symbol sequence in said training signal period.

21. The receiver of claim 20, which further comprises second switching means whereby, in said training signal period, said interference signal sequence candidate from said state estimation means is switched to an interference wave training signal for supply to said second transversal filter and said control means from said training signal storage means, and wherein said control means adaptively updates, on the basis of said estimation error signal, said second tap coefficient vector for each transition state of said interference wave training signal in said training signal period.

22. The receiver of claim 20 or 21, wherein said switching means is provided at the input side of said modulated signal generating means.

23. The receiver of claim 1, wherein at least one of said desired signal estimation means and said interference signal estimation means includes complex multiplier means which rotates the phase of a complex signal output of said transversal filter in accordance with a carrier center frequency difference between desired and interference waves.

24. The receiver of claim 8, wherein said first and second modulated signal generating means respectively comprise: first and second mapping logic circuit means which convert said transition state sequences provided thereto into first and second modulated symbol sequences of desired modulated forms; and first and second converting means which convert said first and second modulated symbol sequences from said first and second mapping logic circuit means into said desired signal symbol sequence candidate and said interference signal symbol sequence candidate, respectively.

25. The method of claim 6, wherein said receiver has prestored in memory means a plurality of preknown training patterns corresponding to different receivable training signals, said method selecting that one of said training patterns which provides a training signal symbol sequence which has the highest correlation to a received signal and using a symbol sequence corresponding to said selecting training pattern as said training symbol sequence.

26. The method of claim 6 or 25, wherein training patterns for said desired and interference waves are those which are high in the auto-correlation of their symbol sequences but low in the correlation between said symbol sequences.

27. The method of claim 26, wherein said training patterns are determined so that their symbol sequences are orthogonal to each other.

28. The communication system of claim 9, which includes timing generating means for applying a common timing signal to at least two of said transmitting stations, said transmitting stations including transmitting power control means for controlling the amplitudes of said signals to be transmitted on the basis of said timing signal so that said signals have different amplitudes.

29. The communication system of claim 10, wherein said each transmitting station includes second random generating means for generating a second pseudorandom number and phase shift means for changing the phase of said signal to be transmitted by an amount corresponding to said second pseudo-random number.

30. The communication system of claim 19, 28, or 29, wherein said each transmitting station transmits the signal with a burst and said phase shift means changes the phase of said signal to be transmitted on the basis of said random number for each burst.

* * * * *